(12) United States Patent
Popovich et al.

(10) Patent No.: US 10,359,736 B2
(45) Date of Patent: Jul. 23, 2019

(54) METHOD FOR HOLOGRAPHIC MASTERING AND REPLICATION

(71) Applicant: DigiLens Inc., Sunnyvale, CA (US)

(72) Inventors: Milan Momcilo Popovich, Leicester (GB); Jonathan David Waldern, Los Altos Hills, CA (US); Alastair John Grant, San Jose, CA (US)

(73) Assignee: DigiLens Inc., Sunnyvale, CA (US)

(*) Notice: Subject to any disclaimer, the term of this patent is extended or adjusted under 35 U.S.C. 154(b) by 48 days.

(21) Appl. No.: 15/502,596

(22) PCT Filed: Aug. 5, 2015

(86) PCT No.: PCT/GB2015/000228
§ 371 (c)(1),
(2) Date: Feb. 8, 2017

(87) PCT Pub. No.: WO2016/020632
PCT Pub. Date: Feb. 11, 2016

(65) Prior Publication Data
US 2018/0210396 A1     Jul. 26, 2018

Related U.S. Application Data

(60) Provisional application No. 61/999,867, filed on Aug. 8, 2014.

(51) Int. Cl.
*G03H 1/20*       (2006.01)
*G03H 1/02*       (2006.01)
*G03H 1/26*       (2006.01)

(52) U.S. Cl.
CPC ........... *G03H 1/202* (2013.01); *G03H 1/0244* (2013.01); *G03H 1/0248* (2013.01); *G03H 1/265* (2013.01);

(Continued)

(58) Field of Classification Search
CPC .. G03H 1/20; G03H 1/202; G03H 2001/2658; G03H 2001/269; G03H 2001/205; G03H 2001/207

(Continued)

(56) References Cited

U.S. PATENT DOCUMENTS 1,043,938 A    11/1912   Huttenlocher
2,141,884 A    12/1938   Sonnefeld
(Continued)

FOREIGN PATENT DOCUMENTS

BR    PI0720469 A2    1/2014
CA    2889727 A1    6/2014
(Continued)

OTHER PUBLICATIONS

US 9,488,474 B2, 11/2016, Abovitz et al. (withdrawn)
(Continued)

*Primary Examiner* — Audrey Y Chang
(74) *Attorney, Agent, or Firm* — KPPB LLP

(57) ABSTRACT

A method for producing holograms with a multiplicity of holographic prescriptions from a single master is provided. A multiplicity of holographic substrates each having a first hologram is stacked on a second holographic recording medium substrate. The first hologram is designed to diffract light from a first direction into a second direction. When expose to illumination from the first direction zero order and diffracted light from each first hologram interfere in the second holographic recording medium substrate forming a second hologram. The second hologram is then copied into a third holographic recording medium substrate to provide the final copy hologram.

20 Claims, 10 Drawing Sheets

(52) U.S. Cl.
CPC ... *G03H 2001/207* (2013.01); *G03H 2222/31* (2013.01); *G03H 2223/20* (2013.01); *G03H 2223/22* (2013.01); *G03H 2223/25* (2013.01); *G03H 2227/04* (2013.01); *G03H 2260/12* (2013.01); *G03H 2260/33* (2013.01)

(58) Field of Classification Search
USPC .................................................. 359/1, 12, 35
See application file for complete search history.

(56) References Cited

U.S. PATENT DOCUMENTS

| | | |
|---|---|---|
| 3,482,498 A | 12/1969 | Becker |
| 3,620,601 A | 11/1971 | Leonard et al. |
| 3,741,716 A | 6/1973 | Johne et al. |
| 3,843,231 A | 10/1974 | Borel et al. |
| 3,851,303 A | 11/1974 | Muller |
| 3,885,095 A | 5/1975 | Wolfson et al. |
| 3,940,204 A | 2/1976 | Withrington |
| 3,965,029 A | 6/1976 | Arora |
| 3,975,711 A | 8/1976 | McMahon |
| 4,035,068 A | 7/1977 | Rawson |
| 4,066,334 A | 1/1978 | Fray et al. |
| 4,082,432 A | 4/1978 | Kirschner |
| 4,099,841 A | 7/1978 | Ellis |
| 4,178,074 A | 12/1979 | Heller |
| 4,218,111 A | 8/1980 | Withrington et al. |
| 4,232,943 A | 11/1980 | Rogers |
| 4,248,093 A | 2/1981 | Andersson et al. |
| 4,251,137 A | 2/1981 | Knop et al. |
| 4,309,070 A | 1/1982 | St. Leger Searle |
| 4,322,163 A | 3/1982 | Schiller |
| 4,386,361 A | 5/1983 | Simmonds |
| 4,389,612 A | 6/1983 | Simmonds et al. |
| 4,403,189 A | 9/1983 | Simmonds |
| 4,418,993 A | 12/1983 | Lipton |
| 4,472,037 A | 9/1984 | Lipton |
| 4,523,226 A | 6/1985 | Lipton et al. |
| 4,544,267 A | 10/1985 | Schiller |
| 4,562,463 A | 12/1985 | Lipton |
| 4,566,758 A | 1/1986 | Bos et al. |
| 4,583,117 A | 4/1986 | Lipton et al. |
| 4,643,515 A | 2/1987 | Upatnieks |
| 4,647,967 A | 3/1987 | Kirschner et al. |
| 4,688,900 A | 8/1987 | Doane et al. |
| 4,711,512 A | 12/1987 | Upatnieks |
| 4,714,320 A | 12/1987 | Banbury |
| 4,728,547 A | 3/1988 | Vaz et al. |
| 4,729,640 A | 3/1988 | Sakata et al. |
| 4,743,083 A | 5/1988 | Schimpe |
| 4,749,256 A | 6/1988 | Bell et al. |
| 4,765,703 A | 8/1988 | Suzuki et al. |
| 4,775,218 A | 10/1988 | Wood et al. |
| 4,791,788 A | 12/1988 | Simmonds et al. |
| 4,792,850 A | 12/1988 | Liptoh et al. |
| 4,799,765 A | 1/1989 | Ferrer |
| 4,811,414 A | 3/1989 | Fishbine et al. |
| 4,848,093 A | 7/1989 | Simmonds et al. |
| 4,854,688 A | 8/1989 | Hayford et al. |
| 4,884,876 A | 12/1989 | Lipton et al. |
| 4,890,902 A | 1/1990 | Doane et al. |
| 4,928,301 A | 5/1990 | Smoot |
| 4,933,976 A | 6/1990 | Fishbine et al. |
| 4,938,568 A | 7/1990 | Margerum et al. |
| 4,946,245 A | 8/1990 | Chamberlin et al. |
| 4,960,311 A | 10/1990 | Moss et al. |
| 4,964,701 A | 10/1990 | Dorschner et al. |
| 4,967,268 A | 10/1990 | Lipton et al. |
| 4,970,129 A | 11/1990 | Ingwall et al. |
| 4,971,719 A | 11/1990 | Vaz et al. |
| 4,994,204 A | 2/1991 | Doane et al. |
| 5,004,323 A | 4/1991 | West |
| 5,007,711 A | 4/1991 | Wood et al. |
| 5,009,483 A | 4/1991 | Rockwell et al. |
| 5,016,953 A * | 5/1991 | Moss ..................... G03H 1/08 359/12 |
| 5,033,814 A | 7/1991 | Brown et al. |
| 5,035,734 A | 7/1991 | Honkanen et al. |
| 5,053,834 A | 10/1991 | Simmonds |
| 5,063,441 A | 11/1991 | Lipton et al. |
| 5,076,664 A | 12/1991 | Migozzi |
| 5,079,416 A | 1/1992 | Filipovich |
| 5,096,282 A | 3/1992 | Margerum et al. |
| 5,099,343 A | 3/1992 | Margerum et al. |
| 5,109,465 A | 4/1992 | Klopotek |
| 5,110,034 A | 5/1992 | Simmonds et al. |
| 5,117,285 A | 5/1992 | Nelson et al. |
| 5,117,302 A | 5/1992 | Lipton |
| 5,119,454 A | 6/1992 | McMahon et al. |
| 5,124,821 A | 6/1992 | Antier et al. |
| 5,139,192 A | 8/1992 | Simmonds et al. |
| 5,142,357 A | 8/1992 | Lipton et al. |
| 5,142,644 A | 8/1992 | Vansteenkiste et al. |
| 5,148,302 A | 9/1992 | Nagano et al. |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,181,133 A | 1/1993 | Lipton |
| 5,183,545 A | 2/1993 | Branca et al. |
| 5,187,597 A | 2/1993 | Kato et al. |
| 5,193,000 A | 3/1993 | Lipton et al. |
| 5,198,912 A | 3/1993 | Ingwall et al. |
| 5,200,861 A | 4/1993 | Moskovich et al. |
| 5,210,624 A | 5/1993 | Matsumoto et al. |
| 5,218,360 A | 6/1993 | Goetz et al. |
| 5,218,480 A | 6/1993 | Moskovich et al. |
| 5,224,198 A | 6/1993 | Jachimowicz et al. |
| 5,239,372 A | 8/1993 | Lipton |
| 5,240,636 A | 8/1993 | Doane et al. |
| 5,241,337 A | 8/1993 | Betensky et al. |
| 5,242,476 A | 9/1993 | Bartel et al. |
| 5,243,413 A | 9/1993 | Gitlin et al. |
| 5,251,048 A | 10/1993 | Doane et al. |
| 5,264,950 A | 11/1993 | West et al. |
| 5,268,792 A | 12/1993 | Kreitzer et al. |
| 5,284,499 A | 2/1994 | Harvey et al. |
| 5,289,315 A | 2/1994 | Makita et al. |
| 5,295,208 A | 3/1994 | Caulfield et al. |
| 5,296,967 A | 3/1994 | Moskovich et al. |
| 5,299,289 A | 3/1994 | Omae et al. |
| 5,303,085 A | 4/1994 | Rallison |
| 5,309,283 A | 5/1994 | Kreitzer et al. |
| 5,313,330 A | 5/1994 | Betensky |
| 5,315,324 A | 5/1994 | Kubelik et al. |
| 5,315,419 A | 5/1994 | Saupe et al. |
| 5,315,440 A | 5/1994 | Betensky et al. |
| 5,317,405 A | 5/1994 | Kuriki et al. |
| 5,327,269 A | 7/1994 | Tilton et al. |
| 5,329,363 A | 7/1994 | Moskovich et al. |
| 5,341,230 A | 8/1994 | Smith |
| 5,343,147 A | 8/1994 | Sager et al. |
| 5,351,151 A | 9/1994 | Levy |
| 5,359,362 A | 10/1994 | Lewis et al. |
| 5,363,220 A | 11/1994 | Kuwayama et al. |
| 5,368,770 A | 11/1994 | Saupe et al. |
| 5,369,511 A | 11/1994 | Amos |
| 5,371,626 A | 12/1994 | Betensky |
| 5,400,069 A | 3/1995 | Braun et al. |
| 5,408,346 A | 4/1995 | Trissel et al. |
| 5,410,370 A | 4/1995 | Janssen |
| 5,416,510 A | 5/1995 | Lipton et al. |
| 5,416,514 A | 5/1995 | Janssen et al. |
| 5,418,584 A | 5/1995 | Larson |
| 5,418,871 A | 5/1995 | Revelli et al. |
| 5,428,480 A | 6/1995 | Betensky et al. |
| 5,437,811 A | 8/1995 | Doane et al. |
| 5,438,357 A | 8/1995 | McNelley |
| 5,452,385 A | 9/1995 | Izumi et al. |
| 5,453,863 A | 9/1995 | West et al. |
| 5,455,693 A | 10/1995 | Wreede et al. |
| 5,455,713 A | 10/1995 | Kreitzer et al. |
| 5,463,428 A | 10/1995 | Lipton et al. |

(56) References Cited

U.S. PATENT DOCUMENTS

| | | |
|---|---|---|
| 5,465,311 A | 11/1995 | Caulfield et al. |
| 5,471,326 A | 11/1995 | Hall et al. |
| 5,473,222 A | 12/1995 | Thoeny et al. |
| 5,476,611 A | 12/1995 | Nolan et al. |
| 5,481,321 A | 1/1996 | Lipton |
| 5,485,313 A | 1/1996 | Betensky |
| 5,493,430 A | 2/1996 | Lu et al. |
| 5,493,448 A | 2/1996 | Betensky et al. |
| 5,496,621 A | 3/1996 | Makita et al. |
| 5,499,118 A | 3/1996 | Wreede et al. |
| 5,499,140 A | 3/1996 | Betensky |
| 5,500,671 A | 3/1996 | Andersson et al. |
| 5,500,769 A | 3/1996 | Betensky |
| 5,510,913 A | 4/1996 | Hashimoto et al. |
| 5,515,184 A | 5/1996 | Caulfield et al. |
| 5,516,455 A | 5/1996 | Jacobine et al. |
| 5,524,272 A | 6/1996 | Podowski et al. |
| 5,530,566 A | 6/1996 | Kumar |
| 5,532,736 A | 7/1996 | Kuriki et al. |
| 5,532,875 A | 7/1996 | Betemsky |
| 5,537,232 A | 7/1996 | Biles |
| RE35,310 E | 8/1996 | Moskovich |
| 5,543,950 A | 8/1996 | Lavrentovich et al. |
| 5,559,637 A | 9/1996 | Moskovich et al. |
| 5,572,248 A | 11/1996 | Allen et al. |
| 5,572,250 A | 11/1996 | Lipton et al. |
| 5,576,888 A | 11/1996 | Betensky |
| 5,579,026 A | 11/1996 | Tabata |
| 5,583,795 A | 12/1996 | Smyth |
| 5,585,035 A | 12/1996 | Nerad et al. |
| 5,593,615 A | 1/1997 | Nerad et al. |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,619,586 A | 4/1997 | Sibbald et al. |
| 5,621,529 A | 4/1997 | Gordon et al. |
| 5,621,552 A | 4/1997 | Coates et al. |
| 5,625,495 A | 4/1997 | Moskovich et al. |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,614 A | 9/1997 | Chien et al. |
| 5,668,907 A | 9/1997 | Veligdan |
| 5,677,797 A | 10/1997 | Betensky et al. |
| 5,680,231 A | 10/1997 | Grinberg et al. |
| 5,682,255 A | 10/1997 | Friesem et al. |
| 5,686,931 A | 11/1997 | Fuenfschilling et al. |
| 5,686,975 A | 11/1997 | Lipton |
| 5,691,795 A | 11/1997 | Doane et al. |
| 5,694,230 A | 12/1997 | Welch |
| 5,695,682 A | 12/1997 | Doane et al. |
| 5,701,132 A | 12/1997 | Kollin et al. |
| 5,706,108 A | 1/1998 | Ando et al. |
| 5,706,136 A | 1/1998 | Okuyama et al. |
| 5,707,925 A | 1/1998 | Akada et al. |
| 5,710,645 A | 1/1998 | Phillips et al. |
| 5,724,189 A | 3/1998 | Ferrante |
| 5,724,463 A | 3/1998 | Deacon et al. |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,742,262 A | 4/1998 | Tabata et al. |
| 5,745,266 A | 4/1998 | Smith et al. |
| 5,745,301 A | 4/1998 | Betensky et al. |
| 5,748,272 A | 5/1998 | Tanaka et al. |
| 5,748,277 A | 5/1998 | Huang et al. |
| 5,751,452 A | 5/1998 | Tanaka et al. |
| 5,757,546 A | 5/1998 | Lipton et al. |
| 5,760,931 A | 6/1998 | Saburi et al. |
| 5,764,414 A | 6/1998 | King et al. |
| 5,790,288 A | 8/1998 | Jager et al. |
| 5,790,314 A | 8/1998 | Duck et al. |
| 5,798,641 A | 8/1998 | Spagna et al. |
| 5,808,804 A | 9/1998 | Moskovich |
| 5,812,608 A | 9/1998 | Valimaki et al. |
| 5,822,089 A | 10/1998 | Phillips et al. |
| 5,822,127 A | 10/1998 | Chen et al. |
| 5,825,448 A | 10/1998 | Bos et al. |
| 5,831,700 A | 11/1998 | Li et al. |
| 5,835,661 A | 11/1998 | Tai et al. |
| 5,841,507 A | 11/1998 | Barnes |
| 5,841,587 A | 11/1998 | Moskovich et al. |
| 5,847,787 A | 12/1998 | Fredley et al. |
| 5,856,842 A | 1/1999 | Tedesco |
| 5,857,043 A | 1/1999 | Cook et al. |
| 5,867,238 A | 2/1999 | Miller et al. |
| 5,868,951 A | 2/1999 | Schuck, III et al. |
| 5,870,228 A | 2/1999 | Kreitzer et al. |
| 5,875,012 A | 2/1999 | Crawford et al. |
| 5,877,826 A | 3/1999 | Yang et al. |
| 5,886,822 A | 3/1999 | Spitzer |
| 5,892,598 A | 4/1999 | Asakawa et al. |
| 5,892,599 A | 4/1999 | Bahuguna |
| 5,898,511 A | 4/1999 | Mizutani et al. |
| 5,900,987 A | 5/1999 | Kreitzer et al. |
| 5,900,989 A | 5/1999 | Kreitzer |
| 5,903,395 A | 5/1999 | Rallison et al. |
| 5,903,396 A | 5/1999 | Rallison |
| 5,907,416 A | 5/1999 | Hegg et al. |
| 5,907,436 A | 5/1999 | Perry et al. |
| 5,917,459 A | 6/1999 | Son et al. |
| 5,926,147 A | 7/1999 | Sehm et al. |
| 5,929,946 A | 7/1999 | Sharp et al. |
| 5,929,960 A | 7/1999 | West et al. |
| 5,930,433 A | 7/1999 | Williamson et al. |
| 5,936,776 A | 8/1999 | Kreitzer |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,949,508 A | 9/1999 | Kumar et al. |
| 5,956,113 A | 9/1999 | Crawford |
| 5,962,147 A | 10/1999 | Shalub et al. |
| 5,963,375 A | 10/1999 | Kreitzer |
| 5,966,223 A | 10/1999 | Friesem et al. |
| 5,969,874 A | 10/1999 | Moskovich |
| 5,969,876 A | 10/1999 | Kreitzer et al. |
| 5,973,727 A | 10/1999 | McGrew et al. |
| 5,974,162 A | 10/1999 | Metz et al. |
| 5,985,422 A | 11/1999 | Krauter |
| 5,986,746 A | 11/1999 | Metz et al. |
| 5,991,087 A | 11/1999 | Rallison |
| 5,999,089 A | 12/1999 | Carlson et al. |
| 5,999,282 A | 12/1999 | Suzuki et al. |
| 5,999,314 A | 12/1999 | Asakura et al. |
| 6,014,187 A | 1/2000 | Taketomi et al. |
| 6,023,375 A | 2/2000 | Kreitzer |
| 6,042,947 A | 3/2000 | Asakura et al. |
| 6,043,585 A | 3/2000 | Plessky et al. |
| 6,046,585 A | 4/2000 | Simmonds |
| 6,052,540 A | 4/2000 | Koyama |
| 6,061,107 A | 5/2000 | Yang |
| 6,061,463 A | 5/2000 | Metz et al. |
| 6,069,728 A | 5/2000 | Huignard et al. |
| 6,075,626 A | 6/2000 | Mizutani et al. |
| 6,078,427 A | 6/2000 | Fontaine et al. |
| 6,094,311 A | 7/2000 | Moskovich |
| 6,097,551 A | 8/2000 | Kreitzer |
| 6,104,448 A | 8/2000 | Doane et al. |
| 6,107,943 A | 8/2000 | Schroeder |
| 6,115,152 A | 9/2000 | Popovich et al. |
| 6,118,908 A | 9/2000 | Bischel et al. |
| 6,121,899 A | 9/2000 | Theriault |
| 6,127,066 A | 10/2000 | Ueda et al. |
| 6,128,058 A | 10/2000 | Walton et al. |

(56) References Cited

U.S. PATENT DOCUMENTS

| | | | |
|---|---|---|---|
| 6,133,971 A | 10/2000 | Silverstein et al. | |
| 6,133,975 A | 10/2000 | Li et al. | |
| 6,137,630 A | 10/2000 | Tsou et al. | |
| 6,141,074 A | 10/2000 | Bos et al. | |
| 6,141,154 A | 10/2000 | Kreitzer et al. | |
| 6,151,142 A | 11/2000 | Phillips et al. | |
| 6,154,190 A | 11/2000 | Yang et al. | |
| 6,167,169 A | 12/2000 | Brinkman et al. | |
| 6,169,594 B1 | 1/2001 | Aye et al. | |
| 6,169,613 B1 | 1/2001 | Amitai et al. | |
| 6,169,636 B1 | 1/2001 | Kreitzer et al. | |
| 6,176,837 B1 | 1/2001 | Foxlin | |
| 6,185,016 B1 | 2/2001 | Popovich | |
| 6,188,462 B1 | 2/2001 | Lavrentovich et al. | |
| 6,191,887 B1 | 2/2001 | Michaloski et al. | |
| 6,195,206 B1 | 2/2001 | Yona et al. | |
| 6,195,209 B1 | 2/2001 | Kreitzer et al. | |
| 6,204,835 B1 | 3/2001 | Yang et al. | |
| 6,211,976 B1 | 4/2001 | Popovich et al. | |
| 6,222,297 B1 | 4/2001 | Perdue | |
| 6,222,675 B1 | 4/2001 | Mall et al. | |
| 6,222,971 B1 | 4/2001 | Veligdan et al. | |
| 6,249,386 B1 | 6/2001 | Yona et al. | |
| 6,259,423 B1 | 7/2001 | Tokito et al. | |
| 6,259,559 B1 | 7/2001 | Kobayashi et al. | |
| 6,268,839 B1 | 7/2001 | Yang et al. | |
| 6,269,203 B1 | 7/2001 | Davies et al. | |
| 6,275,031 B1 | 8/2001 | Simmonds et al. | |
| 6,278,429 B1 | 8/2001 | Ruth et al. | |
| 6,285,813 B1 | 9/2001 | Schultz et al. | |
| 6,297,860 B1 | 10/2001 | Moskovich et al. | |
| 6,301,056 B1 | 10/2001 | Kreitzer et al. | |
| 6,301,057 B1 | 10/2001 | Kreitzer et al. | |
| 6,317,083 B1 | 11/2001 | Johnson et al. | |
| 6,317,227 B1 | 11/2001 | Mizutani et al. | |
| 6,317,228 B2 | 11/2001 | Popovich et al. | |
| 6,320,563 B1 | 11/2001 | Yang et al. | |
| 6,321,069 B1 | 11/2001 | Piirainen | |
| 6,323,970 B1 | 11/2001 | Popovich | |
| 6,323,989 B1 | 11/2001 | Jacobson et al. | |
| 6,324,014 B1 | 11/2001 | Moskovich et al. | |
| 6,327,089 B1 | 12/2001 | Hosaki et al. | |
| 6,330,109 B1 | 12/2001 | Ishii et al. | |
| 6,333,819 B1 | 12/2001 | Svedenkrans | |
| 6,340,540 B1 | 1/2002 | Ueda et al. | |
| 6,351,333 B2 | 2/2002 | Araki et al. | |
| 6,356,172 B1 | 3/2002 | Koivisto et al. | |
| 6,356,674 B1 | 3/2002 | Davis et al. | |
| 6,359,730 B2 | 3/2002 | Tervonen | |
| 6,359,737 B1 | 3/2002 | Stringfellow | |
| 6,366,281 B1 | 4/2002 | Lipton et al. | |
| 6,366,369 B2 * | 4/2002 | Ichikawa | G02B 5/203 359/1 |
| 6,366,378 B1 | 4/2002 | Tervonen et al. | |
| 6,377,238 B1 | 4/2002 | McPheters | |
| 6,377,321 B1 | 4/2002 | Khan et al. | |
| 6,388,797 B1 | 5/2002 | Lipton et al. | |
| 6,392,812 B1 | 5/2002 | Howard | |
| 6,409,687 B1 | 6/2002 | Foxlin | |
| 6,411,444 B1 | 6/2002 | Moskovich et al. | |
| 6,414,760 B1 | 7/2002 | Lopez et al. | |
| 6,417,971 B1 | 7/2002 | Moskovich et al. | |
| 6,437,563 B1 | 8/2002 | Simmonds et al. | |
| 6,445,512 B1 | 9/2002 | Moskovich et al. | |
| 6,470,132 B1 | 10/2002 | Nousiainen et al. | |
| 6,473,209 B1 | 10/2002 | Popovich | |
| 6,476,974 B1 | 11/2002 | Kreitzer et al. | |
| 6,483,303 B2 | 11/2002 | Simmonds et al. | |
| 6,486,997 B1 | 11/2002 | Bruzzone et al. | |
| 6,504,518 B1 | 1/2003 | Kuwayama et al. | |
| 6,504,629 B1 | 1/2003 | Popovich et al. | |
| 6,509,937 B1 | 1/2003 | Moskovich et al. | |
| 6,518,747 B2 | 2/2003 | Sager et al. | |
| 6,519,088 B1 | 2/2003 | Lipton | |
| 6,522,794 B1 | 2/2003 | Bischel et al. | |
| 6,524,771 B2 | 2/2003 | Maeda et al. | |
| 6,529,336 B1 | 3/2003 | Kreitzer et al. | |
| 6,534,977 B1 | 3/2003 | Duncan et al. | |
| 6,545,778 B2 | 4/2003 | Ono et al. | |
| 6,550,949 B1 | 4/2003 | Bauer et al. | |
| 6,552,789 B1 | 4/2003 | Modro | |
| 6,557,413 B2 | 5/2003 | Nieminen et al. | |
| 6,559,813 B1 | 5/2003 | DeLuca et al. | |
| 6,563,648 B2 | 5/2003 | Gleckman et al. | |
| 6,563,650 B2 | 5/2003 | Moskovich et al. | |
| 6,567,014 B1 | 5/2003 | Hansen et al. | |
| 6,567,573 B1 | 5/2003 | Domash et al. | |
| 6,577,411 B1 | 6/2003 | David et al. | |
| 6,577,429 B1 | 6/2003 | Kurtz et al. | |
| 6,580,529 B1 | 6/2003 | Amitai et al. | |
| 6,583,838 B1 | 6/2003 | Hoke et al. | |
| 6,583,873 B1 | 6/2003 | Goncharov et al. | |
| 6,587,619 B1 | 7/2003 | Kinoshita | |
| 6,594,090 B2 | 7/2003 | Kruschwitz et al. | |
| 6,597,176 B2 | 7/2003 | Simmonds et al. | |
| 6,597,475 B1 | 7/2003 | Shirakura et al. | |
| 6,598,987 B1 | 7/2003 | Parikka | |
| 6,600,590 B2 | 7/2003 | Roddy et al. | |
| 6,608,720 B1 | 8/2003 | Freeman | |
| 6,611,253 B1 | 8/2003 | Cohen | |
| 6,618,104 B1 | 9/2003 | Date et al. | |
| 6,625,381 B2 | 9/2003 | Roddy et al. | |
| 6,646,772 B1 | 11/2003 | Popovich et al. | |
| 6,646,810 B2 | 11/2003 | Harter, Jr. et al. | |
| 6,661,578 B2 | 12/2003 | Hedrick | |
| 6,667,134 B1 | 12/2003 | Sutherland et al. | |
| 6,674,578 B2 | 1/2004 | Sugiyama et al. | |
| 6,677,086 B1 | 1/2004 | Sutehrland et al. | |
| 6,686,815 B1 | 2/2004 | Mirshekarl-Syahkal et al. | |
| 6,690,516 B2 | 2/2004 | Aritake et al. | |
| 6,692,666 B2 | 2/2004 | Sutherland et al. | |
| 6,699,407 B1 | 3/2004 | Sutehrland et al. | |
| 6,706,086 B2 | 3/2004 | Emig et al. | |
| 6,706,451 B1 | 3/2004 | Sutherland et al. | |
| 6,721,096 B2 | 4/2004 | Bruzzone et al. | |
| 6,730,442 B1 | 5/2004 | Sutherland et al. | |
| 6,731,434 B1 | 5/2004 | Hua et al. | |
| 6,738,105 B1 | 5/2004 | Hannah et al. | |
| 6,741,189 B1 | 5/2004 | Gibbons, II et al. | |
| 6,744,478 B1 | 6/2004 | Asakura et al. | |
| 6,747,781 B2 | 6/2004 | Trisnadi et al. | |
| 6,748,342 B1 | 6/2004 | Dickhaus | |
| 6,750,941 B2 | 6/2004 | Satoh et al. | |
| 6,750,995 B2 | 6/2004 | Dickson | |
| 6,757,105 B2 | 6/2004 | Niv et al. | |
| 6,771,403 B1 | 8/2004 | Endo et al. | |
| 6,776,339 B2 | 8/2004 | Piikivi | |
| 6,781,701 B1 | 8/2004 | Sweetser et al. | |
| 6,791,629 B2 | 9/2004 | Moskovich et al. | |
| 6,791,739 B2 | 9/2004 | Ramanujan et al. | |
| 6,804,066 B1 | 10/2004 | Ha et al. | |
| 6,805,490 B2 | 10/2004 | Levola | |
| 6,821,457 B1 | 11/2004 | Natarajan et al. | |
| 6,822,713 B1 | 11/2004 | Yaroshchuk et al. | |
| 6,825,987 B2 | 11/2004 | Repetto et al. | |
| 6,829,095 B2 | 12/2004 | Amitai | |
| 6,830,789 B2 | 12/2004 | Doane et al. | |
| 6,833,955 B2 | 12/2004 | Niv | |
| 6,836,369 B2 | 12/2004 | Fujikawa et al. | |
| 6,844,212 B2 | 1/2005 | Bond et al. | |
| 6,844,980 B2 | 1/2005 | He et al. | |
| 6,847,274 B2 | 1/2005 | Salmela et al. | |
| 6,847,488 B2 | 1/2005 | Travis | |
| 6,850,210 B1 | 2/2005 | Lipton et al. | |
| 6,853,491 B1 | 2/2005 | Ruhle et al. | |
| 6,853,493 B2 | 2/2005 | Kreitzer et al. | |
| 6,864,861 B2 | 3/2005 | Schehrer et al. | |
| 6,864,927 B1 | 3/2005 | Cathey | |
| 6,867,888 B2 | 3/2005 | Sutherland et al. | |
| 6,873,443 B1 | 3/2005 | Joubert et al. | |
| 6,878,494 B2 | 4/2005 | Sutehrland et al. | |
| 6,885,483 B2 | 4/2005 | Takada | |
| 6,903,872 B2 | 6/2005 | Schrader | |
| 6,909,345 B1 | 6/2005 | Salmela et al. | |

(56) References Cited

U.S. PATENT DOCUMENTS

| | | |
|---|---|---|
| 6,917,375 B2 | 7/2005 | Akada et al. |
| 6,922,267 B2 | 7/2005 | Endo et al. |
| 6,926,429 B2 | 8/2005 | Barlow et al. |
| 6,927,570 B2 | 8/2005 | Simmonds et al. |
| 6,927,694 B1 | 8/2005 | Smith et al. |
| 6,940,361 B1 | 9/2005 | Jokio et al. |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,952,435 B2 | 10/2005 | Lai et al. |
| 6,958,662 B1 | 10/2005 | Salmela et al. |
| 6,958,868 B1 | 10/2005 | Pender |
| 6,963,454 B1 | 11/2005 | Martins et al. |
| 6,972,788 B1 | 12/2005 | Robertson et al. |
| 6,975,345 B1 | 12/2005 | Lipton et al. |
| 6,980,365 B2 | 12/2005 | Moskovich |
| 6,985,296 B2 | 1/2006 | Lipton et al. |
| 6,987,908 B2 | 1/2006 | Bond et al. |
| 6,999,239 B1 | 2/2006 | Martins et al. |
| 7,002,618 B2 | 2/2006 | Lipton et al. |
| 7,002,753 B2 | 2/2006 | Moskovich et al. |
| 7,003,187 B2 | 2/2006 | Frick et al. |
| 7,009,773 B2 | 3/2006 | Chaoulov et al. |
| 7,018,563 B1 | 3/2006 | Sutherland et al. |
| 7,018,686 B2 | 3/2006 | Sutehrland et al. |
| 7,018,744 B2 | 3/2006 | Otaki et al. |
| 7,019,793 B2 | 3/2006 | Moskovich et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,046,439 B2 | 5/2006 | Kaminsky et al. |
| 7,053,735 B2 | 5/2006 | Salmela et al. |
| 7,053,991 B2 | 5/2006 | Sandusky |
| 7,054,045 B2 | 5/2006 | McPheters et al. |
| 7,058,434 B2 | 6/2006 | Wang et al. |
| 7,068,405 B2 | 6/2006 | Sutherland et al. |
| 7,068,898 B2 | 6/2006 | Buretea et al. |
| 7,072,020 B1 | 7/2006 | Sutherland et al. |
| 7,075,273 B2 | 7/2006 | O'Gorman et al. |
| 7,077,984 B1 | 7/2006 | Natarajan et al. |
| 7,081,215 B2 | 7/2006 | Natarajan et al. |
| 7,088,457 B1 | 8/2006 | Zou et al. |
| 7,088,515 B2 | 8/2006 | Lipton |
| 7,095,562 B1 | 8/2006 | Peng et al. |
| 7,099,080 B2 | 8/2006 | Lipton et al. |
| 7,101,048 B2 | 9/2006 | Travis |
| 7,108,383 B1 | 9/2006 | Mitchell et al. |
| 7,110,184 B1 | 9/2006 | Yona et al. |
| 7,119,965 B1 | 10/2006 | Rolland et al. |
| 7,123,418 B2 | 10/2006 | Weber et al. |
| 7,123,421 B1 | 10/2006 | Moskovich et al. |
| 7,126,418 B2 | 10/2006 | Hunton et al. |
| 7,126,583 B1 | 10/2006 | Breed |
| 7,132,200 B1 | 11/2006 | Ueda et al. |
| 7,133,084 B2 | 11/2006 | Moskovich et al. |
| 7,139,109 B2 | 11/2006 | Mukawa |
| RE39,424 E | 12/2006 | Moskovich |
| 7,145,729 B2 | 12/2006 | Kreitzer et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,167,286 B2 | 1/2007 | Anderson et al. |
| 7,175,780 B1 | 2/2007 | Sutherland et al. |
| 7,181,105 B2 | 2/2007 | Teramura et al. |
| 7,181,108 B2 | 2/2007 | Levola |
| 7,184,002 B2 | 2/2007 | Lipton et al. |
| 7,184,615 B2 | 2/2007 | Levola |
| 7,186,567 B1 | 3/2007 | Sutherland et al. |
| 7,190,849 B2 | 3/2007 | Katase |
| 7,198,737 B2 | 4/2007 | Natarajan et al. |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,212,175 B1 | 5/2007 | Magee et al. |
| 7,230,767 B2 | 6/2007 | Walck et al. |
| 7,230,770 B2 | 6/2007 | Kreitzer et al. |
| 7,242,527 B2 | 7/2007 | Spitzer et al. |
| 7,248,128 B2 | 7/2007 | Mattila et al. |
| 7,256,915 B2 | 8/2007 | Sutherland et al. |
| 7,259,906 B1 | 8/2007 | Islam |
| 7,265,882 B2 | 9/2007 | Sutherland et al. |
| 7,265,903 B2 | 9/2007 | Sutherland et al. |
| 7,268,946 B2 | 9/2007 | Wang |
| 7,285,903 B2 | 10/2007 | Cull et al. |
| 7,286,272 B2 | 10/2007 | Mukawa |
| 7,289,069 B2 | 10/2007 | Ranta |
| RE39,911 E | 11/2007 | Moskovich |
| 7,299,983 B2 | 11/2007 | Piikivi |
| 7,301,601 B2 | 11/2007 | Lin et al. |
| 7,312,906 B2 | 12/2007 | Sutherland et al. |
| 7,313,291 B2 | 12/2007 | Okhotnikov et al. |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,333,685 B2 | 2/2008 | Stone et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,369,911 B1 | 5/2008 | Volant et al. |
| 7,375,870 B2 | 5/2008 | Schorpp |
| 7,375,886 B2 | 5/2008 | Lipton et al. |
| 7,391,573 B2 | 6/2008 | Amitai |
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,413,678 B1 | 8/2008 | Natarajan et al. |
| 7,413,679 B1 | 8/2008 | Sutherland et al. |
| 7,415,173 B2 | 8/2008 | Kassamakov et al. |
| 7,416,818 B2 | 8/2008 | Sutherland et al. |
| 7,418,170 B2 | 8/2008 | Mukawa et al. |
| 7,420,733 B1 | 9/2008 | Natarajan et al. |
| 7,433,116 B1 | 10/2008 | Islam |
| 7,436,568 B1 | 10/2008 | Kuykendall |
| 7,447,967 B2 | 11/2008 | Onggosanusi et al. |
| 7,453,612 B2 | 11/2008 | Mukawa |
| 7,454,103 B2 | 11/2008 | Parriaux |
| 7,457,040 B2 | 11/2008 | Amitai |
| 7,466,994 B2 | 12/2008 | Pihlaja et al. |
| 7,477,206 B2 | 1/2009 | Cowan et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,499,217 B2 | 3/2009 | Cakmakci et al. |
| 7,500,104 B2 | 3/2009 | Goland |
| 7,511,891 B2 | 3/2009 | Messerschmidt et al. |
| 7,513,668 B1 | 4/2009 | Peng et al. |
| 7,522,344 B1 | 4/2009 | Curatu et al. |
| 7,525,448 B1 | 4/2009 | Wilson et al. |
| 7,528,385 B2 | 5/2009 | Volodin et al. |
| 7,545,429 B2 | 6/2009 | Travis |
| 7,550,234 B2 | 6/2009 | Otaki et al. |
| 7,567,372 B2 | 7/2009 | Schorpp |
| 7,570,322 B1 | 8/2009 | Sutherland et al. |
| 7,570,405 B1 | 8/2009 | Sutherland et al. |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,583,423 B2 | 9/2009 | Sutherland et al. |
| 7,588,863 B2 | 9/2009 | Takizawa et al. |
| 7,589,900 B1 | 9/2009 | Powell |
| 7,589,901 B2 | 9/2009 | DeJong et al. |

(56) References Cited

U.S. PATENT DOCUMENTS

| | | |
|---|---|---|
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,605,719 B1 | 10/2009 | Wenger et al. |
| 7,605,774 B1 | 10/2009 | Brandt et al. |
| 7,605,882 B1 | 10/2009 | Sutherland et al. |
| 7,616,270 B2 | 11/2009 | Hirabayashi et al. |
| 7,617,022 B1 | 11/2009 | Wood et al. |
| 7,618,750 B2 | 11/2009 | Ueda et al. |
| 7,619,739 B1 | 11/2009 | Sutherland et al. |
| 7,619,825 B1 | 11/2009 | Peng et al. |
| 7,629,086 B2 | 12/2009 | Otaki et al. |
| 7,639,208 B1 | 12/2009 | Ha et al. |
| 7,639,911 B2 | 12/2009 | Lee et al. |
| 7,643,214 B2 | 1/2010 | Amitai |
| 7,656,585 B1 | 2/2010 | Powell et al. |
| 7,660,047 B1 | 2/2010 | Travis et al. |
| 7,672,055 B2 | 3/2010 | Amitai |
| 7,672,549 B2 | 3/2010 | Ghosh et al. |
| 7,710,622 B2 | 5/2010 | Takabayashi et al. |
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,571 B1 | 6/2010 | Li |
| 7,733,572 B1 | 6/2010 | Brown et al. |
| 7,740,387 B2 | 6/2010 | Schultz et al. |
| 7,747,113 B2 | 6/2010 | Mukawa et al. |
| 7,751,122 B2 | 7/2010 | Amitai |
| 7,751,662 B2 | 7/2010 | Kleemann et al. |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,843,642 B2 | 11/2010 | Shaoulov et al. |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,866,869 B2 | 1/2011 | Karakawa |
| 7,872,707 B1 | 1/2011 | Sutherland et al. |
| 7,872,804 B2 | 1/2011 | Moon et al. |
| 7,884,593 B2 | 2/2011 | Simmonds et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,928,862 B1 | 4/2011 | Matthews |
| 7,936,519 B2 | 5/2011 | Mukawa et al. |
| 7,944,428 B2 | 5/2011 | Travis |
| 7,944,616 B2 | 5/2011 | Mukawa |
| 7,949,214 B2 | 5/2011 | DeJong et al. |
| 7,961,117 B1 | 6/2011 | Zimmerman et al. |
| 7,969,644 B2 | 6/2011 | Tilleman et al. |
| 7,969,657 B2 | 6/2011 | Cakmakci et al. |
| 7,970,246 B2 | 6/2011 | Travis et al. |
| 7,976,208 B2 | 7/2011 | Travis |
| 7,984,884 B1 | 7/2011 | Iliev et al. |
| 7,999,982 B2 | 8/2011 | Endo et al. |
| 8,000,020 B2 | 8/2011 | Amitai et al. |
| 8,000,491 B2 | 8/2011 | Brodkin et al. |
| 8,004,765 B2 | 8/2011 | Amitai |
| 8,014,050 B2 | 9/2011 | McGrew |
| 8,016,475 B2 | 9/2011 | Travis |
| 8,018,579 B1 | 9/2011 | Krah |
| 8,022,942 B2 | 9/2011 | Bathiche et al. |
| 8,023,783 B2 | 9/2011 | Mukawa et al. |
| RE42,992 E | 12/2011 | David |
| 8,073,296 B2 | 12/2011 | Mukawa et al. |
| 8,077,274 B2 | 12/2011 | Sutherland et al. |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,093,451 B2 | 1/2012 | Spangenberg et al. |
| 8,098,439 B2 | 1/2012 | Amitai et al. |
| 8,107,023 B2 | 1/2012 | Simmonds et al. |
| 8,107,780 B2 | 1/2012 | Simmonds |
| 8,120,548 B1 | 2/2012 | Barber |
| 8,132,948 B2 | 3/2012 | Owen et al. |
| 8,132,976 B2 | 3/2012 | Odell et al. |
| 8,134,434 B2 | 3/2012 | Diederichs et al. |
| 8,136,690 B2 | 3/2012 | Fang et al. |
| 8,137,981 B2 | 3/2012 | Andrew et al. |
| 8,142,016 B2 | 3/2012 | Legerton et al. |
| 8,149,086 B2 | 4/2012 | Klein et al. |
| 8,152,315 B2 | 4/2012 | Travis et al. |
| 8,155,489 B2 | 4/2012 | Saarikko et al. |
| 8,159,752 B2 | 4/2012 | Wertheim et al. |
| 8,160,409 B2 | 4/2012 | Large |
| 8,160,411 B2 | 4/2012 | Levola et al. |
| 8,167,173 B1 | 5/2012 | Simmonds et al. |
| 8,186,874 B2 | 5/2012 | Sinbar et al. |
| 8,188,925 B2 | 5/2012 | DeJean |
| 8,189,263 B1 | 5/2012 | Wang et al. |
| 8,189,973 B2 | 5/2012 | Travis et al. |
| 8,194,325 B2 | 6/2012 | Levola et al. |
| 8,199,803 B2 | 6/2012 | Hauske et al. |
| 8,213,065 B2 | 7/2012 | Mukawa |
| 8,213,755 B2 | 7/2012 | Mukawa et al. |
| 8,220,966 B2 | 7/2012 | Mukawa |
| 8,224,133 B2 | 7/2012 | Popovich et al. |
| 8,233,204 B1 | 7/2012 | Robbins et al. |
| 8,253,914 B2 | 8/2012 | Kajiya et al. |
| 8,254,031 B2 | 8/2012 | Levola |
| 8,264,498 B1 | 9/2012 | Vanderkamp et al. |
| 8,294,749 B2 | 10/2012 | Cable |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,310,327 B2 | 11/2012 | Willers et al. |
| 8,314,819 B2 | 11/2012 | Kimmel et al. |
| 8,314,993 B2 | 11/2012 | Levola et al. |
| 8,320,032 B2 | 11/2012 | Levola |
| 8,321,810 B2 | 11/2012 | Heintze |
| 8,325,166 B2 | 12/2012 | Akutsu et al. |
| 8,329,773 B2 | 12/2012 | Fäcke et al. |
| 8,335,040 B2 | 12/2012 | Mukawa et al. |
| 8,351,744 B2 | 1/2013 | Travis et al. |
| 8,354,640 B2 | 1/2013 | Hamre et al. |
| 8,354,806 B2 | 1/2013 | Travis et al. |
| 8,355,610 B2 | 1/2013 | Simmonds |
| 8,369,019 B2 | 2/2013 | Baker et al. |
| 8,376,548 B2 | 2/2013 | Schultz |
| 8,382,293 B2 | 2/2013 | Phillips, III et al. |
| 8,384,504 B2 | 2/2013 | Diederichs et al. |
| 8,384,694 B2 | 2/2013 | Powell et al. |
| 8,384,730 B1 | 2/2013 | Vanderkamp et al. |
| 8,396,339 B2 | 3/2013 | Mukawa et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,432,614 B2 | 4/2013 | Amitai |
| 8,441,731 B2 | 5/2013 | Sprague |
| 8,447,365 B1 | 5/2013 | Imanuel |
| 8,466,953 B2 | 6/2013 | Levola et al. |
| 8,472,119 B1 | 6/2013 | Kelly |
| 8,472,120 B2 | 6/2013 | Border et al. |
| 8,477,261 B2 | 7/2013 | Travis et al. |
| 8,481,130 B2 | 7/2013 | Harding et al. |
| 8,482,858 B2 | 7/2013 | Sprague |
| 8,488,246 B2 | 7/2013 | Border et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,662 B2 | 7/2013 | Noui |
| 8,494,229 B2 | 7/2013 | Järvenpää et al. |

(56) References Cited

U.S. PATENT DOCUMENTS

| | | |
|---|---|---|
| 8,508,848 B2 | 8/2013 | Saarikko |
| 8,520,309 B2 | 8/2013 | Sprague |
| 8,547,638 B2 | 10/2013 | Levola |
| 8,548,290 B2 | 10/2013 | Travers et al. |
| 8,565,560 B2 | 10/2013 | Popovich et al. |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| 8,633,786 B2 | 1/2014 | Ermolov et al. |
| 8,634,120 B2 | 1/2014 | Popovich et al. |
| 8,634,139 B1 | 1/2014 | Brown et al. |
| 8,639,072 B2 | 1/2014 | Popovich et al. |
| 8,643,691 B2 | 2/2014 | Rosenfeld et al. |
| 8,643,948 B2 | 2/2014 | Amitai et al. |
| 8,649,099 B2 | 2/2014 | Schultz et al. |
| 8,654,420 B2 | 2/2014 | Simmonds |
| 8,659,826 B1 | 2/2014 | Brown et al. |
| D701,206 S | 3/2014 | Luckey et al. |
| 8,670,029 B2 | 3/2014 | McEldowney |
| 8,693,087 B2 | 4/2014 | Nowatzyk et al. |
| 8,698,705 B2 | 4/2014 | Burke et al. |
| 8,731,350 B1 | 5/2014 | Lin et al. |
| 8,736,802 B2 | 5/2014 | Kajiya et al. |
| 8,736,963 B2 | 5/2014 | Robbins et al. |
| 8,742,952 B1 | 6/2014 | Bold |
| 8,746,008 B1 | 6/2014 | Mauritsen et al. |
| 8,749,886 B2 | 6/2014 | Gupta |
| 8,749,890 B1 | 6/2014 | Wood et al. |
| 8,767,294 B2 | 7/2014 | Chen et al. |
| 8,786,923 B2 | 7/2014 | Chuang et al. |
| 8,810,600 B2 | 8/2014 | Bohn et al. |
| 8,810,913 B2 | 8/2014 | Simmonds et al. |
| 8,810,914 B2 | 8/2014 | Amitai |
| 8,814,691 B2 | 8/2014 | Haddick et al. |
| 8,816,578 B1 | 8/2014 | Peng et al. |
| 8,817,350 B1 | 8/2014 | Robbins et al. |
| 8,824,836 B2 | 9/2014 | Sugiyama et al. |
| 8,830,143 B1 | 9/2014 | Pitchford et al. |
| 8,830,584 B2 | 9/2014 | Saarikko et al. |
| 8,830,588 B1 | 9/2014 | Brown et al. |
| 8,842,368 B2 | 9/2014 | Simmonds et al. |
| 8,859,412 B2 | 10/2014 | Jain |
| 8,872,435 B2 | 10/2014 | Kreitzer et al. |
| 8,873,149 B2 | 10/2014 | Bohn et al. |
| 8,873,150 B2 | 10/2014 | Amitai |
| 8,885,112 B2 | 11/2014 | Popovich et al. |
| 8,885,997 B2 | 11/2014 | Nguyen et al. |
| 8,903,207 B1 | 12/2014 | Brown et al. |
| 8,906,088 B2 | 12/2014 | Pugh et al. |
| 8,913,324 B2 | 12/2014 | Schrader |
| 8,913,865 B1 | 12/2014 | Bennett |
| 8,917,453 B2 | 12/2014 | Bohn et al. |
| 8,937,771 B2 | 1/2015 | Robbins et al. |
| 8,937,772 B1 | 1/2015 | Burns et al. |
| 8,938,141 B2 | 1/2015 | Magnusson |
| 8,950,867 B2 | 2/2015 | Macnamara |
| 8,964,298 B2 | 2/2015 | Haddick et al. |
| 8,965,152 B2 | 2/2015 | Simmonds |
| 8,985,803 B2 | 3/2015 | Bohn et al. |
| 8,989,535 B2 | 3/2015 | Robbins |
| 9,019,595 B2 | 4/2015 | Jain |
| 9,025,253 B2 | 5/2015 | Hadad et al. |
| 9,035,344 B2 | 5/2015 | Jain |
| 9,075,184 B2 | 7/2015 | Popovich et al. |
| 9,081,178 B2 | 7/2015 | Simmonds et al. |
| 9,097,890 B2 | 8/2015 | Miller et al. |
| 9,128,226 B2 | 9/2015 | Fattal et al. |
| 9,129,295 B2 | 9/2015 | Border et al. |
| 9,164,290 B2 | 10/2015 | Robbins et al. |
| 9,176,324 B1 | 11/2015 | Scherer et al. |
| 9,201,270 B2 | 12/2015 | Fattal et al. |
| 9,215,293 B2 | 12/2015 | Miller |
| 9,244,275 B1 | 1/2016 | Li |
| 9,244,280 B1 | 1/2016 | Tiana et al. |
| 9,244,281 B1 | 1/2016 | Zimmerman et al. |
| 9,269,854 B2 | 2/2016 | Jain |
| 9,274,338 B2 | 3/2016 | Robbins et al. |
| 9,274,339 B1 | 3/2016 | Brown et al. |
| 9,310,566 B2 | 4/2016 | Valera et al. |
| 9,329,325 B2 | 5/2016 | Simmonds et al. |
| 9,335,604 B2 | 5/2016 | Popovich et al. |
| 9,341,846 B2 | 5/2016 | Popovich et al. |
| 9,354,366 B2 | 5/2016 | Jain |
| 9,366,862 B2 | 6/2016 | Haddick et al. |
| 9,366,864 B1 | 6/2016 | Brown et al. |
| 9,372,347 B1 | 6/2016 | Levola et al. |
| 9,377,623 B2 | 6/2016 | Robbins et al. |
| 9,377,852 B1 | 6/2016 | Shapiro et al. |
| 9,389,415 B2 | 7/2016 | Fattal et al. |
| 9,400,395 B2 | 7/2016 | Travers et al. |
| 9,423,360 B1 | 8/2016 | Kostamo et al. |
| 9,429,692 B1 | 8/2016 | Saarikko et al. |
| 9,431,794 B2 | 8/2016 | Jain |
| 9,456,744 B2 | 10/2016 | Popovich et al. |
| 9,459,451 B2 | 10/2016 | Saarikko et al. |
| 9,464,779 B2 | 10/2016 | Popovich et al. |
| 9,465,213 B2 | 10/2016 | Simmonds |
| 9,465,227 B2 | 10/2016 | Popovich et al. |
| 9,494,799 B2 | 11/2016 | Robbins et al. |
| 9,507,150 B1 | 11/2016 | Stratton et al. |
| 9,513,480 B2 | 12/2016 | Saarikko et al. |
| 9,519,089 B1 | 12/2016 | Brown et al. |
| 9,523,852 B1 | 12/2016 | Brown et al. |
| 9,535,253 B2 | 1/2017 | Levola et al. |
| 9,541,383 B2 | 1/2017 | Abovitz et al. |
| 9,541,763 B1 | 1/2017 | Heberlein et al. |
| 9,547,174 B2 | 1/2017 | Gao et al. |
| 9,551,874 B2 | 1/2017 | Amitai et al. |
| 9,551,880 B2 | 1/2017 | Amitai et al. |
| 9,599,813 B1 | 3/2017 | Stratton et al. |
| 9,612,403 B2 | 4/2017 | Abovitz et al. |
| 9,632,226 B2 | 4/2017 | Waldern et al. |
| 9,635,352 B1 | 4/2017 | Henry et al. |
| 9,648,313 B1 | 5/2017 | Henry et al. |
| 9,651,368 B2 | 5/2017 | Abovitz et al. |
| 9,664,824 B2 | 5/2017 | Simmonds et al. |
| 9,664,910 B2 | 5/2017 | Mansharof et al. |
| 9,674,413 B1 | 6/2017 | Tiana et al. |
| 9,678,345 B1 | 6/2017 | Melzer et al. |
| 9,679,367 B1 | 6/2017 | Wald |
| 9,715,067 B1 | 7/2017 | Brown et al. |
| 9,715,110 B1 | 7/2017 | Brown et al. |
| 9,726,540 B2 | 8/2017 | Popovich et al. |
| 9,727,772 B2 | 8/2017 | Popovich et al. |
| 9,733,475 B1 | 8/2017 | Brown et al. |
| 9,746,688 B2 | 8/2017 | Popovich et al. |
| 9,754,507 B1 | 9/2017 | Wenger et al. |
| 9,762,895 B1 | 9/2017 | Henry et al. |
| 9,766,465 B1 | 9/2017 | Tiana et al. |
| 9,785,231 B1 | 10/2017 | Zimmerman |
| 9,791,694 B1 | 10/2017 | Haverkamp et al. |
| 9,804,389 B2 | 10/2017 | Popovich et al. |
| 9,823,423 B2 | 11/2017 | Waldern et al. |
| 9,874,931 B1 | 1/2018 | Koenck et al. |
| 9,933,684 B2 | 4/2018 | Brown et al. |
| 9,977,247 B1 | 5/2018 | Brown et al. |
| 10,089,516 B2 | 10/2018 | Popovich et al. |
| 10,156,681 B2 | 12/2018 | Waldern et al. |
| 10,185,154 B2 | 1/2019 | Popovich et al. |
| 2001/0024177 A1 | 9/2001 | Popovich |
| 2001/0043163 A1 | 11/2001 | Waldern et al. |
| 2001/0050756 A1 | 12/2001 | Lipton et al. |
| 2002/0003509 A1 | 1/2002 | Lipton et al. |
| 2002/0009299 A1 | 1/2002 | Lipton |
| 2002/0011969 A1 | 1/2002 | Lipton et al. |
| 2002/0012064 A1 | 1/2002 | Yamaguchi |
| 2002/0021461 A1 | 2/2002 | Ono et al. |
| 2002/0036825 A1 | 3/2002 | Lipton et al. |
| 2002/0047837 A1 | 4/2002 | Suyama et al. |
| 2002/0075240 A1 | 6/2002 | Lieberman et al. |
| 2002/0093701 A1 | 7/2002 | Zhang et al. |

(56) References Cited

U.S. PATENT DOCUMENTS

| | | |
|---|---|---|
| 2002/0110077 A1 | 8/2002 | Drobot et al. |
| 2002/0126332 A1 | 9/2002 | Popovich |
| 2002/0127497 A1 | 9/2002 | Brown et al. |
| 2002/0131175 A1 | 9/2002 | Yagi et al. |
| 2002/0196332 A1 | 12/2002 | Lipton et al. |
| 2003/0007070 A1 | 1/2003 | Lipton et al. |
| 2003/0030912 A1 | 2/2003 | Gleckman et al. |
| 2003/0038912 A1 | 2/2003 | Broer et al. |
| 2003/0039442 A1 | 2/2003 | Bond et al. |
| 2003/0063042 A1 | 4/2003 | Friesem et al. |
| 2003/0063884 A1 | 4/2003 | Smith et al. |
| 2003/0067685 A1 | 4/2003 | Niv |
| 2003/0086670 A1 | 5/2003 | Moridaira et al. |
| 2003/0107809 A1 | 6/2003 | Chen et al. |
| 2003/0149346 A1 | 8/2003 | Arnone et al. |
| 2003/0175004 A1 | 9/2003 | Garito et al. |
| 2003/0197154 A1 | 10/2003 | Manabe et al. |
| 2003/0197157 A1 | 10/2003 | Sutherland et al. |
| 2003/0202247 A1 | 10/2003 | Niv et al. |
| 2003/0228019 A1 | 12/2003 | Eichler et al. |
| 2004/0004767 A1 | 1/2004 | Song |
| 2004/0012833 A1 | 1/2004 | Newswanger et al. |
| 2004/0089842 A1 | 5/2004 | Sutehrland et al. |
| 2004/0109234 A1 | 6/2004 | Levola |
| 2004/0112862 A1 | 6/2004 | Willson et al. |
| 2004/0130797 A1 | 7/2004 | Leigh |
| 2004/0141217 A1 | 7/2004 | Endo et al. |
| 2004/0156008 A1 | 8/2004 | Reznikov et al. |
| 2004/0174348 A1 | 9/2004 | David |
| 2004/0175627 A1 | 9/2004 | Sutherland et al. |
| 2004/0179764 A1 | 9/2004 | Melikechi et al. |
| 2004/0188617 A1 | 9/2004 | Devitt et al. |
| 2004/0208446 A1 | 10/2004 | Bond et al. |
| 2004/0208466 A1 | 10/2004 | Mossberg et al. |
| 2004/0225025 A1 | 11/2004 | Sullivan et al. |
| 2004/0263969 A1 | 12/2004 | Lipton et al. |
| 2004/0263971 A1 | 12/2004 | Lipton et al. |
| 2005/0018304 A1 | 1/2005 | Lipton et al. |
| 2005/0079663 A1 | 4/2005 | Masutani et al. |
| 2005/0105909 A1 | 5/2005 | Stone |
| 2005/0122395 A1 | 6/2005 | Lipton et al. |
| 2005/0134404 A1 | 6/2005 | Kajiya et al. |
| 2005/0135747 A1 | 6/2005 | Greiner et al. |
| 2005/0136260 A1 | 6/2005 | Garcia |
| 2005/0141066 A1 | 6/2005 | Ouchi |
| 2005/0180687 A1 | 8/2005 | Amitai |
| 2005/0195276 A1 | 9/2005 | Lipton et al. |
| 2005/0218377 A1 | 10/2005 | Lawandy |
| 2005/0232530 A1 | 10/2005 | Kekas et al. |
| 2005/0259217 A1 | 11/2005 | Lin et al. |
| 2005/0259302 A9 | 11/2005 | Metz et al. |
| 2005/0265585 A1 | 12/2005 | Rowe |
| 2005/0269481 A1 | 12/2005 | David et al. |
| 2005/0271258 A1 | 12/2005 | Rowe |
| 2005/0286133 A1 | 12/2005 | Lipton |
| 2006/0012878 A1 | 1/2006 | Lipton et al. |
| 2006/0013977 A1 | 1/2006 | Duke et al. |
| 2006/0043938 A1 | 3/2006 | O'Gorman et al. |
| 2006/0055993 A1* | 3/2006 | Kobayashi ............ G03H 1/02 359/3 |
| 2006/0093793 A1 | 5/2006 | Miyakawa et al. |
| 2006/0114564 A1 | 6/2006 | Sutherland et al. |
| 2006/0119837 A1 | 6/2006 | Raguin et al. |
| 2006/0119916 A1 | 6/2006 | Sutherland et al. |
| 2006/0126179 A1 | 6/2006 | Levola |
| 2006/0132914 A1 | 6/2006 | Weiss et al. |
| 2006/0142455 A1 | 6/2006 | Agarwal et al. |
| 2006/0146422 A1 | 7/2006 | Koike |
| 2006/0159864 A1 | 7/2006 | Natarajan et al. |
| 2006/0164593 A1 | 7/2006 | Peyghambarian et al. |
| 2006/0171647 A1 | 8/2006 | Ye et al. |
| 2006/0177180 A1 | 8/2006 | Tazawa et al. |
| 2006/0191293 A1 | 8/2006 | Kuczma |
| 2006/0215244 A1 | 9/2006 | Yosha et al. |
| 2006/0221063 A1 | 10/2006 | Ishihara |
| 2006/0221448 A1 | 10/2006 | Nivon et al. |
| 2006/0228073 A1 | 10/2006 | Mukawa et al. |
| 2006/0268104 A1 | 11/2006 | Cowan et al. |
| 2006/0268412 A1 | 11/2006 | Downing et al. |
| 2006/0279662 A1 | 12/2006 | Kapellner et al. |
| 2006/0284974 A1 | 12/2006 | Lipton et al. |
| 2006/0285205 A1 | 12/2006 | Lipton et al. |
| 2006/0291021 A1 | 12/2006 | Mukawa |
| 2006/0291052 A1 | 12/2006 | Lipton et al. |
| 2007/0012777 A1 | 1/2007 | Tsikos et al. |
| 2007/0019152 A1 | 1/2007 | Caputo et al. |
| 2007/0019297 A1 | 1/2007 | Stewart et al. |
| 2007/0041684 A1 | 2/2007 | Popovich et al. |
| 2007/0045596 A1 | 3/2007 | King et al. |
| 2007/0052929 A1 | 3/2007 | Allman et al. |
| 2007/0064290 A1 | 3/2007 | Hochenbleicher et al. |
| 2007/0070476 A1 | 3/2007 | Yamada et al. |
| 2007/0070504 A1 | 3/2007 | Akutsu et al. |
| 2007/0089625 A1 | 4/2007 | Grinberg et al. |
| 2007/0097502 A1 | 5/2007 | Lipton et al. |
| 2007/0109401 A1 | 5/2007 | Lipton et al. |
| 2007/0116409 A1 | 5/2007 | Bryan et al. |
| 2007/0133089 A1 | 6/2007 | Lipton et al. |
| 2007/0133920 A1 | 6/2007 | Lee et al. |
| 2007/0133983 A1 | 6/2007 | Traff |
| 2007/0154153 A1 | 7/2007 | Fomitchov et al. |
| 2007/0160325 A1 | 7/2007 | Son et al. |
| 2007/0177007 A1 | 8/2007 | Lipton et al. |
| 2007/0182915 A1 | 8/2007 | Osawa et al. |
| 2007/0183650 A1 | 8/2007 | Lipton et al. |
| 2007/0188602 A1 | 8/2007 | Cowan et al. |
| 2007/0188837 A1 | 8/2007 | Shimizu et al. |
| 2007/0206155 A1 | 9/2007 | Lipton |
| 2007/0211164 A1 | 9/2007 | Olsen et al. |
| 2007/0236560 A1 | 10/2007 | Lipton et al. |
| 2007/0237456 A1 | 10/2007 | Blauvelt et al. |
| 2007/0247687 A1 | 10/2007 | Handschy et al. |
| 2007/0258138 A1 | 11/2007 | Cowan et al. |
| 2007/0263169 A1 | 11/2007 | Lipton |
| 2008/0001909 A1 | 1/2008 | Lim |
| 2008/0018851 A1 | 1/2008 | Lipton et al. |
| 2008/0024598 A1 | 1/2008 | Perlin et al. |
| 2008/0043334 A1 | 2/2008 | Itzkovitch et al. |
| 2008/0049100 A1 | 2/2008 | Lipton et al. |
| 2008/0062259 A1 | 3/2008 | Lipton et al. |
| 2008/0106775 A1 | 5/2008 | Amitai et al. |
| 2008/0106779 A1 | 5/2008 | Peterson et al. |
| 2008/0117289 A1 | 5/2008 | Schowengerdt et al. |
| 2008/0136916 A1 | 6/2008 | Wolff |
| 2008/0136923 A1 | 6/2008 | Inbar et al. |
| 2008/0138013 A1 | 6/2008 | Parriaux |
| 2008/0143964 A1 | 6/2008 | Cowan et al. |
| 2008/0143965 A1 | 6/2008 | Cowan et al. |
| 2008/0149517 A1 | 6/2008 | Lipton et al. |
| 2008/0151370 A1 | 6/2008 | Cook et al. |
| 2008/0151379 A1 | 6/2008 | Amitai |
| 2008/0186573 A1 | 8/2008 | Lipton |
| 2008/0186574 A1 | 8/2008 | Robinson et al. |
| 2008/0186604 A1 | 8/2008 | Amitai |
| 2008/0198471 A1 | 8/2008 | Amitai |
| 2008/0226281 A1 | 9/2008 | Lipton |
| 2008/0239067 A1 | 10/2008 | Lipton |
| 2008/0239068 A1 | 10/2008 | Lipton |
| 2008/0273081 A1 | 11/2008 | Lipton |
| 2008/0278812 A1 | 11/2008 | Amitai |
| 2008/0285137 A1 | 11/2008 | Simmonds et al. |
| 2008/0285140 A1 | 11/2008 | Amitai |
| 2008/0297731 A1 | 12/2008 | Powell et al. |
| 2008/0297807 A1 | 12/2008 | Feldman et al. |
| 2008/0298649 A1 | 12/2008 | Ennis et al. |
| 2008/0303895 A1 | 12/2008 | Akka et al. |
| 2008/0303896 A1 | 12/2008 | Lipton et al. |
| 2008/0304111 A1 | 12/2008 | Queenan et al. |
| 2008/0309586 A1 | 12/2008 | Vitale |
| 2008/0316303 A1 | 12/2008 | Chiu et al. |
| 2008/0316375 A1 | 12/2008 | Lipton et al. |
| 2009/0017424 A1 | 1/2009 | Yoeli et al. |
| 2009/0019222 A1 | 1/2009 | Verma et al. |
| 2009/0052017 A1 | 2/2009 | Sasaki |

(56) References Cited

U.S. PATENT DOCUMENTS

| | | |
|---|---|---|
| 2009/0052046 A1 | 2/2009 | Amitai |
| 2009/0052047 A1 | 2/2009 | Amitai |
| 2009/0067774 A1 | 3/2009 | Magnusson |
| 2009/0074356 A1 | 3/2009 | Sanchez et al. |
| 2009/0097122 A1 | 4/2009 | Niv |
| 2009/0097127 A1 | 4/2009 | Amitai |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128495 A1 | 5/2009 | Kong et al. |
| 2009/0128902 A1 | 5/2009 | Niv et al. |
| 2009/0128911 A1 | 5/2009 | Itzkovitch et al. |
| 2009/0136246 A1 | 5/2009 | Murakami |
| 2009/0141324 A1 | 6/2009 | Mukawa |
| 2009/0153437 A1 | 6/2009 | Aharoni |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0242021 A1 | 10/2009 | Petkie et al. |
| 2009/0296218 A1 | 12/2009 | Ryytty |
| 2009/0303599 A1 | 12/2009 | Levola |
| 2009/0316246 A1 | 12/2009 | Asai et al. |
| 2010/0014312 A1 | 1/2010 | Travis et al. |
| 2010/0039796 A1 | 2/2010 | Mukawa |
| 2010/0053565 A1 | 3/2010 | Mizushima et al. |
| 2010/0060551 A1 | 3/2010 | Sugiyama et al. |
| 2010/0060990 A1 | 3/2010 | Wertheim et al. |
| 2010/0073745 A1 | 3/2010 | Kumasawa et al. |
| 2010/0079865 A1 | 4/2010 | Saarikko et al. |
| 2010/0086256 A1 | 4/2010 | Ben Bakir et al. |
| 2010/0092124 A1 | 4/2010 | Magnusson et al. |
| 2010/0096562 A1 | 4/2010 | Klunder et al. |
| 2010/0097674 A1 | 4/2010 | Kasazumi et al. |
| 2010/0097820 A1 | 4/2010 | Owen et al. |
| 2010/0103078 A1 | 4/2010 | Mukawa et al. |
| 2010/0134534 A1 | 6/2010 | Seesselberg et al. |
| 2010/0136319 A1 | 6/2010 | Imai et al. |
| 2010/0141555 A1 | 6/2010 | Rorberg et al. |
| 2010/0149073 A1 | 6/2010 | Chaum et al. |
| 2010/0165465 A1 | 7/2010 | Levola |
| 2010/0165660 A1 | 7/2010 | Weber et al. |
| 2010/0171680 A1 | 7/2010 | Lapidot et al. |
| 2010/0177388 A1 | 7/2010 | Cohen et al. |
| 2010/0214659 A1 | 8/2010 | Levola |
| 2010/0220293 A1 | 9/2010 | Mizushima et al. |
| 2010/0231532 A1 | 9/2010 | Nho et al. |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0246003 A1 | 9/2010 | Simmonds et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0284090 A1 | 11/2010 | Simmonds et al. |
| 2010/0284180 A1 | 11/2010 | Popovich et al. |
| 2010/0296163 A1 | 11/2010 | Saarikko |
| 2010/0299814 A1 | 12/2010 | Celona et al. |
| 2010/0315719 A1 | 12/2010 | Saarikko et al. |
| 2010/0321781 A1 | 12/2010 | Levola et al. |
| 2011/0001895 A1 | 1/2011 | Dahl |
| 2011/0002143 A1 | 1/2011 | Saarikko et al. |
| 2011/0013423 A1 | 1/2011 | Selbrede et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0032602 A1 | 2/2011 | Rothenberg et al. |
| 2011/0032618 A1 | 2/2011 | Handerek et al. |
| 2011/0032706 A1 | 2/2011 | Mukawa |
| 2011/0038024 A1 | 2/2011 | Wang et al. |
| 2011/0050548 A1 | 3/2011 | Blumenfeld et al. |
| 2011/0063604 A1 | 3/2011 | Hamre et al. |
| 2011/0096401 A1 | 4/2011 | Levola |
| 2011/0102711 A1 | 5/2011 | Sutherland et al. |
| 2011/0109880 A1 | 5/2011 | Nummela |
| 2011/0157707 A1 | 6/2011 | Tilleman et al. |
| 2011/0164221 A1 | 7/2011 | Tilleman et al. |
| 2011/0187293 A1 | 8/2011 | Travis et al. |
| 2011/0211239 A1 | 9/2011 | Mukawa et al. |
| 2011/0235179 A1 | 9/2011 | Simmonds |
| 2011/0235365 A1 | 9/2011 | McCollum et al. |
| 2011/0236803 A1 | 9/2011 | Weiser et al. |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2011/0249309 A1 | 10/2011 | McPheters et al. |
| 2011/0274435 A1 | 11/2011 | Fini et al. |
| 2011/0299075 A1 | 12/2011 | Meade et al. |
| 2011/0310356 A1 | 12/2011 | Vallius |
| 2012/0007979 A1 | 1/2012 | Schneider et al. |
| 2012/0027347 A1 | 2/2012 | Mathal et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0062998 A1 | 3/2012 | Schultz et al. |
| 2012/0075168 A1 | 3/2012 | Osterhout et al. |
| 2012/0081789 A1 | 4/2012 | Mukawa et al. |
| 2012/0092632 A1 | 4/2012 | McLeod et al. |
| 2012/0099203 A1 | 4/2012 | Boubis et al. |
| 2012/0105634 A1 | 5/2012 | Meidan et al. |
| 2012/0120493 A1 | 5/2012 | Simmonds et al. |
| 2012/0127577 A1 | 5/2012 | Desserouer |
| 2012/0162549 A1 | 6/2012 | Gao et al. |
| 2012/0162764 A1 | 6/2012 | Shimizu |
| 2012/0176665 A1 | 7/2012 | Song et al. |
| 2012/0183888 A1 | 7/2012 | Oliveira et al. |
| 2012/0194420 A1 | 8/2012 | Osterhout et al. |
| 2012/0200532 A1 | 8/2012 | Powell et al. |
| 2012/0206811 A1 | 8/2012 | Mukawa et al. |
| 2012/0206937 A1 | 8/2012 | Travis et al. |
| 2012/0207432 A1 | 8/2012 | Travis et al. |
| 2012/0207434 A1 | 8/2012 | Large et al. |
| 2012/0214089 A1 | 8/2012 | Hönel et al. |
| 2012/0214090 A1 | 8/2012 | Weiser et al. |
| 2012/0218481 A1 | 8/2012 | Popovich et al. |
| 2012/0224062 A1 | 9/2012 | Lacoste et al. |
| 2012/0235884 A1 | 9/2012 | Miller et al. |
| 2012/0235886 A1 | 9/2012 | Border et al. |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0281943 A1 | 11/2012 | Popovich et al. |
| 2012/0290973 A1 | 11/2012 | Robertson et al. |
| 2012/0294037 A1 | 11/2012 | Holman et al. |
| 2012/0300311 A1 | 11/2012 | Simmonds et al. |
| 2012/0320460 A1 | 12/2012 | Levola |
| 2013/0016324 A1 | 1/2013 | Travis |
| 2013/0016362 A1 | 1/2013 | Gong et al. |
| 2013/0021392 A1 | 1/2013 | Travis |
| 2013/0021586 A1 | 1/2013 | Lippey |
| 2013/0033485 A1 | 2/2013 | Kollin et al. |
| 2013/0039619 A1 | 2/2013 | Laughlin et al. |
| 2013/0044376 A1 | 2/2013 | Valera et al. |
| 2013/0059233 A1 | 3/2013 | Askham |
| 2013/0069850 A1 | 3/2013 | Mukawa et al. |
| 2013/0077049 A1 | 3/2013 | Bohn |
| 2013/0093893 A1 | 4/2013 | Schofield et al. |
| 2013/0101253 A1 | 4/2013 | Popovich et al. |
| 2013/0117377 A1 | 5/2013 | Miller |
| 2013/0125027 A1 | 5/2013 | Abovitz et al. |
| 2013/0128230 A1 | 5/2013 | Macnamara |
| 2013/0138275 A1 | 5/2013 | Nauman et al. |
| 2013/0141937 A1 | 6/2013 | Katsuta et al. |
| 2013/0143336 A1 | 6/2013 | Jain |
| 2013/0163089 A1 | 6/2013 | Bohn et al. |
| 2013/0170031 A1 | 7/2013 | Bohn et al. |
| 2013/0176704 A1 | 7/2013 | Lanman et al. |
| 2013/0184904 A1 | 7/2013 | Gadzinski |
| 2013/0200710 A1 | 8/2013 | Robbins |
| 2013/0207887 A1 | 8/2013 | Raffle et al. |

(56) References Cited

U.S. PATENT DOCUMENTS

| | | |
|---|---|---|
| 2013/0224634 A1 | 8/2013 | Berneth et al. |
| 2013/0229717 A1 | 9/2013 | Amitai |
| 2013/0249895 A1 | 9/2013 | Westerinen et al. |
| 2013/0250207 A1 | 9/2013 | Bohn |
| 2013/0250430 A1 | 9/2013 | Robbins et al. |
| 2013/0250431 A1 | 9/2013 | Robbins et al. |
| 2013/0257848 A1 | 10/2013 | Westerinen et al. |
| 2013/0258701 A1 | 10/2013 | Westerinen et al. |
| 2013/0267309 A1 | 10/2013 | Robbins et al. |
| 2013/0271731 A1 | 10/2013 | Popovich et al. |
| 2013/0277890 A1 | 10/2013 | Bowman et al. |
| 2013/0305437 A1 | 11/2013 | Weller et al. |
| 2013/0312811 A1 | 11/2013 | Aspnes et al. |
| 2013/0314789 A1 | 11/2013 | Saarikko et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2013/0342525 A1 | 12/2013 | Benko et al. |
| 2014/0003762 A1 | 1/2014 | Macnamara |
| 2014/0009809 A1 | 1/2014 | Pyun et al. |
| 2014/0024159 A1 | 1/2014 | Jain |
| 2014/0027006 A1 | 1/2014 | Foley et al. |
| 2014/0037242 A1 | 2/2014 | Popovich et al. |
| 2014/0043689 A1 | 2/2014 | Mason |
| 2014/0055845 A1 | 2/2014 | Jain |
| 2014/0063055 A1 | 3/2014 | Osterhout et al. |
| 2014/0064655 A1 | 3/2014 | Nguyen et al. |
| 2014/0071538 A1 | 3/2014 | Muller |
| 2014/0098010 A1 | 4/2014 | Travis |
| 2014/0104665 A1 | 4/2014 | Popovich et al. |
| 2014/0104685 A1 | 4/2014 | Bohn et al. |
| 2014/0118647 A1 | 5/2014 | Momonoi et al. |
| 2014/0130132 A1 | 5/2014 | Cahill et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0160576 A1 | 6/2014 | Robbins et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0168783 A1 | 6/2014 | Luebke et al. |
| 2014/0172296 A1 | 6/2014 | Shtukater |
| 2014/0176528 A1 | 6/2014 | Robbins |
| 2014/0177023 A1 | 6/2014 | Gao et al. |
| 2014/0185286 A1 | 7/2014 | Popovich et al. |
| 2014/0198128 A1 | 7/2014 | Hong et al. |
| 2014/0204455 A1 | 7/2014 | Popovich et al. |
| 2014/0211322 A1 | 7/2014 | Bohn et al. |
| 2014/0218468 A1 | 8/2014 | Gao et al. |
| 2014/0218801 A1 | 8/2014 | Simmonds et al. |
| 2014/0232759 A1 | 8/2014 | Simmonds et al. |
| 2014/0240834 A1 | 8/2014 | Mason et al. |
| 2014/0240842 A1 | 8/2014 | Nguyen et al. |
| 2014/0267420 A1 | 9/2014 | Schowengerdt et al. |
| 2014/0300947 A1 | 10/2014 | Fattal et al. |
| 2014/0300960 A1 | 10/2014 | Santori et al. |
| 2014/0300966 A1 | 10/2014 | Travers et al. |
| 2014/0327970 A1 | 11/2014 | Bohn et al. |
| 2014/0330159 A1 | 11/2014 | Costa et al. |
| 2014/0367719 A1 | 12/2014 | Jain |
| 2014/0375542 A1 | 12/2014 | Robbins et al. |
| 2014/0375789 A1 | 12/2014 | Lou et al. |
| 2014/0375790 A1 | 12/2014 | Robbins et al. |
| 2015/0001677 A1 | 1/2015 | Palumbo et al. |
| 2015/0003796 A1 | 1/2015 | Bennett |
| 2015/0010265 A1 | 1/2015 | Popovich et al. |
| 2015/0015946 A1 | 1/2015 | Muller |
| 2015/0016777 A1 | 1/2015 | Abovitz et al. |
| 2015/0035744 A1 | 2/2015 | Robbins et al. |
| 2015/0036068 A1 | 2/2015 | Fattal et al. |
| 2015/0058791 A1 | 2/2015 | Robertson et al. |
| 2015/0062675 A1 | 3/2015 | Ayres et al. |
| 2015/0062707 A1 | 3/2015 | Simmonds et al. |
| 2015/0086163 A1 | 3/2015 | Valera et al. |
| 2015/0086907 A1 | 3/2015 | Mizuta et al. |
| 2015/0107671 A1 | 4/2015 | Bodan et al. |
| 2015/0109763 A1 | 4/2015 | Shinkai et al. |
| 2015/0125109 A1 | 5/2015 | Robbins et al. |
| 2015/0148728 A1 | 5/2015 | Sallum et al. |
| 2015/0160529 A1 | 6/2015 | Popovich et al. |
| 2015/0167868 A1 | 6/2015 | Boncha |
| 2015/0177686 A1 | 6/2015 | Lee et al. |
| 2015/0177688 A1 | 6/2015 | Popovich et al. |
| 2015/0185475 A1 | 7/2015 | Saarikko et al. |
| 2015/0219834 A1 | 8/2015 | Nichol et al. |
| 2015/0235447 A1 | 8/2015 | Abovitz et al. |
| 2015/0235448 A1 | 8/2015 | Schowengerdt et al. |
| 2015/0243068 A1 | 8/2015 | Solomon |
| 2015/0247975 A1 | 9/2015 | Abovitz et al. |
| 2015/0260994 A1 | 9/2015 | Akutsu et al. |
| 2015/0268415 A1 | 9/2015 | Schowengerdt et al. |
| 2015/0277375 A1 | 10/2015 | Large et al. |
| 2015/0285682 A1 | 10/2015 | Popovich et al. |
| 2015/0288129 A1 | 10/2015 | Jain |
| 2015/0289762 A1 | 10/2015 | Popovich et al. |
| 2015/0309264 A1 | 10/2015 | Abovitz et al. |
| 2015/0316768 A1 | 11/2015 | Simmonds |
| 2015/0346490 A1 | 12/2015 | Tekolste et al. |
| 2015/0346495 A1 | 12/2015 | Welch et al. |
| 2015/0355394 A1 | 12/2015 | Leighton et al. |
| 2016/0003847 A1 | 1/2016 | Ryan et al. |
| 2016/0004090 A1 | 1/2016 | Popovich et al. |
| 2016/0026253 A1 | 1/2016 | Bradski et al. |
| 2016/0033705 A1 | 2/2016 | Fattal |
| 2016/0033706 A1 | 2/2016 | Fattal et al. |
| 2016/0038992 A1 | 2/2016 | Arthur et al. |
| 2016/0041387 A1 | 2/2016 | Valera et al. |
| 2016/0077338 A1 | 3/2016 | Robbins et al. |
| 2016/0085300 A1 | 3/2016 | Robbins et al. |
| 2016/0116739 A1 | 4/2016 | TeKolste et al. |
| 2016/0124223 A1 | 5/2016 | Shinbo et al. |
| 2016/0132025 A1 | 5/2016 | Taff et al. |
| 2016/0195664 A1 | 7/2016 | Fattal et al. |
| 2016/0209648 A1 | 7/2016 | Haddick et al. |
| 2016/0209657 A1 | 7/2016 | Popovich et al. |
| 2016/0231568 A1 | 8/2016 | Saarikko et al. |
| 2016/0238772 A1 | 8/2016 | Waldern et al. |
| 2016/0266398 A1 | 9/2016 | Poon et al. |
| 2016/0274362 A1 | 9/2016 | Tinch et al. |
| 2016/0283773 A1 | 9/2016 | Popovich et al. |
| 2016/0291328 A1 | 10/2016 | Popovich et al. |
| 2016/0299344 A1 | 10/2016 | Dobschal et al. |
| 2016/0320536 A1 | 11/2016 | Simmonds et al. |
| 2016/0327705 A1 | 11/2016 | Simmonds et al. |
| 2016/0336033 A1 | 11/2016 | Tanaka |
| 2016/0341964 A1 | 11/2016 | Amitai et al. |
| 2017/0003505 A1 | 1/2017 | Vallius et al. |
| 2017/0010488 A1 | 1/2017 | Klug et al. |
| 2017/0030550 A1 | 2/2017 | Popovich et al. |
| 2017/0031160 A1 | 2/2017 | Popovich et al. |
| 2017/0031171 A1 | 2/2017 | Vallius et al. |
| 2017/0034435 A1 | 2/2017 | Vallius et al. |
| 2017/0038579 A1 | 2/2017 | Yeoh et al. |
| 2017/0052374 A1 | 2/2017 | Waldern et al. |
| 2017/0052376 A1 | 2/2017 | Amitai et al. |
| 2017/0059759 A1 | 3/2017 | Ayres et al. |
| 2017/0102543 A1 | 4/2017 | Vallius et al. |
| 2017/0115487 A1 | 4/2017 | Travis et al. |
| 2017/0123208 A1 | 5/2017 | Vallius et al. |
| 2017/0131460 A1 | 5/2017 | Lin et al. |
| 2017/0131546 A1 | 5/2017 | Woltman et al. |
| 2017/0131551 A1 | 5/2017 | Robbins et al. |
| 2017/0160546 A1 | 6/2017 | Bull et al. |
| 2017/0180404 A1 | 6/2017 | Bersch et al. |
| 2017/0180408 A1 | 6/2017 | Yu et al. |
| 2017/0199333 A1 | 7/2017 | Waldern et al. |
| 2017/0219841 A1 | 8/2017 | Popovich et al. |
| 2017/0255257 A1 | 9/2017 | Tiana et al. |
| 2017/0276940 A1 | 9/2017 | Popovich et al. |
| 2017/0299860 A1 | 10/2017 | Juhola et al. |
| 2017/0356801 A1 | 12/2017 | Popovich et al. |
| 2017/0357841 A1 | 12/2017 | Popovich et al. |
| 2018/0011324 A1 | 1/2018 | Popovich et al. |

(56) References Cited

U.S. PATENT DOCUMENTS

| | | | |
|---|---|---|---|
| 2018/0074265 | A1 | 3/2018 | Waldern et al. |
| 2018/0074352 | A1 | 3/2018 | Popovich et al. |
| 2018/0113303 | A1 | 4/2018 | Popovich et al. |
| 2018/0120669 | A1 | 5/2018 | Popovich et al. |
| 2018/0143449 | A1 | 5/2018 | Popovich et al. |
| 2018/0188542 | A1 | 7/2018 | Waldern et al. |
| 2018/0210198 | A1 | 7/2018 | Brown et al. |
| 2018/0232048 | A1 | 8/2018 | Popovich et al. |
| 2018/0246354 | A1 | 8/2018 | Popovich et al. |
| 2018/0275402 | A1 | 9/2018 | Popovich et al. |
| 2018/0284440 | A1 | 10/2018 | Popovich et al. |
| 2018/0373115 | A1 | 12/2018 | Brown et al. |

FOREIGN PATENT DOCUMENTS

| | | |
|---|---|---|
| CN | 200944140 Y | 9/2007 |
| CN | 101103297 A | 1/2008 |
| CN | 101151562 A | 3/2008 |
| CN | 101263412 A | 9/2008 |
| CN | 100492099 C | 5/2009 |
| CN | 101589326 A | 11/2009 |
| CN | 101688977 A | 3/2010 |
| CN | 101881936 A | 11/2010 |
| CN | 103823267 A | 5/2014 |
| CN | 104204901 A | 12/2014 |
| CN | 104956252 A | 9/2015 |
| CN | 105074537 A | 11/2015 |
| CN | 105074539 A | 11/2015 |
| CN | 105190407 A | 12/2015 |
| CN | 105229514 A | 1/2016 |
| CN | 105393159 A | 3/2016 |
| CN | 105408801 A | 3/2016 |
| CN | 105408802 A | 3/2016 |
| CN | 105408803 A | 3/2016 |
| CN | 105531716 A | 4/2016 |
| CN | 105705981 A | 6/2016 |
| CN | 107466372 A | 12/2017 |
| CN | 108780224 A | 11/2018 |
| CN | 109154717 A | 1/2019 |
| DE | 19751190 A1 | 5/1999 |
| DE | 102006003785 A1 | 7/2007 |
| DE | 102012108424 A1 | 3/2014 |
| DE | 102013209436 A1 | 11/2014 |
| EP | 0795775 A2 | 9/1997 |
| EP | 0822441 A2 | 2/1998 |
| EP | 1347641 A1 | 9/2003 |
| EP | 1413972 A1 | 4/2004 |
| EP | 1526709 A2 | 4/2005 |
| EP | 1748305 A1 | 1/2007 |
| EP | 1938152 A1 | 7/2008 |
| EP | 1413972 B1 | 10/2008 |
| EP | 2110701 A1 | 10/2009 |
| EP | 2225592 A1 | 9/2010 |
| EP | 2244114 A1 | 10/2010 |
| EP | 2326983 A1 | 6/2011 |
| EP | 2381290 A1 | 10/2011 |
| EP | 1828832 B1 | 5/2013 |
| EP | 2733517 A1 | 5/2014 |
| EP | 1573369 B1 | 7/2014 |
| EP | 2748670 A1 | 7/2014 |
| EP | 2929378 A1 | 10/2015 |
| EP | 2748670 B1 | 11/2015 |
| EP | 2995986 A1 | 3/2016 |
| EP | 2995986 B1 | 4/2017 |
| EP | 3256888 A1 | 12/2017 |
| EP | 3359999 A1 | 8/2018 |
| EP | 2494388 B1 | 11/2018 |
| FR | 2677463 A1 | 12/1992 |
| GB | 2115178 A | 9/1983 |
| GB | 2140935 A | 12/1984 |
| GB | 2508661 A | 6/2014 |
| GB | 2509536 A | 7/2014 |
| GB | 2512077 A | 9/2014 |
| GB | 2514658 A | 12/2014 |
| HK | 1204684 A1 | 11/2015 |
| HK | 1205563 A1 | 12/2015 |
| HK | 1205793 A1 | 12/2015 |
| HK | 1206101 A1 | 12/2015 |
| JP | 02186319 A | 7/1990 |
| JP | 03239384 A | 10/1991 |
| JP | 06294952 A | 10/1994 |
| JP | 07098439 A | 4/1995 |
| JP | 0990312 A | 4/1997 |
| JP | 11109320 A | 4/1999 |
| JP | 11142806 A | 5/1999 |
| JP | 2953444 B2 | 9/1999 |
| JP | 2000056259 A | 2/2000 |
| JP | 2000267042 A | 9/2000 |
| JP | 2001027739 A | 1/2001 |
| JP | 2001296503 A | 10/2001 |
| JP | 2002090858 A | 3/2002 |
| JP | 2002122906 A | 4/2002 |
| JP | 2002162598 A | 6/2002 |
| JP | 2002523802 A | 7/2002 |
| JP | 2002529790 A | 9/2002 |
| JP | 2003066428 A | 3/2003 |
| JP | 2003270419 A | 9/2003 |
| JP | 2004157245 A | 6/2004 |
| JP | 2006350129 A | 12/2006 |
| JP | 2007011057 A | 1/2007 |
| JP | 2007219106 A | 8/2007 |
| JP | 2008112187 A | 5/2008 |
| JP | 2009036955 A | 2/2009 |
| JP | 2009133999 A | 6/2009 |
| JP | 2009211091 A | 9/2009 |
| JP | 4367775 B2 | 11/2009 |
| JP | 2012137616 A | 7/2012 |
| JP | 5303928 B2 | 10/2013 |
| JP | 2018508037 A | 3/2018 |
| JP | 2018533069 A | 11/2018 |
| KR | 20100092059 A | 8/2010 |
| KR | 20140140063 A | 12/2014 |
| KR | 20140142337 A | 12/2014 |
| TW | 200535633 A | 11/2005 |
| TW | 200801583 A | 1/2008 |
| TW | 201314263 A | 4/2013 |
| TW | 201600943 A | 1/2016 |
| TW | 201604601 A | 2/2016 |
| WO | 1997001133 A1 | 1/1997 |
| WO | 1997027519 A1 | 7/1997 |
| WO | 1998004650 A1 | 2/1998 |
| WO | 1999009440 A1 | 2/1999 |
| WO | 1999052002 A1 | 10/1999 |
| WO | 2000016136 A1 | 3/2000 |
| WO | 2000023830 | 4/2000 |
| WO | 2000023832 A1 | 4/2000 |
| WO | 2000023847 | 4/2000 |
| WO | 2000028369 A2 | 5/2000 |
| WO | 2000028369 A3 | 10/2000 |
| WO | 2001050200 A2 | 7/2001 |
| WO | 2001090822 A1 | 11/2001 |
| WO | 2002082168 A1 | 10/2002 |
| WO | 2003081320 A1 | 10/2003 |
| WO | 2005001753 A1 | 1/2005 |
| WO | 2005006065 A8 | 1/2005 |
| WO | 2005006065 A3 | 2/2005 |
| WO | 2005073798 A1 | 8/2005 |
| WO | 2006002870 A1 | 1/2006 |
| WO | 2006064301 A1 | 6/2006 |
| WO | 2006064325 A1 | 6/2006 |
| WO | 2006064334 A1 | 6/2006 |
| WO | 2006102073 A2 | 9/2006 |
| WO | 2006132614 A1 | 12/2006 |
| WO | 2006102073 A3 | 1/2007 |
| WO | 2007015141 A2 | 2/2007 |
| WO | 2007029032 A1 | 3/2007 |
| WO | 2007085682 A1 | 8/2007 |
| WO | 2007130130 | 11/2007 |
| WO | 2007130130 A2 | 11/2007 |
| WO | 2007141587 A1 | 12/2007 |
| WO | 2007141589 A1 | 12/2007 |
| WO | 2008011066 A2 | 1/2008 |
| WO | 2008011066 A9 | 5/2008 |
| WO | 2008081070 A1 | 7/2008 |

(56) References Cited

FOREIGN PATENT DOCUMENTS

| | | |
|---|---|---|
| WO | 2008100545 A2 | 8/2008 |
| WO | 2008011066 A3 | 12/2008 |
| WO | 2009013597 A2 | 1/2009 |
| WO | 2009013597 A3 | 1/2009 |
| WO | 2009077802 A1 | 6/2009 |
| WO | 2009077803 A1 | 6/2009 |
| WO | 2009101238 A1 | 8/2009 |
| WO | 2007130130 A3 | 9/2009 |
| WO | 2009155437 A1 | 12/2009 |
| WO | 2009155437 A8 | 3/2010 |
| WO | 2010023444 A1 | 3/2010 |
| WO | 2010057219 A1 | 5/2010 |
| WO | 2010067114 A1 | 6/2010 |
| WO | 2010067117 A1 | 6/2010 |
| WO | 2010078856 A1 | 7/2010 |
| WO | 2010104692 A2 | 9/2010 |
| WO | 2010122330 A1 | 10/2010 |
| WO | 2010125337 A2 | 11/2010 |
| WO | 2010125337 A3 | 11/2010 |
| WO | 2011012825 A1 | 2/2011 |
| WO | 2011032005 A2 | 3/2011 |
| WO | 2011042711 A2 | 4/2011 |
| WO | 2011042711 A3 | 4/2011 |
| WO | 2011051660 A1 | 5/2011 |
| WO | 2011055109 A2 | 5/2011 |
| WO | 2011073673 A1 | 6/2011 |
| WO | 2011107831 A1 | 9/2011 |
| WO | 2011110821 A1 | 9/2011 |
| WO | 2011131978 A1 | 10/2011 |
| WO | 2012052352 A1 | 4/2012 |
| WO | 2012062658 A1 | 5/2012 |
| WO | 2012158950 A1 | 11/2012 |
| WO | 2012172295 A1 | 12/2012 |
| WO | 2013027004 A1 | 2/2013 |
| WO | 2013027006 | 2/2013 |
| WO | 2013027006 A1 | 2/2013 |
| WO | 2013033274 A1 | 3/2013 |
| WO | 2013034879 A1 | 3/2013 |
| WO | 2013049012 A1 | 4/2013 |
| WO | 2013102759 A2 | 7/2013 |
| WO | 2013163347 A1 | 10/2013 |
| WO | 2013167864 A1 | 11/2013 |
| WO | 2013190257 | 12/2013 |
| WO | 2013190257 A1 | 12/2013 |
| WO | 2014064427 A1 | 5/2014 |
| WO | 2014080155 A1 | 5/2014 |
| WO | 2014085734 A1 | 6/2014 |
| WO | 2014090379 A1 | 6/2014 |
| WO | 2014091200 A1 | 6/2014 |
| WO | 2014093601 A1 | 6/2014 |
| WO | 2014100182 A1 | 6/2014 |
| WO | 2014113506 A1 | 7/2014 |
| WO | 2014116615 A1 | 7/2014 |
| WO | 2014130383 A1 | 8/2014 |
| WO | 2014144526 A2 | 9/2014 |
| WO | 2014159621 A1 | 10/2014 |
| WO | 2014164901 A1 | 10/2014 |
| WO | 2014176695 A1 | 11/2014 |
| WO | 2014179632 A1 | 11/2014 |
| WO | 2014188149 A1 | 11/2014 |
| WO | 2014209733 A1 | 12/2014 |
| WO | 2014209819 A1 | 12/2014 |
| WO | 2014209820 A1 | 12/2014 |
| WO | 2014209821 A1 | 12/2014 |
| WO | 2014210349 A1 | 12/2014 |
| WO | 2015006784 A2 | 1/2015 |
| WO | 2015015138 A1 | 2/2015 |
| WO | 2015017291 A1 | 2/2015 |
| WO | 2015069553 A1 | 5/2015 |
| WO | 2015081313 A2 | 6/2015 |
| WO | 2015117039 A1 | 8/2015 |
| WO | 2015145119 A1 | 10/2015 |
| WO | 2016010289 A1 | 1/2016 |
| WO | 2016020643 A1 | 2/2016 |
| WO | 2016025350 A1 | 2/2016 |
| WO | 2016042283 A1 | 3/2016 |
| WO | 2016046514 A1 | 3/2016 |
| WO | 2016103263 A1 | 6/2016 |
| WO | 2016111706 A1 | 7/2016 |
| WO | 2016111707 A1 | 7/2016 |
| WO | 2016111708 A1 | 7/2016 |
| WO | 2016111709 A1 | 7/2016 |
| WO | 2016113534 A1 | 7/2016 |
| WO | 2016116733 A1 | 7/2016 |
| WO | 2016118107 A1 | 7/2016 |
| WO | 2016122679 A1 | 8/2016 |
| WO | 2016130509 A1 | 8/2016 |
| WO | 2016135434 A1 | 9/2016 |
| WO | 2016156776 A1 | 10/2016 |
| WO | 2017060665 A1 | 4/2017 |
| WO | 2017162999 A1 | 9/2017 |
| WO | 2017162999 A8 | 9/2017 |
| WO | 2017178781 A1 | 10/2017 |
| WO | 2017180403 A1 | 10/2017 |
| WO | 2018102834 A2 | 6/2018 |
| WO | 2018102834 A3 | 6/2018 |
| WO | 2018129398 A1 | 7/2018 |

OTHER PUBLICATIONS

International Search Report for PCT/GB2015/000228, Completed by the European Patent Office dated Nov. 4, 2015, 5 Pages.

International Preliminary Report on Patentability for International Application No. PCT/GB2010/001982, report issued May 1, 2012, dated May 10, 2012, 7 pgs.

Written Opinion for International Application No. PCT/GB2010/001982, search completed Feb. 24, 2011, dated Mar. 8, 2011, 6 pgs.

Harbers et al., "I-15.3: LED Backlighting for LCD-HDTV", Journal of the Society for Information Display, 2002, vol. 10, No. 4, pp. 347-350.

Harbers et al., "Performance of High Power LED Illuminators in Color Sequential Projection Displays", Lumileds Lighting, 2007, 4 pgs.

Harbers et al., "Performance of High Power LED Illuminators in Color Sequential Projection Displays", Lumileds, Aug. 7, 2001, 11 pgs.

Harbers et al., "Performance of High-Power LED illuminators in Projection Displays", Proc. Int. Disp. Workshops, Japan. vol. 10, pp. 1585-1588, 2003.

Harding et al., "Reactive Liquid Crystal Materials for Optically Anisotropic Patterned Retarders", Merck, licrivue, 2008, ME-GR-RH-08-010, 20 pgs.

Harding et al., "Reactive Liquid Crystal Materials for Optically Anisotropic Patterned Retarders", SPIE Lithography Asia—Taiwan, 2008, Proceedings vol. 7140, Lithography Asia 2008; 71402J, doi: 10.1117/12.805378.

Hariharan, "Optical Holography: Principles, techniques and applications", Cambridge University Press, 1996, pp. 231-233.

Harris, "Photonic Devices", EE 216 Principals and Models of Semiconductor Devices, Autumn 2002, 20 pgs.

Harrold et al., "3D Display Systems Hardware Research at Sharp Laboratories of Europe: an update", Sharp Laboratories of Europe, Ltd., received May 21, 1999, 7 pgs.

Harthong et al., "Speckle phase averaging in high-resolution color holography", J. Opt. Soc. Am. A, Feb. 1997, vol. 14, No. 2, pp. 405-409.

Hasan et al., "Tunable-focus lens for adaptive eyeglasses", Optics Express, Jan. 23, 2017, vol. 25, No. 2, 1221, 13 pgs.

Hasman et al., "Diffractive Optics: Design, Realization, and Applications", Fiber and Integrated Optics, vol. 16, pp. 1-25, 1997.

Hata et al., "Holographic nanoparticle-polymer composites based on step-growth thiol-ene photopolymerization", Optical Materials Express, Jun. 1, 2011, vol. 1, No. 2, pp. 207-222.

He et al., "Dynamics of peristrophic multiplexing in holographic polymer-dispersed liquid crystal", Liquid Crystals, Mar. 26, 2014, vol. 41, No. 5, pp. 673-684.

He et al., "Holographic 3D display based on polymer-dispersed liquid-crystal thin films", Proceedings of China Display/Asia Display 2011, pp. 158-160.

(56) References Cited

OTHER PUBLICATIONS

He et al., "Properties of Volume Holograms Recording in Photopolymer Films with Various Pulse Exposures Repetition Frequencies", Proceedings of SPIE vol. 5636, Bellingham, WA, 2005, doi: 10.1117/12.580978, pp. 842-848.
Herman et al., "Production and Uses of Diffractionless Beams", J. Opt. Soc. Am. A., Jun. 1991, vol. 8, No. 6, pp. 932-942.
Hisano, "Alignment layer-free molecular ordering induced by masked photopolymerization with nonpolarized light", Appl. Phys. Express 9, Jun. 6, 2016, pp. 072601-1-072601-4.
Hoepfner et al., "LED Front Projection Goes Mainstream", Luminus Devices, Inc., Projection Summit, 2008, 18 pgs.
Holmes et al., "Controlling the anisotropy of holographic polymer-dispersed liquid-crystal gratings", Physical Review E, Jun. 11, 2002, vol. 65, 066603-1-066603-4.
Hoyle et al., "Advances in the Polymerization of Thiol-Ene Formulations", Heraeus Noblelight Fusion UV Inc., 2003 Conference, 6 pgs.
Hua, "Sunglass-like displays become a reality with free-form optical technology", Illumination & Displays 3D Visualization and Imaging Systems Laboratory (3DVIS) College of Optical Sciences University of Arizona Tucson, AZ. 2014, 3 pgs.
Huang et al., "Diffraction properties of substrate guided-wave holograms", Optical Engineering, Oct. 1995, vol. 34, No. 10, pp. 2891-2899.
Huang et al., "Theory and characteristics of holographic polymer dispersed liquid crystal transmission grating with scaffolding morphology", Applied Optics, Jun. 20, 2012, vol. 51, No. 18, pp. 4013-4020.
Iannacchione et al., "Deuterium NMR and morphology study of copolymer-dispersed liquid-crystal Bragg gratings", Europhysics Letters, 1996, vol. 36, No. 6, pp. 425-430.
Jeng et al., "Aligning liquid crystal molecules", SPIE, 2012, 10.1117/2.1201203.004148, 2 pgs.
Jo et al., "Control of Liquid Crystal Pretilt Angle using Polymerization of Reactive Mesogen", IMID 2009 DIGEST, P1-25, 2009, pp. 604-606.
Juhl, "Interference Lithography for Optical Devices and Coatings", Dissertation, University of Illinois at Urbana-Champaign, 2010.
Juhl et al., "Holographically Directed Assembly of Polymer Nanocomposites", ACS Nano, Oct. 7, 2010, vol. 4, No. 10, pp. 5953-5961.
Jurbergs et al., "New recording materials for the holographic industry", Proc. of SPIE, 2009 vol. 7233, pp. 72330K-1-72330L-10, doi: 10.1117/12.809579.
Kahn et al., "Private Line Report on Large Area Display", Kahn International, Jan. 7, 2003, vol. 8, No. 10, 9 pgs.
Karasawa et al., "Effects of Material Systems on the Polarization Behavior of Holographic Polymer Dispersed Liquid Crystal Gratings", Japanese Journal of Applied Physics, Oct. 1997, vol. 36, No. 10, pp. 6388-6392.
Karp et al., "Planar micro-optic solar concentration using multiple imaging lenses into a common slab waveguide", Proc. of SPIE vol. 7407, 2009 SPIE, CCC code: 0277-786X/09, doi: 10.1117/12.826531, pp. 74070D-1-74070D-11.
Karp et al., "Planar micro-optic solar concentrator", Optics Express, Jan. 18, 2010, vol. 18, No. 2, pp. 1122-1133.
Kato et al., "Alignment-Controlled Holographic Polymer Dispersed Liquid Crystal (HPDLC) for Reflective Display Devices", SPIE, 1998, vol. 3297, pp. 52-57.
Kessler, "Optics of Near to Eye Displays (NEDs)", Oasis 2013, Tel Aviv, Feb. 19, 2013, 37 pgs.
Keuper et al., "26.1: RGB LED Illuminator for Pocket-Sized Projectors", SID 04 Digest, 2004, ISSN/0004-0966X/04/3502, pp. 943-945.
Keuper et al., "P-126: Ultra-Compact LED based Image Projector for Portable Applications", SID 03 Digest, 2003, ISSN/0003-0966X/03/3401-0713, pp. 713-715.

Kim et al., "Effect of Polymer Structure on the Morphology and Electro optic Properties of UV Curable PNLCs", Polymer, Feb. 2000, vol. 41, pp. 1325-1335.
Kim et al., "Enhancement of electro-optical properties in holographic polymer-dispersed liquid crystal films by incorporation of multiwalled carbon nanotubes into a polyurethane acrylate matrix", Polym. Int., Jun. 16, 2010, vol. 59, pp. 1289-1295.
Kim et al., "Fabrication of Reflective Holographic PDLC for Blue", Molecular Crystals and Liquid Crystals Science, 2001, vol. 368, pp. 3845-3853.
Kim et al., "Optimization of Holographic PDLC for Green", Mol. Cryst. Liq. Cryst., vol. 368, pp. 3855-3864, 2001.
Klein, "Optical Efficiency for Different Liquid Crystal Colour Displays", Digital Media Department, HPL-2000-83, Jun. 29, 2000, 18 pgs.
Kogelnik, "Coupled Wave Theory for Thick Hologram Gratings", The Bell System Technical Journal, vol. 48, No. 9, pp. 2909-2945, Nov. 1969.
Kotakonda et al., "Electro-optical Switching of the Holographic Polymer-dispersed Liquid Crystal Diffraction Gratings", Journal of Optics A: Pure and Applied Optics, Jan. 1, 2009, vol. 11, No. 2, 11 pgs.
Kress et al., "Diffractive and Holographic Optics as Optical Combiners in Head Mounted Displays", UbiComp '13, Sep. 9-12, 2013, Session: Wearable Systems for Industrial Augmented Reality Applications, pp. 1479-1482.
Lauret et al., "Solving the Optics Equation for Effective LED Applications", Gaggione North America, LLFY System Design Workshop 2010, Oct. 28, 2010, 26 pgs.
Lee, "Patents Shows Widespread Augmented Reality Innovation", PatentVue, May 26, 2015, 5 pgs.
Levola, "Diffractive optics for virtual reality displays", Journal of the SID, 2006, 14/5, pp. 467-475.
Levola et al., "Near-to-eye display with diffractive exit pupil expander having chevron design", Journal of the SID, 2008, 16/8, pp. 857-862.
Li et al., "Design and Optimization of Tapered Light Pipes", Proceedings vol. 5529, Nonimaging Optics and Efficient Illumination Systems, Sep. 29, 2004, doi: 10.1117/12.559844, 10 pgs.
Li et al., "Dual Paraboloid Reflector and Polarization Recycling Systems for Projection Display", Proceedings vol. 5002, Projection Displays IX, Mar. 28, 2003, doi: 10.1117/12.479585, 12 pgs.
Li et al., "Light Pipe Based Optical Train and its Applications", Proceedings vol. 5524, Novel Optical Systems Design and Optimization VII, Oct. 24, 2004, doi: 10.1117/12.559833, 10 pgs.
Li et al., "Novel Projection Engine with Dual Paraboloid Reflector and Polarization Recovery Systems", Wavien Inc., SPIE EI 5289-38, Jan. 21, 2004, 49 pgs.
Li et al., "Polymer crystallization/melting induced thermal switching in a series of holographically patterned Bragg reflectors", Soft Matter, Jul. 11, 2005, vol. 1, pp. 238-242.
"Application Note: Variable Attenuator for Lasers", Technology and Applications Center, Newport Corporation, www.newport.com, 2006, DS-08067, 6 pgs.
"Bae Systems to Unveil Q-Sight Family of Helmet-Mounted Display at AUSA Symposium", Released on Tuesday, Oct. 9, 2007, 1 pg.
"Beam Steering Using Liquid Crystals", Boulder Nonlinear Systems, Inc., info@bnonlinear.com, May 8, 2001, 4 pgs.
"BragGrate—Deflector: Transmitting Volume Bragg Grating for angular selection and magnification", 2015, www.OptiGrate.com.
"Cree XLamp XP-E LEDs", Cree, Inc., Retrieved from www.cree.com/Xlamp, CLD-DS18 Rev 17, 2013, 17 pgs.
"Desmodur N 3900", Bayer MaterialScience AG, Mar. 18, 2013, www.bayercoatings.com, 4 pgs.
"Digilens—Innovative Augmented Reality Display and Sensor Solutions for OEMs", Jun. 6, 2017, 31 pgs.
"Exotic Optical Components", Building Electro-Optical Systems, Making It All Work, Chapter 7, John Wiley & Sons, Inc., pp. 233-261.
"FHS Lenses Series", Fraen Corporation, www.fraen.com, Jun. 16, 2003, 10 pgs.

(56) References Cited

OTHER PUBLICATIONS

"FLP Lens Series for LUXEONTM Rebel and Rebel ES LEDs", Fraen Corporation, www.fraensrl.com, Aug. 7, 2015, 8 pgs.
"Head-up Displays, See-through display for military aviation", BAE Systems, 2016, 3 pgs.
"Holder for LUXEON Rebel—Part No. 180", Polymer Optics Ltd., 2008, 12 pgs.
"LED 7-Segment Displays", Lumex, uk.digikey.com, 2003, UK031, 36 pgs.
"LED325W UVTOP UV LED with Window", Thorlabs, Specifications and Documentation, 21978-S01 Rev. A, Apr. 8, 2011, 5 pgs.
"Liquid Crystal Phases", Phases of Liquid Crystals, http://plc.cwru.edu/tutorial/enhanced/files/lc/phase, Retrieved on Sep. 21, 2004, 6 pgs.
"LiteHUD Head-up display", BAE Systems, 2016, 2 pgs.
"LiteHUD Head-up display infographic", BAE Systems, 2017, 2 pgs.
"Luxeon C: Power Light Source", Philips Lumileds, www.philipslumileds.com, 2012, 18 pgs.
"Luxeon Rebel ES: Leading efficacy and light output, maximum design flexibility", Luxeon Rebel ES Datasheet DS61 20130221, www.philipslumileds.com, 2013, 33 pgs.
"Mobile Display Report", Insight Media, LLC, Apr. 2012, vol. 7, No. 4, 72 pgs.
"Molecular Imprints Imprio 55", Engineering at Illinois, Micro + Nanotechnology Lab, Retrieved from https://mntl.illinois.edu/facilities/cleanrooms/equipment/Nano-Imprint.asp, Dec. 28, 2015, 2 pgs.
"Optical measurements of retinal flow", Industrial Research Limited, Feb. 2012, 18 pgs.
"Osterhout Design Group Develops Next-Generation, Fully-integrated Smart Glasses Using Qualcomm Technologies", ODG, www.osterhoutgroup.com, Sep. 18, 2014, 2 pgs.
"Range Finding Using Pulse Lasers", OSRAM, Opto Semiconductors, Sep. 10, 2004, 7 pgs.
"Response time in Liquid-Crystal Variable Retarders", Meadowlark Optics, Inc., 2005, 4 pgs.
"Secondary Optics Design Considerations for SuperFlux LEDs", Lumileds, application brief AB20-5, Sep. 2002, 23 pgs.
"Solid-State Optical Mouse Sensor with Quadrature Outputs", IC Datasheet, UniqueICs, Jul. 15, 2004, 11 pgs.
"SVGA TransparentVLSITM Microdisplay Evaluation Kit", Radiant Images, Inc., Product Data Sheet, 2003, 3 pgs.
"Technical Data Sheet LPR1", Luminus Devices, Inc., Luminus Projection Chipset, Release 1, Preliminary, Revision B, Sep. 21, 2004, 9 pgs.
"The Next Generation of TV", SID Information Display, Nov./Dec. 2014, vol. 30, No. 6, 56 pgs.
"Thermal Management Considerations for SuperFlux LEDs", Lumileds, application brief AB20-4, Sep. 2002, 14 pgs.
"UVTOP240", Roithner LaserTechnik GmbH, v 2.0, Jun. 24, 2013, 6 pgs.
"UVTOP310", Roithner LaserTechnik GmbH, v 2.0, Jun. 24, 2013, 6 pgs.
"Velodyne's HDL-64E: A High Definition Lidar Sensor for 3-D Applications", High Definition Lidar, white paper, Oct. 2007, 7 pgs.
"VerLASE Gets Patent for Breakthrough Color Conversion Technology That Enables Full Color MicroLED Arrays for Near Eye Displays", Cision PRweb, Apr. 28, 2015, Retrieved from the Internet http://www.prweb.com/releases/2015/04/prweb12681038.htm, 3 pgs.
"X-Cubes—Revisited for LCOS", BASID, RAF Electronics Corp. Rawson Optics, Inc., Oct. 24, 2002, 16 pgs.
Aachen, "Design of plastic optics for LED applications", Optics Colloquium 2009, Mar. 19, 2009, 30 pgs.
Abbate et al., "Characterization of LC-polymer composites for opto-electronic application", Proceedings of OPTOEL'03, Leganes-Madrid, Spain, Jul. 14-16, 2003, 4 pgs.
Al-Kalbani et al., "Ocular Microtremor laser speckle metrology", Proc. of SPIE, 2009, vol. 7176 717606-1, 12 pgs.

Almanza-Workman et al., "Planarization coating for polyimide substrates used in roll-to-roll fabrication of active matrix backplanes for flexible displays", HP Laboratories, HPL-2012-23, Feb. 6, 2012, 12 pgs.
Amundson et al., "Morphology and electro-optic properties of polymer-dispersed liquid-crystal films", Physical Review E, Feb. 1997, vol. 55. No. 2, pp. 1646-1654.
An et al., "Speckle suppression in laser display using several partially coherent beams", Optics Express, Jan. 5, 2009, vol. 17, No. 1, pp. 92-103.
Apter et al., "Electrooptical Wide-Angle Beam Deflector Based on Fringing-Field-Induced Refractive Inhomogeneity in a Liquid Crystal Layer", 23rd IEEE Convention of Electrical and Electronics Engineers in Israel, Sep. 6-7, 2004, pp. 240-243.
Arnold et al., "52.3: An Improved Polarizing Beamsplitter LCOS Projection Display Based on Wire-Grid Polarizers", Society for Information Display, Jun. 2001, pp. 1282-1285.
Ayras et al., "Exit pupil expander with a large field of view based on diffractive optics", Journal of the SID, May 18, 2009, 17/8, pp. 659-664.
Baets et al., "Resonant-Cavity Light-Emitting Diodes: a review", Proceedings of SPIE, 2003, vol. 4996, pp. 74-86.
Bayer et al., "Introduction to Helmet-Mounted Displays", 2016, pp. 47-108.
Beckel et al., "Electro-optic properties of thiol-ene polymer stabilized ferroelectric liquid crystals", Liquid Crystals, vol. 30, No. 11, Nov. 2003, pp. 1343-1350.
Bergkvist, "Biospeckle-based Study of the Line Profile of Light Scattered in Strawberries", Master Thesis, Lund Reports on Atomic Physics, LRAP-220, Lund 1997, pp. 1-62.
Bernards et al., "Nanoscale porosity in polymer films: fabrication and therapeutic applications", Soft Matter, Jan. 1, 2010, vol. 6, No. 8, pp. 1621-1631.
Bleha et al., "Binocular Holographic Waveguide Visor Display", SID Symposium Digest of Technical Papers, Holoeye Systems Inc., Jun. 2014, San Diego, CA, 4 pgs.
Bleha et al., W P. "D-ILA Technology for High Resolution Projection Displays", Sep. 10, 2003, Proceedings, vol. 5080, doi:10.1117/12.497532, 11 pgs.
Bone, "Design Obstacles for LCOS Displays in Projection Applications "Optics architectures for LCOS are still evolving"", Aurora Systems Inc., Bay Area SID Seminar, Mar. 27, 2001, 22 pgs.
Born et al., "Optics of Crystals", Principles of Optics 5th Edition 1975, pp. 705-707.
Bourzac, "Magic Leap Needs to Engineer a Miracle", Intelligent Machines, Jun. 11, 2015, 7 pgs.
Bowen et al., "Optimisation of interdigitated electrodes for piezoelectric actuators and active fibre composites", J Electroceram, Jul. 2006, vol. 16, pp. 263-269, DOI 10.1007/s10832-006-9862-8.
Smith et al., "RM-PLUS—Overview", Licrivue, Nov. 5, 2013, 16 pgs.
Sony Global, "Sony Releases the Transparent Lens Eyewear 'SmartEyeglass Developer Edition'", printed Oct. 19, 2017, Sony Global—News Releases, 5 pgs.
Steranka et al., "High-Power LEDs—Technology Status and Market Applications", Lumileds, Jul. 2002, 23 pgs.
Stumpe et al., "Active and Passive LC Based Polarization Elements", Mol. Cryst. Liq. Cryst., 2014, vol. 594: pp. 140-149.
Stumpe et al., "New type of polymer-LC electrically switchable diffractive devices—POLIPHEM", May 19, 2015, p. 97.
Subbarayappa et al., "Bistable Nematic Liquid Crystal Device", Jul. 30, 2009, 14 pgs.
Sun et al., "Effects of multiwalled carbon nanotube on holographic polymer dispersed liquid crystal", Polymers Advanced Technologies, Feb. 19, 2010, DOI: 10.1002/pat.1708, 8 pgs.
Sun et al., "Low-birefringence lens design for polarization sensitive optical systems", Proceedings of SPIE, 2006, vol. 6289, doi: 10.1117/12.679416, pp. 6289DH-1-6289DH-10.
Sun et al., "Transflective multiplexing of holographic polymer dispersed liquid crystal using Si additives", eXPRESS Polymer Letters, 2011, vol. 5, No. 1, pp. 73-81.

(56) References Cited

OTHER PUBLICATIONS

Sutherland et al., "Bragg Gratings in an Acrylate Polymer Consisting of Periodic Polymer-Dispersed Liquid-Crystal Planes", Chem. Mater., 1993, vol. 5, pp. 1533-1538.
Sutherland et al., "Electrically switchable volume gratings in polymer-dispersed liquid crystals", Applied Physics Letters, Feb. 28, 1994, vol. 64, No. 9, pp. 1074-1076.
Sutherland et al., "Enhancing the electro-optical properties of liquid crystal nanodroplets for switchable Bragg gratings", Proc. of SPIE, 2008, vol. 7050, pp. 705003-1-705003-9, doi: 10.1117/12.792629.
Sutherland et al., "Liquid crystal bragg gratings: dynamic optical elements for spatial light modulators", Hardened Materials Branch, Hardened Materials Branch, AFRL-ML-WP-TP-2007-514, Jan. 2007, Wright-Patterson Air Force Base, OH, 18 pgs.
Sutherland et al., "The physics of photopolymer liquid crystal composite holographic gratings", presented at SPIE: Diffractive and Holographic Optics Technology San Jose, CA, 1996, SPIE, vol. 2689, pp. 158-169.
Sweatt, "Achromatic triplet using holographic optical elements", Applied Optics, May 1977, vol. 16, No. 5, pp. 1390-1391.
Talukdar, "Technology Forecast: Augmented reality", Changing the economics of Smartglasses, Issue 2, 2016, 5 pgs.
Tao et al., "TiO2 nanocomposites with high refractive index and transparency", J. Mater. Chem., Oct. 4, 2011, vol. 21, pp. 18623-18629.
Titus et al., "Efficient, Accurate Liquid Crystal Digital Light Deflector", Proc. SPIE 3633, Diffractive and Holographic Technologies, Systems, and Spatial Light Modulators VI, 1 Jun. 1, 1999, doi: 10.1117/12.349334, 10 pgs.
Tiziani, "Physical Properties of Speckles", Speckle Metrology, Chapter 2, Academic Press, Inc., 1978, pp. 5-9.
Tominaga et al., "Fabrication of holographic polymer dispersed liquid crystals doped with gold nanoparticles", 2010 Japanese Liquid Crystal Society Annual Meeting, 2 pgs.
Tomita, "Holographic assembly of nanoparticles in photopolymers for photonic applications", The International Society for Optical Engineering, SPIE Newsroom, 2006, 10.1117/2.1200612.0475, 3 pgs.
Trisnadi, "Hadamard Speckle Contrast Reduction", Optics Letters, Jan. 1, 2004, vol. 29, No. 1, pp. 11-13.
Trisnadi, "Speckle contrast reduction in laser projection displays", Proc. SPIE 4657, 2002, 7 pgs.
Tzeng et al., "Axially symmetric polarization converters based on photo-aligned liquid crystal films", Optics Express, Mar. 17, 2008, vol. 16, No. 6, pp. 3768-3775.
Upatnieks et al., "Color Holograms for white light reconstruction", Applied Physics Letters, Jun. 1, 1996, vol. 8, No. 11, pp. 286-287.
Ushenko, "The Vector Structure of Laser Biospeckle Fields and Polarization Diagnostics of Collagen Skin Structures", Laser Physics, 2000, vol. 10, No. 5, pp. 1143-1149.
Valoriani, "Mixed Reality: Dalle demo a un prodotto", Disruptive Technologies Conference, Sep. 23, 2016, 67 pgs.
Van Gerwen et al., "Nanoscaled interdigitated electrode arrays for biochemical sensors", Sensors and Actuators, Mar. 3, 1998, vol. B 49, pp. 73-80.
Vecchi, "Studi ESR Di Sistemi Complessi Basati Su Cristalli Liquidi", Thesis, University of Bologna, Department of Physical and Inorganic Chemistry, 2004-2006, 110 pgs.
Veltri et al., "Model for the photoinduced formation of diffraction gratings in liquid-crystalline composite materials", Applied Physics Letters, May 3, 2004, vol. 84, No. 18, pp. 3492-3494.
Vita, "Switchable Bragg Gratings", Thesis, Universita degli Studi di Napoli Federico II, Nov. 2005, 103 pgs.
Vuzix, "M3000 Smart Glasses, Advanced Waveguide Optics", brochure, Jan. 1, 2017, 2 pgs.
Wang et al., "Liquid-crystal blazed-grating beam deflector", Applied Optics, Dec. 10, 2000, vol. 39, No. 35, pp. 6545-6555.
Wang et al., "Optical Design of Waveguide Holographic Binocular Display for Machine Vision", Applied Mechanics and Materials, Sep. 27, 2013, vols. 427-429, pp. 763-769.

Wang et al., "Speckle reduction in laser projection systems by diffractive optical elements", Applied Optics, Apr. 1, 1998, vol. 37, No. 10, pp. 1770-1775.
Weber et al., "Giant Birefringent Optics in Multilayer Polymer Mirrors", Science, Mar. 31, 2000, vol. 287, pp. 2451-2456.
Wei An, "Industrial Applications of Speckle Techniques", Doctoral Thesis, Royal Institute of Technology, Department of Production Engineering, Chair of Industrial Metrology & Optics, Stockholm, Sweden 2002, 76 pgs.
Welde et al., "Investigation of methods for speckle contrast reduction", Master of Science in Electronics, Jul. 2010, Norwegian University of Science and Technology, Department of Electronics and Telecommunications, 127 pgs.
White, "Influence of thiol-ene polymer evolution on the formation and performance of holographic polymer dispersed liquid crystals", The 232nd ACS National Meeting, San Francisco, CA, Sep. 10-14, 2006, 1 pg.
Wicht et al., "Nanoporous Films with Low Refractive Index for Large-Surface Broad-Band Anti-Reflection Coatings", Macromol. Mater. Eng., 2010, 295, DOI: 10.1002/mame.201000045, 9 pgs.
Wilderbeek et al., "Photoinitiated Bulk Polymerization of Liquid Crystalline Thiolene Monomers", Macromolecules, 2002, vol. 35, pp. 8962-8969.
Wilderbeek et al., "Photo-Initiated Polymerization of Liquid Crystalline Thiol-Ene Monomers in Isotropic and Anisotropic Solvents", J. Phys. Chem. B, 2002, vol. 106, No. 50, pp. 12874-12883.
Wofford et al., "Liquid crystal bragg gratings: dynamic optical elements for spatial light modulators", Hardened Materials Branch, Survivability and Sensor Materials Division, AFRL-ML-WP-TP-2007-551, Air Force Research Laboratory, Jan. 2007, Wright-Patterson Air Force Base, OH, 17 pgs.
Yaqoob et al., "High-speed two-dimensional laser scanner based on Bragg grating stored in photothermorefractive glass", Applied Optics, Sep. 10, 2003, vol. 42, No. 26, pp. 5251-5262.
Yaroshchuk et al., "Stabilization of liquid crystal photoaligning layers by reactive mesogens", Applied Physics Letters, Jul. 14, 2009, vol. 95, pp. 021902-1-021902-3.
Ye, "Three-dimensional Gradient Index Optics Fabricated in Diffusive Photopolymers", Thesis, Department of Electrical, Computer and Energy Engineering, University of Colorado, 2012, 224 pgs.
Yemtsova et al., "Determination of liquid crystal orientation in holographic polymer dispersed liquid crystals by linear and non-linear optics", Journal of Applied Physics, Oct. 13, 2008, vol. 104, pp. 073115-1-073115-4.
Yeralan et al., "Switchable Bragg grating devices for telecommunications applications", Opt. Eng., Aug. 2012, vol. 41, No. 8, pp. 1774-1779.
Yoshida et al., "Nanoparticle-Dispersed Liquid Crystals Fabricated by Sputter Doping", Adv. Mater., 2010, vol. 22, pp. 622-626.
Zhang et al., "Dynamic Holographic Gratings Recorded by Photopolymerization of Liquid Crystalline Monomers", J. Am. Chem. Soc., 1994, vol. 116, pp. 7055-7063.
Zhang et al., "Switchable Liquid Crystalline Photopolymer Media for Holography", J. Am. Chem. Soc., 1992, vol. 114, pp. 1506-1507.
Zhao et al., "Designing Nanostructures by Glancing Angle Deposition", Proc. of SPIE, Oct. 27, 2003, vol. 5219, pp. 59-73.
Zlębacz, "Dynamics of nano and micro objects in complex liquids", Ph.D. dissertation, Institute of Physical Chemistry of the Polish Academy of Sciences, Warsaw 2011, 133 pgs.
Zou et al., "Functionalized nano interdigitated electrodes arrays on polymer with integrated microfluidics for direct bio-affinity sensing using impedimetric measurement", Sensors and Actuators A, Jan. 16, 2007, vol. 136, pp. 518-526.
Zyga, "Liquid crystals controlled by magnetic fields may lead to new optical applications", Nanotechnology, Nanophysics, Retrieved from http://phys.org/news/2014-07-liquid-crystals-magnetic-fields-optical.html, Jul. 9, 2014, 3 pgs.
Lin et al., "Ionic Liquids in Photopolymerizable Holographic Materials", in book: Holograms—Recording Materials and Applications, Nov. 9, 2011, 21 pgs.
Liu et al., "Holographic Polymer-Dispersed Liquid Crystals: Materials, Formation, and Applications", Advances in OptoElectronics, Nov. 30, 2008, vol. 2008, Article ID 684349, 52 pgs.

(56) References Cited

OTHER PUBLICATIONS

Lorek, "Experts Say Mass Adoption of augmented and Virtual Reality is Many Years Away", Siliconhills, Sep. 9, 2017, 4 pgs.
Lowenthal et al., "Speckle Removal by a Slowly Moving Diffuser Associated with a Motionless Diffuser", Journal of the Optical Society of America, Jul. 1971, vol. 61, No. 7, pp. 847-851.
Lu et al., "Polarization switch using thick holographic polymer-dispersed liquid crystal grating", Journal of Applied Physics, Feb. 1, 2004, vol. 95, No. 3, pp. 810-815.
Lu et al., "The Mechanism of electric-field-induced segregation of additives in a liquid-crystal host", Phys Rev E Stat Nonlin Soft Matter Phys., Nov. 27, 2012, 14 pgs.
Ma et al., "Holographic Reversed-Mode Polymer-Stabilized Liquid Crystal Grating", Chinese Phys. Lett., 2005, vol. 22, No. 1, pp. 103-106.
Mach et al., "Switchable Bragg diffraction from liquid crystal in colloid-templated structures", Europhysics Letters, Jun. 1, 2002, vol. 58, No. 5, pp. 679-685.
Magarinos et al., "Wide Angle Color Holographic infinity optics display", Air Force Systems Command, Brooks Air Force Base, Texas, AFHRL-TR-80-53, Mar. 1981, 100 pgs.
Marino et al., "Dynamical Behaviour of Policryps Gratings", Electronic-Liquid Crystal Communications, Feb. 5, 2004, 10 pgs.
Massenot et al., "Multiplexed holographic transmission gratings recorded in holographic polymer-dispersed liquid crystals: static and dynamic studies", Applied Optics, 2005, vol. 44, Issue 25, pp. 5273-5280.
Matay et al., "Planarization of Microelectronic Structures by Using Polyimides", Journal of Electrical Engineering, 2002, vol. 53, No. 3-4, pp. 86-90.
Mathews, "The LED FAQ Pages", Jan. 31, 2002, 23 pgs.
Matic, "Blazed phase liquid crystal beam steering", Proc. of the SPIE, 1994, vol. 2120, pp. 194-205.
McLeod, "Axicons and Their Uses", Journal of the Optical Society of America, Feb. 1960, vol. 50, No. 2, pp. 166-169.
McManamon et al., "A Review of Phased Array Steering for Narrow-Band Electrooptical Systems", Proceedings of the IEEE, Jun. 2009, vol. 97, No. 6, pp. 1078-1096.
McManamon et al., "Optical Phased Array Technology", Proceedings of the IEEE, Feb. 1996, vol. 84, Issue 2, pp. 268-298.
Miller, "Coupled Wave Theory and Waveguide Applications", The Bell System Technical Journal, Short Hills, NJ, Feb. 2, 1954, 166 pgs.
Nair et al., "Enhanced Two-Stage Reactive Polymer Network Forming Systems", Polymer (Guildf). May 25, 2012, vol. 53, No. 12, pp. 2429-2434, doi:10.1016/j.polymer.2012.04.007.
Nair et al., "Two-Stage Reactive Polymer Network Forming Systems", Advanced Functional Materials, 2012, pp. 1-9, DOI: 10.1002/adfm.201102742.
Naqvi et al., "Concentration-dependent toxicity of iron oxide nanoparticles mediated by increased oxidative stress", International Journal of Nanomedicine, Dovepress, Nov. 13, 2010, vol. 5, pp. 983-989.
Natarajan et al., "Electro Optical Switching Characteristics of Volume Holograms in Polymer Dispersed Liquid Crystals", Journal of Nonlinear Optical Physics and Materials, 1997, vol. 5, No. 1, pp. 666-668.
Natarajan et al., "Holographic polymer dispersed liquid crystal reflection gratings formed by visible light initiated thiol-ene photopolymerization", Polymer, vol. 47, May 8, 2006, pp. 4411-4420.
Naydenova et al., "Low-scattering Volume Holographic Material", DIT PhD Project, http://www.dit.ie/ieo/, Oct. 2017, 2 pgs.
Neipp et al., "Non-local polymerization driven diffusion based model: general dependence of the polymerization rate to the exposure intensity", Optics Express, Aug. 11, 2003, vol. 11, No. 16, pp. 1876-1886.
Nishikawa et al., "Mechanically and Light Induced Anchoring of Liquid Crystal on Polyimide Film", Mol. Cryst. Liq. Cryst., Aug. 1999, vol. 329, 8 pgs.
Nishikawa et al., "Mechanism of Unidirectional Liquid-Crystal Alignment on Polyimides with Linearly Polarized Ultraviolet Light Exposure", Applied Physics Letters, May 11, 1998, vol. 72, No. 19, 4 pgs.
Oh et al., "Achromatic diffraction from polarization gratings with high efficiency", Optic Letters, Oct. 15, 2008, vol. 33, No. 20, pp. 2287-2289.
Olson et al., "Templating Nanoporous Polymers with Ordered Block Copolymers", Chemistry of Materials, Web publication Nov. 27, 2007, vol. 20, pp. 869-890.
Ondax, Inc., "Volume Holographic Gratings (VHG)", 2005, 7 pgs.
Orcutt, "Coming Soon: Smart Glasses That Look Like Regular Spectacles", Intelligent Machines, Jan. 9, 2014, 4 pgs.
Osredkar, "A study of the limits of spin-on-glass planarization process", Informacije MIDEM, 2001, vol. 31, 2, ISSN0352-9045, pp. 102-105.
Osredkar et al., "Planarization methods in IC fabrication technologies", Informacije MIDEM, 2002, vol. 32, 3, ISSN0352-9045, 5 pgs.
Ou et al., "A Simple LCOS Optical System (Late News)", Industrial Technology Research Institute/OES Lab. Q100/Q200, SID 2002, Boston, USA, 2 pgs.
Paolini et al., "High-Power LED Illuminators in Projection Displays", Lumileds, Aug. 7, 2001, 19 pgs.
Park et al., "Aligned Single-Wall Carbon Nanotube Polymer Composites Using an Electric Field", Journal of Polymer Science: Part B: Polymer Physics, Mar. 24, 2006, DOI 10.1002/polb.20823, pp. 1751-1762.
Park et al., "Fabrication of Reflective Holographic Gratings with Polyurethane Acrylates (PUA)", Current Applied Physics, Jun. 2002, vol. 2, pp. 249-252.
Plawsky et al., "Engineered nanoporous and nanostructured films", MaterialsToday, Jun. 2009, vol. 12, No. 6, pp. 36-45.
Potenza, "These smart glasses automatically focus on what you're looking at", The Verge, Voc Media, Inc., Jan. 29, 2017, https://www.theverge.com/2017/1/29/14403924/smart-glasses-automatic-focus-presbyopia-ces-2017, 6 pgs.
Presnyakov et al., "Electrically tunable polymer stabilized liquid-crystal lens", Journal of Applied Physics, Apr. 29, 2005, vol. 97, pp. 103101-1-103101-6.
Qi et al., "P-111: Reflective Display Based on Total Internal Reflection and Grating-Grating Coupling", Society for Information Display Digest, May 2003, pp. 648-651, DOI: 10.1889/1.1832359.
Ramón, "Formation of 3D micro- and nanostructures using liquid crystals as a template", Technische Universiteit Eindhoven, Apr. 17, 2008, Thesis, DOI:http://dx.doi.org/10.6100/IR634422, 117 pgs.
Ramsey, "Holographic Patterning of Polymer Dispersed Liquid Crystal Materials for Diffractive Optical Elements", Thesis, The University of Texas at Arlington, Dec. 2006, 166 pgs.
Ramsey et al., "Holographically recorded reverse-mode transmission gratings in polymer-dispersed liquid crystal cells", Applied Physics B: Laser and Optics, Sep. 10, 2008, vol. 93, Nos. 2-3, pp. 481-489.
Reid, "Thin film silica nanocomposites for anti-reflection coatings", Oxford Advance Surfaces, www.oxfordsurfaces.com, Oct. 18, 2012, 23 pgs.
Riechert, "Speckle Reduction in Projection Systems", Dissertation, University Karlsruhe, 2009, 178 pgs.
Rossi et al., "Diffractive Optical Elements for Passive Infrared Detectors", Submitted to OSA Topical Meeting "Diffractive Optics and Micro-Optics", Quebec, Jun. 18-22, 2000, 3 pgs.
Saleh et al., "Fourier Optics : 4.1 Propagation of light in free space, 4.2 Optical Fourier Transform, 4.3 Diffraction of Light, 4.4 Image Formation, 4.5 Holography", Fundamentals of Photonics 1991, Chapter 4, pp. 108-143.
Saraswat, "Deposition & Planarization", EE 311 Notes, Aug. 29, 2017, 28 pgs.
Schreiber et al., "Laser display with single-mirror MEMS scanner", Journal of the SID 17/7, 2009, pp. 591-595.
Seiberle et al., "Photo-aligned anisotropic optical thin films", Journal of the SID 12/1, 2004, 6 pgs.

(56) References Cited

OTHER PUBLICATIONS

Serebriakov et al., "Correction of the phase retardation caused by intrinsic birefringence in deep UV lithography", Proc. of SPIE, May 21, 2010, vol. 5754, pp. 1780-1791.
Shi et al., "Design considerations for high efficiency liquid crystal decentered microlens arrays for steering light", Applied Optics, vol. 49, No. 3, Jan. 20, 2010, pp. 409-421.
Shriyan et al., "Analysis of effects of oxidized multiwalled carbon nanotubes on electro-optic polymer/liquid crystal thin film gratings", Optics Express, Nov. 12, 2010, vol. 18, No. 24, pp. 24842-24852.
Simonite, "How Magic Leap's Augmented Reality Works", Intelligent Machines, Oct. 23, 2014, 7 pgs.
Bowley et al., "Variable-wavelength switchable Bragg gratings formed in polymer-dispersed liquid crystals", Applied Physics Letters, Jul. 2, 2001, vol. 79, No. 1, pp. 9-11.
Bronnikov et al., "Polymer-Dispersed Liquid Crystals: Progress in Preparation, Investigation and Application", Journal of Macromolecular Science Part B, published online Sep. 30, 2013, vol. 52, pp. 1718-1738.
Brown, "Waveguide Displays", Rockwell Collins, 2015, 11 pgs.
Bruzzone et al., "Compact, high-brightness LED illumination for projection systems", Journal of the SID 17/12, Dec. 2009, pp. 1043-1049.
Buckley, "Colour holographic laser projection technology for heads-up and instrument cluster displays", Conference: Proc. SID Conference 14th Annual Symposium on Vehicle Displays, Jan. 2007, 5 pgs.
Buckley, "Pixtronix DMS technology for head-up displays", Pixtronix, Inc., Jan. 2011, 4 pgs.
Buckley et al., "Full colour holographic laser projector HUD", Light Blue Optics Ltd., Aug. 10, 2015, 5 pgs.
Buckley et al., "Rear-view virtual image displays", in Proc. SID Conference 16th Annual Symposium on Vehicle Displays, Jan. 2009, 5 pgs.
Bunning et al., "Effect of gel-point versus conversion on the real-time dynamics of holographic polymer-dispersed liquid crystal (HPDLC) formation", Proceedings of SPIE—vol. 5213, Liquid Crystals VII, Iam-Choon Khoo, Editor, Dec. 2003, pp. 123-129.
Bunning et al., "Electro-optical photonic crystals formed in H-PDLCs by thiol-ene photopolymerization", American Physical Society, Annual APS, Mar. 3-7, 2003, abstract #R1.135.
Bunning et al., "Holographic Polymer-Dispersed Liquid Crystals (H-PDLCs)1", Annu. Rev. Mater. Sci., 2000, vol. 30, pp. 83-115.
Bunning et al., "Morphology of Anisotropic Polymer Dispersed Liquid Crystals and the Effect of Monomer Functionality", Polymer Science: Part B: Polymer Physics, Jul. 30, 1997, vol. 35, pp. 2825-2833.
Busbee et al., "SiO2 Nanoparticle Sequestration via Reactive Functionalization in Holographic Polymer-Dispersed Liquid Crystals", Advanced Materials, Sep. 2009, vol. 21, pp. 3659-3662.
Butler et al., "Diffractive Properties of Highly Birefringent Volume Gratings: Investigation", Journal of Optical Society of America, Feb. 2002, vol. 19, No. 2, pp. 183-189.
Cai et al., "Recent advances in antireflective surfaces based on nanostructure arrays", Mater. Horiz., 2015, vol. 2, pp. 37-53.
Cameron, "Optical Waveguide Technology & Its Application in Head Mounted Displays", Proc. of SPIE, May 22, 2012, vol. 8383, pp. 83830E-1-83830E-11.
Caputo et al., "POLICRYPS Composite Materials: Features and Applications", Advances in Composite Materials—Analysis of Natural and Man-Made Materials, www.intechopen.com, Sep. 2011, pp. 93-118.
Caputo et al., "POLICRYPS Switchable Holographic Grating: A Promising Grating Electro-Optical Pixel for High Resolution Display Application", Journal of Display Technology, Mar. 2006, vol. 2, No. 1, pp. 38-51.
Carclo Optics, "Guide to choosing secondary optics", Carclo Optics, Dec. 15, 2014, www.carclo-optics.com, 48 pgs.

Chen et al, "Polarization rotators fabricated by thermally-switched liquid crystal alignments based on rubbed poly(N-vinyl carbazole) films", Optics Express, Apr. 11, 2011, vol. 19, No. 8, pp. 7553-7558.
Cheng et al., "Design of an ultra-thin near-eye display with geometrical waveguide and freeform optics", Optics Express, Aug. 2014, 16 pgs.
Chi et al., "Ultralow-refractive-index optical thin films through nanoscale etching of ordered mesoporous silica films", Optic Letters, May 1, 2012, vol. 37, No. 9, pp. 1406-1408.
Chigrinov et al., "Photo-aligning by azo-dyes: Physics and applications", Liquid Crystals Today, Sep. 6, 2006, http://www.tandfonline.com/action/journalInformation?journalCode=tlcy20, 15 pgs.
Cho et al., "Electro-optic Properties of CO2 Fixed Polymer/Nematic LC Composite Films", Journal of Applied Polymer Science, Nov. 5, 2000, vol. 81, Issue 11, pp. 2744-2753.
Cho et al., "Optimization of Holographic Polymer Dispersed Liquid Crystals for Ternary Monomers", Polymer International, Nov. 1999, vol. 48, pp. 1085-1090.
Colegrove et al., "P-59: Technology of Stacking HPDLC for Higher Reflectance", SID 00 Digest, May 2000, pp. 770-773.
Cruz-Arreola et al., "Diffraction of beams by infinite or finite amplitude-phase gratings", Investigacio' N Revista Mexicana De Fi'Sica, Feb. 2011, vol. 57, No. 1, pp. 6-16.
Dainty, "Some statistical properties of random speckle patterns in coherent and partially coherent illumination", Optica Acta, Mar. 12, 1970, vol. 17, No. 10, pp. 761-772.
Date, "Alignment Control in Holographic Polymer Dispersed Liquid Crystal", Journal of Photopolymer Science and Technology, Nov. 2, 2000, vol. 13, pp. 289-284.
Date et al., "52.3: Direct-viewing Display Using Alignment-controlled PDLC and Holographic PDLC", Society for Information Display Digest, May 2000, pp. 1184-1187, DOI: 10.1889/1.1832877.
Date et al., "Full-color reflective display device using holographically fabricated polymer-dispersed liquid crystal (HPDLC)", Journal of the SID, 1999, vol. 7, No. 1, pp. 17-22.
De Bitetto, "White light viewing of surface holograms by simple dispersion compensation", Applied Physics Letters, Dec. 15, 1966, vol. 9, No. 12, pp. 417-418.
Developer World, "Create customized augmented reality solutions", printed Oct. 19, 2017, LMX-001 holographic waveguide display, Sony Developer World, 3 pgs.
Dhar et al., "Recording media that exhibit high dynamic range for digital holographic data storage", Optics Letters, Apr. 1, 1999, vol. 24, No. 7, pp. 487-489.
Domash et al., "Applications of switchable Polaroid holograms", SPIE Proceedings, vol. 2152, Diffractive and Holographic Optics Technology, Jan. 23-29, 1994, Los Angeles, CA, pp. 127-138, ISBN: 0-8194-1447-6.
Drake et al., "Waveguide Hologram Fingerprint Entry Device", Optical Engineering, Sep. 1996, vol. 35, No. 9, pp. 2499-2505.
Drevensek-Olenik et al., "In-Plane Switching of Holographic Polymer-Dispersed Liquid Crystal Transmission Gratings", Mol. Cryst. Liq. Cryst., 2008, vol. 495, pp. 177/[529]-185/[537].
Drevensek-Olenik et al., "Optical diffraction gratings from polymer-dispersed liquid crystals switched by interdigitated electrodes", Journal of Applied Physics, Dec. 1, 2004, vol. 96, No. 11, pp. 6207-6212.
Ducharme, "Microlens diffusers for efficient laser speckle generation", Optics Express, Oct. 29, 2007, vol. 15, No. 22, pp. 14573-14579.
Duong et al., "Centrifugal Deposition of Iron Oxide Magnetic Nanorods for Hyperthermia Application", Journal of Thermal Engineering, Yildiz Technical University Press, Istanbul, Turkey, Apr. 2015, vol. 1, No. 2, pp. 99-103.
Fattal et al., "A multi directional backlight for a wide-angle glasses-free three-dimensional display", Nature, Mar. 21, 2012, vol. 495, pp. 348-351.
Fontecchio et al., "Spatially Pixelated Reflective Arrays from Holographic Polymer Dispersed Liquid Crystals", SID 00 Digest, May 2000, pp. 774-776.

(56) References Cited

OTHER PUBLICATIONS

Forman et al., "Materials development for PhotoINhibited Super-Resolution (PINSR) lithography", Proc. of SPIE, 2012, vol. 8249, 824904, doi: 10.1117/12.908512, pp. 824904-1-824904-9.
Forman et al., "Radical diffusion limits to photoinhibited super-resolution lithography", Phys.Chem. Chem. Phys., May 31, 2013, vol. 15, pp. 14862-14867.
Friedrich-Schiller, "Spatial Noise and Speckle", Version 1.12.2011, Dec. 2011, Abbe School of Photonics, Jena, Germany, 27 pgs.
Fujii et al., "Nanoparticle-polymer-composite volume gratings incorporating chain-transfer agents for holography and slow-neutron optics", Optics Letters, Apr. 25, 2014, vol. 39, Issue 12, 5 pgs.
Funayama et al., "Proposal of a new type thin film light-waveguide display device using", The International Conference on Electrical Engineering, 2008, No. P-044, 5 pgs.
Gabor, "Laser Speckle and its Elimination", BM Research and Development, Eliminating Speckle Noise, Sep. 1970, vol. 14, No. 5, pp. 509-514.
Gardiner et al., "Bistable liquid-crystals reduce power consumption for high-efficiency smart glazing", SPIE, 2009, 10.1117/2.1200904.1596, 2 pgs.
Giancola, "Holographic Diffuser, Makes Light Work of Screen Tests", Photonics Spectra, 1996, vol. 30, No. 8, p. 121-122.
Goodman, "Some fundamental properties of speckle", J. Opt. Soc. Am., Nov. 1976, vol. 66, No. 11, pp. 1145-1150.
Goodman, "Statistical Properties of Laser Speckle Patterns", Applied Physics, 1975, vol. 9, Chapter 2, Laser Speckle and Related Phenomena, pp. 9-75.
Goodman et al., "Speckle Reduction by a Moving Diffuser in Laser Projection Displays", The Optical Society of America, 2000, 15 pgs.
Guldin et al., "Self-Cleaning Antireflective Optical Coatings", Nano Letters, Oct. 14, 2013, vol. 13, pp. 5329-5335.
Guo et al., "Review Article: A Review of the Optimisation of Photopolymer Materials for Holographic Data Storage", Physics Research International, vol. 2012, Article ID 803439, Academic Editor: Sergi Gallego, 16 pages, http://dx.doi.org/10.1155/2012/803439, May 4, 2012.
Han et al., "Study of Holographic Waveguide Display System", Advanced Photonics for Communications, 2014, 4 pgs.
International Preliminary Report on Patentability for International Application No. PCT/GB2013/000273, Report issued Dec. 23, 2014, dated Dec. 31, 2014, 8 Pgs.
International Preliminary Report on Patentability for International Application No. PCT/GB2015/000228, Report issued Feb. 14, 2017, dated Feb. 23, 2017, 11 Pgs.
International Preliminary Report on Patentability for International Application PCT/GB2009/051676, issued Jun. 14, 2011, dated Jun. 23, 2011, 6 pgs.
International Preliminary Report on Patentability for International Application PCT/GB2011/000349, issued Sep. 18, 2012, dated Sep. 27, 2012, 10 pgs.
International Preliminary Report on Patentability for International Application PCT/GB2012/000331, issued Oct. 8, 2013, dated Oct. 17, 2013, 8 pgs.
International Preliminary Report on Patentability for International Application PCT/GB2012/000677, issued Feb. 25, 2014, dated Mar. 6, 2014, 5 pgs.
International Preliminary Report on Patentability for International Application PCT/GB2013/000005, issued Jul. 8, 2014, dated Jul. 17, 2014, 12 pgs.
International Preliminary Report on Patentability for International Application PCT/GB2014/000295, issued Feb. 2, 2016, dated Feb. 11, 2016, 4 pgs.
International Preliminary Report on Patentability for International Application PCT/GB2015/000225, issued Feb. 14, 2017, dated Feb. 23, 2017, 8 pgs.
International Preliminary Report on Patentability for International application PCT/GB2015/000274, issued Mar. 28, 2017, dated Apr. 6, 2017, 8 pgs.
International Preliminary Report on Patentability for International Application PCT/GB2016/000014, issued Jul. 25, 2017, dated Aug. 3, 2017, 7 pgs.
International Preliminary Report on Patentability for International Application PCT/US2014/011736, issued Jul. 21, 2015, dated Jul. 30, 2015, 9 pgs.
International Preliminary Report on Patentability for International Application PCT/US2016/017091, issued Aug. 15, 2017, dated Aug. 24, 2017, 5 pgs.
International Search Report and Written Opinion for International Application No. PCT/GB2015/000228, Search completed May 4, 2011, dated Jul. 15, 2011, 15 Pgs.
International Search Report and Written Opinion for International Application No. PCT/US2014/011736, completed Apr. 18, 2014, dated May 8, 2014, 10 pgs.
International Search Report and Written Opinion for International Application PCT/GB2009/051676, completed May 10, 2010, dated May 18, 2010, 7 pgs.
International Search Report and Written Opinion for International Application PCT/US2016/017091, completed by the European Patent Office on Apr. 20, 2016, 7 pgs.
International Search Report for International Application No. PCT/GB2014/000295, completed Nov. 18, 2014, dated Jan. 5, 2015, 4 pgs.
International Search Report for International Application PCT/GB2017/000040, dated Jul. 18, 2017, completed Jul. 10, 2017, 3 pgs.
International Search Report for PCT/GB2011/000349, completed by the European Patent Office on Aug. 17, 2011, 4 pgs.
International Search Report for PCT/GB2012/000331, completed by the European Patent Office on Aug. 29, 2012, 4 pgs.
International Search Report for PCT/GB2012/000677, completed by the European Patent Office on Dec. 10, 2012, 4 pgs.
International Search Report for PCT/GB2013/000005, completed by the European Patent Office on Jul. 16, 2013, 3 pgs.
International Search Report for PCT/GB2013/000273, Completed by the European Patent Office on Aug. 30, 2013, 4 pgs.
International Search Report for PCT/GB2015/000203, completed by the European Patent Office on Oct. 9, 2015, 4 pgs.
International Search Report for PCT/GB2015/000225, completed by the European Patent Office on Nov. 10, 2015, dated Dec. 2, 2016, 5 pgs.
International Search Report for PCT/GB2015/000274, completed by the European Patent Office on Jan. 7, 2016, 4 pgs.
International Search Report for PCT/GB2016/000014, completed by the European Patent Office on Jun. 27, 2016, 4 pgs.
Written Opinion for International Application No. PCT/GB2011/000349, completed Aug. 17, 2011, dated Aug. 25, 2011, 9 pgs.
Written Opinion for International Application No. PCT/GB2012/000331, completed Aug. 29, 2012, dated Sep. 6, 2012, 7 pgs.
Written Opinion for International Application No. PCT/GB2012/000677, completed Dec. 10, 2012, dated Dec. 17, 2012, 4 pgs.
Written Opinion for International Application No. PCT/GB2013/000005, search completed Jul. 16, 2013, dated Jul. 24, 2013, 11 pgs.
Written Opinion for International Application No. PCT/GB2013/000273, Search completed Aug. 30, 2013, dated Sep. 9, 2013, 7 pgs.
Written Opinion for International Application No. PCT/GB2014/000295, search completed Nov. 18, 2014, dated Jan. 5, 2015, 3 pgs.
Written Opinion for International Application No. PCT/GB2015/000225, search completed Nov. 10, 2015, dated Feb. 4, 2016, 7 pgs.
Written Opinion for International Application No. PCT/GB2015/000274, search completed Jan. 7, 2016, dated Jan. 19, 2016, 7 pgs.
Written Opinion for International Application No. PCT/GB2016/000014, search completed Jun. 27, 2016, dated Jul. 7, 2016, 6 pgs.
Written Opinion for International Application No. PCT/GB2016/000051, Search completed Aug. 11, 2016, dated Aug. 22, 2016, 7 Pgs.
Written Opinion for International Application No. PCT/GB2017/000040, search completed Jul. 10, 2017, dated Jul. 18, 2017, 6 pgs.
"Agilent ADNS-2051 Optical Mouse Sensor: Data Sheet", Agilent Technologies, Jan. 9, 2002, 40 pgs.
"Application Note—MOXTEK ProFlux Polarizer use with LCOS displays", CRL Opto Limited, http://www.crlopto.com, 2003, 6 pgs.

(56) References Cited

OTHER PUBLICATIONS

"Application Note AN16: Optical Considerations for Bridgelux LED Arrays", BridgeLux, Jul. 31, 2010, 23 pgs.
Extended European Search Report for EP Application No. 13192383, dated Apr. 2, 2014, 7 pgs.
Extended European Search Report for European Application No. 13765610.4 dated Feb. 16, 2016, 6 pages.
Extended European Search Report for European Application No. 15187491.4, search completed Jan. 15, 2016, dated Jan. 28, 2016, 5 pgs.
International Preliminary Report on Patentability for International Application No. PCT/GB2010/000835, dated Nov. 1, 2011, dated Nov. 10, 2011, 9 pgs.
International Preliminary Report on Patentability for International Application No. PCT/GB2010/001920, dated Apr. 11, 2012, dated Apr. 19, 2012, 10 pgs.
International Preliminary Report on Patentability for International Application No. PCT/GB2015/000203, dated Mar. 21, 2017, dated Mar. 30, 2017, 8 pgs.
International Preliminary Report on Patentability for International Application No. PCT/GB2016/000036, dated Aug. 29, 2017, dated Sep. 8, 2017, 8 pgs.
International Preliminary Report on Patentability for International Application No. PCT/GB2016/000065, dated Oct. 3, 2017, dated Oct. 12, 2017, 8 pgs.
International Preliminary Report on Patentability for International Application PCT/GB2017/000055, Report dated Oct. 16, 2018, dated Oct. 25, 2018, 9 Pgs.
International Preliminary Report on Patentability for International Application PCT/GB2017/000040, Report dated Sep. 25, 2018, dated Oct. 4, 2018, 7 pgs.
International Preliminary Report on Patentability for PCT Application No. PCT/US2013/038070, dated Oct. 28, 2014, 6 pgs.
International Search Report and Written Opinion for International Application PCT/GB2017/000055, Search completed Jul. 19, 2017, dated Jul. 26, 2017, 12 Pgs.
International Search Report and Written Opinion for International Application No. PCT/GB2010/000835, completed Oct. 26, 2010, dated Nov. 8, 2010, 12 pgs.
International Search Report and Written Opinion for International Application No. PCT/GB2010/001920, completed Mar. 29, 2011, dated Apr. 6, 2011, 15 pgs.
International Search Report and Written Opinion for International Application No. PCT/GB2016/000036, completed Jul. 4, 2016, dated Jul. 13, 2016, 10 pgs.
International Search Report and Written Opinion for International Application No. PCT/GB2016/000065, completed Jul. 14, 2016, dated Jul. 27, 2016, 10 pgs.
International Search Report and Written Opinion for International Application No. PCT/US2013/038070, completed Aug 12 2013, dated Aug 14, 2013, 12 pgs.
International Search Report and Written Opinion for International Application No. PCT/US2018/012691, completed Mar. 10, 2018, dated Mar 28, 2018, 16 pgs.
International Search Report and Written Opinion for International Application No. PCT/US2018/015553, Search completed Aug. 6, 2018, dated Sep. 19, 2018, 12 Pgs.
International Search Report and Written Opinion for International Application No. PCT/US2018/037410, Search completed Aug. 16, 2018, dated Aug. 30, 2018, 11 Pgs.
International Search Report and Written Opinion for International Application No. PCT/US2018/048636, Search completed Nov. 1, 2018, dated Nov. 15, 2018, 16 Pgs.
International Search Report and Written Opinion for International Application PCT/GB2016/000181, completed Dec. 21, 2016, dated Feb. 27, 2017, 21 pgs.
Written Opinion for International Application No. PCT/GB2015/000203, completed Oct. 29, 2015, dated Nov. 16, 2015, 7 pgs.
"Navy awards SGB Labs a contract for HMDs for simulation and training", Press releases, DigiLens, Oct. 2012, pp. 1-2.
"Plastic has replaced glass in photochromic lens", 2003, 1 page.
"USAF Awards SBG Labs an SBIR Contract for Wide Field of View HUD", Press Release ,SBG Labs DigiLens, Apr. 2014, 2 pgs.
"Webster's Third New International Dictionary 433", (1986), 3 pages.
Amitai et al., "Visor-display design based on planar holographic optics", Applied Optics, vol. 34, No. 8, Mar. 10, 1995, pp. 1352-1356.
Cameron, "The Application of Holographic Optical Waveguide Technology to Q-Sight™ Family of Helmet Mounted Displays", Proc. of SPIE, 2009, 11 pages, vol. 7326.
Crawford, "Electrically Switchable Bragg Gratings", Optics & Photonics News, pp. 54-59, Apr. 2003.
Dabrowski, "High Birefringence Liquid Crystals", Crystals, Sep. 3, 2013, vol. 3, No. 3, pp. 443-482.
Irie, "Photochromic diarylethenes for photonic devices", Pure and Applied Chemistry, 1996, pp. 1367-1371, vol. 68, No. 7, IUPAC.
Levola et al., "Replicated slanted gratings with a high refractive index material for in and outcoupling of light", Optics Express, vol. 15, Issue 5, pp. 2067-2074 (2007).
Moffitt, "Head-Mounted Display Image Configurations", retrieved from the internet on Dec. 19, 2014, dated May 2008, 25 pgs.
Natarajan et al., "Electro-Optical Switching Characteristics of Volume Holograms in Polymer Dispersed Liquid Crystals", J. of Nonlinear Optical Physics Materials, Jan. 1996, vol. 5, No. 1, pp. 89-98.
Nordin G et al., "Diffraction Properties of Stratified Volume Holographic Optical Elements", Journal of the Optical Society of America A., vol. 9, No. 12, Dec. 1992, pp. 2206-2217.
Sagan et al., "Electrically Switchable Bragg Grating Technology for Projection Displays", Proc. SPIE. vol. 4294, Jan. 24, 2001, pp. 75-83.
Schechter et al., "Compact beam expander with linear gratings", Applied Optics, vol. 41, No. 7, Mar. 1, 2002, pp. 1236-1240.
Urey, "Diffractive exit pupil expander for display applications", Applied Optics, vol. 40, Issue 32, pp. 5840-5851 (2001).
Wisely, "Head up and head mounted display performance improvements through advanced techniques in the manipulation of light", Proc. of SPIE, 2009, 10 pages, vol. 7327.
International Search Report and Written Opinion for International Application No. PCT/US2019/012764, completed Mar. 1, 2019, dated Mar. 18, 2019, 9 pgs.

* cited by examiner (A)

(B)

(C)

METHOD FOR HOLOGRAPHIC MASTERING AND REPLICATION

CROSS-REFERENCE TO RELATED APPLICATIONS

This application is a U.S. National Phase of PCT Application No. PCT/GB2015/000228 filed on Aug. 5, 2015, which claims the benefit of U.S. Provisional Patent Application No. 61/999,867 filed Aug. 8, 2014, the disclosures of which are herein incorporated by reference in their entirety.

BACKGROUND OF THE INVENTION

The present invention relates to holography and more particularly to an improved method for mastering and replicating holograms.

Replication of holograms is normally carried out by preparing a master hologram of the desired prescription which is then copied into another holographic recording material using a contact process. The master is usually made using a classical two-beam holographic recording system comprising an object beam and a reference beam. However, the master could itself be a copy of another master. In the case of a transmission hologram the copying process is based on interfering the diffracted and zero order beams produced by master to form a grating within the copy hologram material. Subject to processing variations such as shrinkage the holographic pattern or grating formed in the copy should be identical to the one in the master. This procedure may be used in mass production roll-to-roll processes. The principles of holographic replication and industrial processes for the mass production of holograms are well documented in the literature.

The optical design benefits of diffractive optical elements (DOEs) are well known, including unique and efficient form factors and the ability to encode complex optical functions such as optical power and diffusion into thin layers. Bragg gratings (also commonly termed volume phase grating or holograms), which offer the highest diffraction efficiencies, have been widely used in devices such as Head Up Displays. An important class of Bragg grating devices is known as a Switchable Bragg Grating (SBG). An SBG is a diffractive device formed by recording a volume phase grating, or hologram, in a polymer dispersed liquid crystal (PDLC) mixture. Typically, SBG devices are fabricated by first placing a thin film of a mixture of photopolymerizable monomers and liquid crystal material between parallel glass plates or substrates. Techniques for making and filling glass cells are well known in the liquid crystal display industry. One or both glass substrates support electrodes, typically transparent indium tin oxide films, for applying an electric field across the PDLC layer. A volume phase grating is then recorded by illuminating the liquid material with two mutually coherent laser beams, which interfere to form the desired grating structure. During the recording process, the monomers polymerize and the HPDLC mixture undergoes a phase separation, creating regions densely populated by liquid crystal micro-droplets, interspersed with regions of clear polymer. The alternating liquid crystal-rich and liquid crystal-depleted regions form the fringe planes of the grating. The resulting volume phase grating can exhibit very high diffraction efficiency, which may be controlled by the magnitude of the electric field applied across the PDLC layer. When an electric field is applied to the hologram via transparent electrodes, the natural orientation of the LC droplets is changed causing the refractive index modulation of the fringes to reduce and the hologram diffraction efficiency to drop to very low levels. Note that the diffraction efficiency of the device can be adjusted, by means of the applied voltage, over a continuous range from near 100% efficiency with no voltage applied to essentially zero efficiency with a sufficiently high voltage applied.

SBGs may be used to provide transmission or reflection gratings for free space applications. SBGs may be implemented as waveguide devices in which the HPDLC forms either the waveguide core or an evanescently coupled layer in proximity to the waveguide. In one particular configuration to be referred to here as Substrate Guided Optics (SGO) the parallel glass plates used to form the HPDLC cell provide a total internal reflection (TIR) light guiding structure. Light is "coupled" out of the SBG when the switchable grating diffracts the light at an angle beyond the TIR condition. SGOs are currently of interest in a range of display and sensor applications. Although much of the earlier work on HPDLC has been directed at reflection holograms transmission devices are proving to be much more versatile as optical system building blocks and tend to be much easier to fabricate.

Typically, the HPDLC used in SBGs comprise liquid crystal (LC), monomers, photoinitiator dyes, and coinitiators. The mixture frequently includes a surfactant. The patent and scientific literature contains many examples of material systems and processes that may be used to fabricate SBGs. Two fundamental patents are: U.S. Pat. No. 5,942,157 by Sutherland, and U.S. Pat. No. 5,751,452 by Tanaka et al. both filings describe monomer and liquid crystal material combinations suitable for fabricating SBG devices.

One of the known attributes of transmission SBGs is that the LC molecules tend to align normal to the grating fringe planes. The effect of the LC molecule alignment is that transmission SBGs efficiently diffract P polarized light (ie light with the polarization vector in the plane of incidence) but have nearly zero diffraction efficiency for S polarized light (ie light with the polarization vector normal to the plane of incidence. Transmission SBGs may not be used at near-grazing incidence as the diffraction efficiency of any grating for P polarization falls to zero when the included angle between the incident and reflected light is small. A glass light guide in air will propagate light by total internal reflection if the internal incidence angle is greater than about 42 degrees. Thus waveguide transmission SBGs may be used if the internal incidence angles are in the range of 42 to about 70 degrees, in which case the light extracted from the light guide by the gratings will be predominantly p-polarized.

Normally SBGs diffract when no voltage is applied and are switching into their optically passive state when a voltage is application other times. However SBGs can be designed to operate in reverse mode such that they diffract when a voltage is applied and remain optically passive at all other times. Methods for fabricating reverse mode SBGs are disclosed in a U.S. Provisional Patent Application No. 61/573,066. with filing date 24 Aug. 2011 by the present inventors entitled IMPROVEMENTS TO HOLOGRAPHIC POLYMER DISPERSED LIQUID CRYSTAL MATERIALS AND which is incorporated by reference herein in its entirety. The same reference also discloses how SBGs may be fabricated using flexible plastic substrates to provide the benefits of improved ruggedness, reduce weight and safety in near eye applications.

The present invention is motivated by the requirement to record SBGs of differing optical prescriptions for use in image transmitting waveguides currently being designed for Head Up Displays (HUDs) and Head Mounted Displays (HMDs). The holograms may configured as stacks U.S. Pat. No. 8,233,204 entitled OPTICAL DISPLAYS U.S. patent application Ser. No. 13/844,456 entitled WIDE FIELD OF VIEW COLOR DISPLAY; or tessellated in single layers as disclosed in U.S. patent application Ser. No. 13/869,866 entitled APERTURE SAMPLING FOR DUAL AXIS SAMPLING. In such applications the holograms are used to tile a field of view (FOV) space and/or increase the size of the exit pupil. For large FOV full colour displays the number of holographic prescriptions can be high as the FOV of a holographic element is limited by diffraction efficiency angular bandwidth. Since the cost of fabricating masters using conventional holographic interferometry or ruling processes is currently very high this can make the manufacture of large FOV displays very expensive. Exemplary holographic masters and replicas thereof) are provided by companies such as Holographix Inc. (MA). Typically, masters are surface relief components fabricated using holographic, binary grating etching or mechanical ruling processes. Desirably, a mastering and replication process for large FOV holographic waveguides should provide a range of optical prescriptions spanning the required FOV space using a minimal number of master components. Ideally this should be accomplished with just one master. Applications such as HMDs and HUDs typically demand tight control of the diffraction efficiency and geometrical optical characteristics of the replicated holograms. In particular there is a need for precise control of the intensities of the diffracted and zero order beams. Currently available holographic mastering process suffer from the problem that the relative intensities of the diffracted and zero orders cannot be controlled to better than ±5%. As disclosed in a co-pending patent application PCT/GB2013/000273 the inventors have discovered that a perfect copy can be made if the master hologram is "over-modulated" by a small amount. Overmodulation in this context means that the refractive index modulation of the hologram is a little above that required to achieve the desired beam ratio. The next step is to separately attenuate the master beams to bring them to the desired ratio. Typically we require 50/50 or 1:1. However, the inventors have found that making a perfect master with the appropriate level of over-modulation, which is typically 5-10%, is very difficult in practice. To the best of the inventors' knowledge the required levels of index modulation control have not been achieved using conventional holographic recording processes using currently available holographic recording materials such as photopolymers and Photo Thermo Refractive (PTR) materials. Desirably a holographic mastering process should include methods for controlling the hologram modulation.

There is requirement for an efficient and cost-effective method for replicating holograms with a multiplicity of holographic prescriptions from a single master.

SUMMARY OF THE INVENTION

There is provided a efficient and cost-effective method for replicating holograms with a multiplicity of holographic prescriptions from a single master.

The objects of the invention are achieved in a first embodiment in which there is provided a method for mastering and replicating holograms, the method comprising:
a) providing N substrates each containing a first hologram for diffracting incident light from a first direction into diffracted light in a second direction; providing a second holographic recording medium; and providing a third holographic recording medium;
b) stacking in sequence the first holograms 1-N onto the second holographic recording medium;
c) illuminating external surface of the first hologram N with light of a first polarization in a first direction;
d) the first holograms 1-N diffracting the light into zero order light in the first direction and diffracted light in the second direction;
e) the first direction light and the second direction light interfering in the second holographic recording medium to form a second hologram;
f) placing the second hologram in contact with the third holographic recording medium;
g) illuminating external surface of the second hologram with light in the first direction;
h) the second hologram diffracting the light into zero order light in the first direction and diffracted light in the second direction;
i) the diffracted and first order light interfering in the third holographic recording medium to form a third hologram.

In one embodiment of the invention steps c) to i) are repeated for a multiplicity of values of the first and second directions. The first and second directions are limited by the diffraction efficiency angular bandwidth of said first hologram.

In one embodiment of the invention the first holograms 1,N are provided by the steps of: configuring a laser holographic recording apparatus to form a first recording beam in the first direction and a second recording beams in the second direction; providing N substrates each containing a first holographic medium; and the first and second beams interfering within each the first holographic medium substrate to form the first hologram in each the substrate.

In one embodiment the first holograms 1,N are surface relief structures. In one embodiment the first holograms 1,N are binary structures.

In one embodiment step a) further comprises providing a half wave plate (HWP) and step c) further comprises disposing the HWP between the holographic recording medium substrate and the first hologram stack. In a further embodiment step a) further comprises providing a linear polarizer and in step c) further comprises disposing the linear polarizer between the HWP and the first hologram stack.

In one embodiment the first holographic recording medium is a HPDLC for recording a SBG, the second holographic recording medium is a holographic photopolymer and the third holographic recording medium is a holographic photopolymer.

In one embodiment of the invention the third hologram is a copy of the second hologram and the second hologram is a copy of the first hologram.

In one embodiment of the invention the third holographic recording medium comprises HPDLC material components for forming one of a forward mode SBG or a reverse mode SBG.

In one embodiment of the invention the zero order light and diffracted light in at least one step d) and step i) have power substantially in the ratio of 1:1.

In one embodiment of the invention the third holographic recording medium has a substrate fabricated from optical plastic.

In one embodiment of the invention the second hologram and the third holographic recording medium are separated by an air gap. In one embodiment the second hologram and the third holographic recording medium are in contact.

In one embodiment of the invention the third holographic recording medium forms part of a mechanically translatable continuous lamina.

In one embodiment of the invention there is further provided a voltage generator for applied a voltage across at least one of the second hologram and the third holographic recording medium. The applied voltage varies the refractive index modulation of at least one of the second hologram and the third hologram during steps g) to i).

In one embodiment of the invention the second holographic recording medium is one of a photo thermal refractive or holographic photopolymer, a forward mode HPDLC mixture or a reverse mode HPDLC mixture. In one embodiment of the invention the third holographic recording medium is one of a photo thermal refractive or photopolymer, a forward mode HPDLC mixture or a reverse mode HPDLC mixture.

In one embodiment of the invention the diffracting thickness of the first hologram is less than or equal to 1 micron. In one embodiment of the invention the diffracting thickness of the first hologram is less than or equal to 2 micron.

In one embodiment of the invention there is provided a method of mastering and replicating holograms, the method comprising:
a) providing a laser apparatus for forming a first recording beam in a first direction and a second recording beams in a second direction; N substrates each containing a first HPDLC mixture; a holographic photopolymer; a copy holographic substrate containing a second HPDLC mixture; a HWP; and a linear polarizer;
b) the first and second beams interfering within each the first HPDLC mixture to form a first hologram in each substrate;
c) stacking in sequence the linear polarizer, HWP and first holograms 1-N onto the second holographic photopolymer;
d) illuminating external surface of the hologram N with light of a first polarization in the first direction;
e) the first holograms 1-N diffracting the light into zero order light in the first direction and diffracted light in the second direction;
f) the HWF rotating the incident light polarization through ninety degrees into a second polarization;
g) the linear polarizer removing residual first polarization light;
h) the first direction light and the second direction light interfering in the holographic photopolymer to form a second hologram;
i) placing the second hologram in contact with the copy holographic substrate;
j) illuminating external surface of the second hologram with light of the second polarization in the first direction;
k) the second hologram diffracting the light into zero order light in the first direction and diffracted light in the second direction;
l) the diffracted and first order light interfering in the copy holographic substrate to form a third hologram.

In one embodiment of the invention steps d) to l) are repeated for a multiplicity of values of the first and second directions, wherein the first and second directions are limited by the diffraction efficiency angular bandwidth of the first hologram.

In one embodiment of the invention the first polarization is P-polarization and the second polarization is S-polarization.

A more complete understanding of the invention can be obtained by considering the following detailed description in conjunction with the accompanying drawings, wherein like index numerals indicate like parts. For purposes of clarity, details relating to technical material that is known in the technical fields related to the invention have not been described in detail.

DETAILED DESCRIPTION OF THE INVENTION

Figure 1:
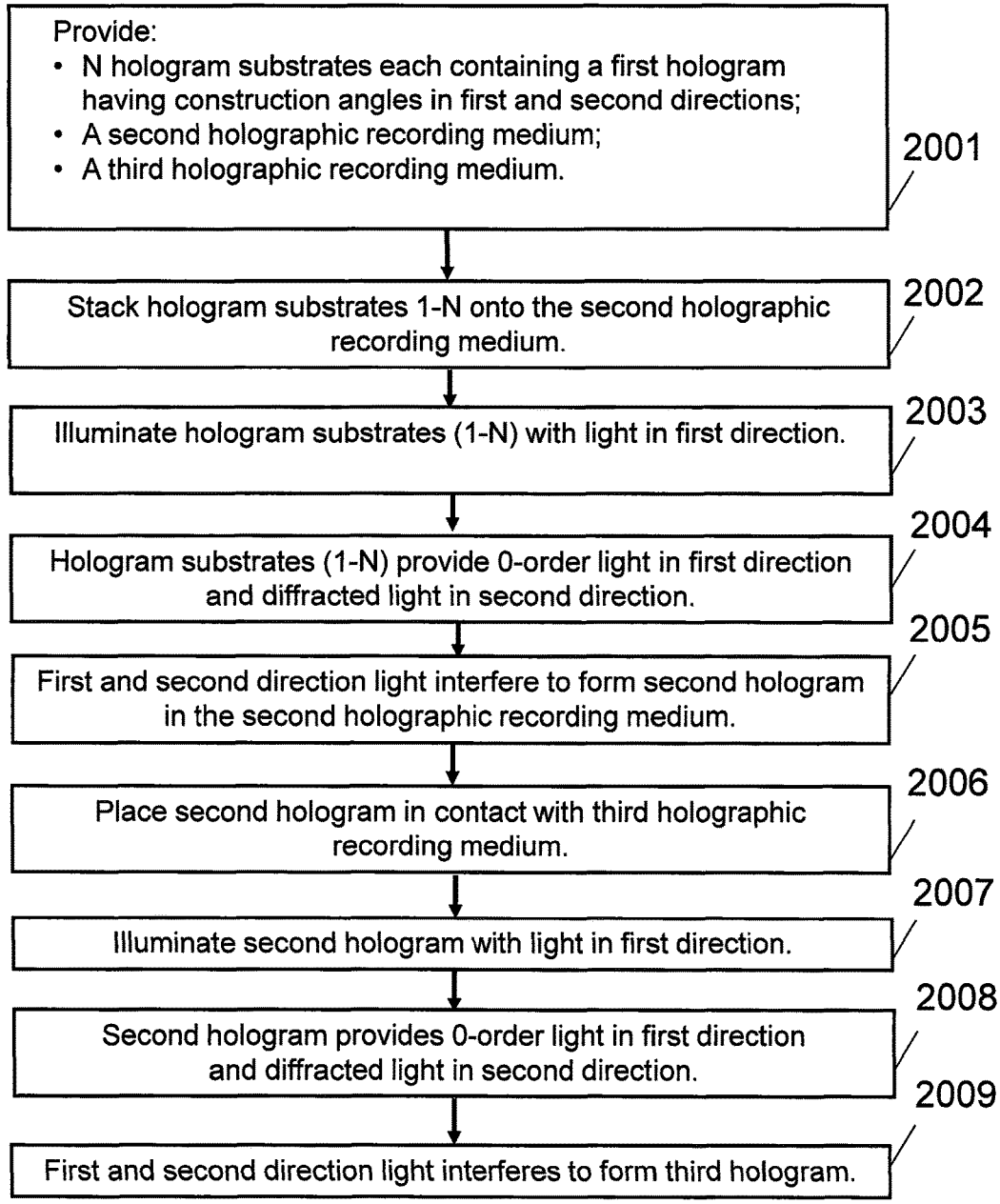
FIG. 1 is a flowchart illustrating a process for mastering and replicating holograms in one embodiment of the invention.

The invention will now be further described by way of example only with reference to the accompanying drawings. It will apparent to those skilled in the art that the present invention may be practiced with some or all of the present invention as disclosed in the following description. For the purposes of explaining the invention well-known features of optical technology known to those skilled in the art of optical design and visual displays have been omitted or simplified in order not to obscure the basic principles of the invention. Unless otherwise stated the term "on-axis" in relation to a ray or a beam direction refers to propagation parallel to an axis normal to the surfaces of the optical components described in relation to the invention. In the following description the terms light, ray, beam and direction may be used interchangeably and in association with each other to indicate the direction of propagation of light energy along rectilinear trajectories. Parts of the following description will be presented using terminology commonly employed by those skilled in the art of optical design. The term "grating" may be used to describe a hologram. It should also be noted that in the following description of the invention repeated usage of the phrase "in one embodiment" does not necessarily refer to the same embodiment.

The present invention provides a method for producing holograms with a multiplicity of holographic prescriptions from a single master. The master which will be described as a first hologram is characterised by a wide angular bandwidth. Desirably, the first hologram also has large index modulation. This allows a wide range of input and diffracted beam angles to be generated by the first hologram. For each set of input and diffracted beam angle an intermediate master (second) hologram is recorded. The resulting set of intermediate master (second) holograms may then be used to contact copy the hologram into the desired copy medium to provide a copy (third) hologram. A wide bandwidth hologram will have a small thickness which results have relatively low diffraction efficiency. In the proposed method the problem of low diffraction efficiency is overcome by stacking a multiplicity of holographic substrates each containing the first hologram. This stack is then overlaid on stacked on a second holographic recording medium substrate. The first hologram is designed to diffract light from a first direction into a second direction. When exposed to illumination from the first direction zero order and diffracted light from each (first) hologram in the stack interfere in the second holographic recording medium substrate forming a second hologram. The second hologram is then copied into a third holographic recording medium substrate to provide the final copy hologram. The invention may be used to master and replicate any type of hologram in any type of holographic recording material. The invention may be used to master and replicated passive or switchable holograms. The holograms may be single elements or switchable arrays as described in PCT/GB2013/000273. Voltages may be applied across the second hologram to control the index modulation and hence fine tune beam ratios during the final contact copying stage. Voltages may also be applied across the first holograms during the recording of the second hologram.

In one embodiment of the invention there is provided a method for mastering and replicating holograms, the method comprising:

a) providing N substrates each containing a first hologram for diffracting incident light from a first direction into diffracted light in a second direction; providing a second holographic recording medium; and providing a third holographic recording medium;

b) stacking in sequence the first holograms 1-N onto the second holographic recording medium;

c) illuminating external surface of the first hologram N with light of a first polarization in a first direction;

d) the first holograms 1-N diffracting the light into zero order light in the first direction and diffracted light in the second direction;

e) the first direction light and the second direction light interfering in the second holographic recording medium to form a second hologram;

f) placing the second hologram in contact with the third holographic recording medium;

g) illuminating external surface of the second hologram with light in the first direction;

h) the second hologram diffracting the light into zero order light in the first direction and diffracted light in the second direction;

i) the diffracted and first order light interfering in the third holographic recording medium to form a third hologram.

In one embodiment of the invention steps c) to i) are repeated for a multiplicity of values of the first and second directions. The first and second directions are limited by the diffraction efficiency angular bandwidth of said first hologram.

A method of replicating a hologram in one embodiment of the invention in accordance with the basic principles of the invention is shown in the flow diagram in FIG. 1. Referring to the flow diagram, we see that the method comprises the following steps:

At step 2001 provide N hologram substrates each containing a first hologram having construction angles in first and second directions; a second holographic recording medium; and a third holographic recording medium.

At step 2002 stack hologram substrates 1-N onto the second holographic recording medium At step 2003 illuminate hologram substrates (1-N) with light in the first direction At step 2004 hologram substrates (1-N) provide 0-order light in the first direction and diffracted light in the second direction.

At step 2005 the first and second direction light interferes to form a second hologram in the second holographic recording medium.

At step 2006 place the second hologram in contact with the third holographic recording medium.

At step 2007 illuminate the second hologram with light in the first direction.

At step 2008 the second hologram provides 0-order light in the first direction and diffracted light in the second direction.

At step 2009 the first and second direction light interferes to form the third hologram.

Note that in terms of defining the holographic prescription a hologram having construction angles in the first and second directions is equivalent to the same hologram diffracting incident light from a first direction into diffracted light in a second direction.

FIG. 2A shows the stack of first holograms labelled by 11-12. FIG. 2B shows the stack of first holograms overlaying of the second holographic recording medium 40. FIG. 2C shows the second hologram overlaying the third holographic recording medium.

In one embodiment of the invention the first holograms 1,N are provided by the steps of firstly, configuring a laser holographic recording apparatus to form a first recording beam in the first direction and a second recording beams in the second direction; secondly, providing N substrates each containing a first holographic medium; and, thirdly, the first and second beams interfering within each the first holographic medium substrate to form the first hologram in each substrate. The present invention does not assume that any particular holographic recording process or HPDLC material is used to fabricate the first holograms. Any of the processes and material systems currently used to fabricate SBGs may be used such as for example the ones disclosed in U.S. Pat. No. 5,942,157 by Sutherland, and U.S. Pat. No. 5,751,452 by Tanaka. The master may be recorded using currently available industrial processes such as the ones provided by companies such as Holographix LLC (MA). Ideally, the master would be recorded using remote computer controlled equipment, which by removing human presence eliminates vibrations and thermal variations that may adversely affect the quality of the recording process. Ideally, the master recording laboratory should be protected from vibrations from external disturbances. Desirably, the master hologram recording equipment will provide active fringe stabilization.

In the preferred embodiments the first hologram and third (copy) holograms are SBGs. In one embodiment the SBGs are reverse mode such the hologram diffracts when a voltage is applied and remains optically passive at all other times. A reverse mode SBG will provide lower power consumption. A reverse mode HPDLC and methods for fabricating reverse mode SBG devices is disclosed in U.S. Provisional Patent Application No. 61/573,066. with filing date 24 Aug. 2011 by the present inventors entitled IMPROVEMENTS TO HOLOGRAPHIC POLYMER DISPERSED LIQUID CRYSTAL MATERIALS AND which is incorporated by reference herein in its entirety. Ultimately, the inventors aim to make replica SBGs with plastic substrates and flexible transparent conductive coatings (to replace ITO). Plastic SBG technology suitable for the present invention is also disclosed in U.S. Provisional Patent Application No. 61/573, 066. A reverse mode SBG is more ideally suited to mastering as it avoids the degradation of SBG material that occurs with UV recording. Advantageously, the SBGs will used thin flexible glass substrates such as the ones developed by Corning and Schott driven by the touch panel and smart phone industries.

In one embodiment of the invention the first holograms 1,N are surface relief structures such as binary structures. Such holograms would typically require index matching layers between the hologram layers In one embodiment of the invention step a) further comprises providing a half wave plate (HWP) and step c) further comprises disposing the HWP between the holographic recording medium substrate and the first hologram stack. In a further embodiment step a) further comprises providing a linear polarizer and in step c) further comprises disposing the linear polarizer between the HWP and the first hologram stack.

In one embodiment of the invention the first holographic recording medium is a HPDLC for recording a SBG, the second holographic recording medium is a holographic photopolymer and the third holographic recording medium is a holographic photopolymer. In one embodiment of the invention the third hologram is copy of the second hologram and the second hologram is a copy of the first hologram. In one embodiment of the invention the third holographic recording medium comprises HPDLC material components for forming one of a forward mode SBG or a reverse mode SBG. In one embodiment of the invention the zero order light and diffracted light in at least one step d) and step i) have power substantially in the ratio of 1:1. In one embodiment of the invention the third holographic recording medium has a substrate fabricated from optical plastic. In one embodiment of the invention the second hologram and the third holographic recording medium are separated by an air gap. In one embodiment of the invention the second hologram and the third holographic recording medium are in contact. In one embodiment of the invention the third holographic recording medium forms part of a mechanically translatable continuous lamina.

Figure 5:
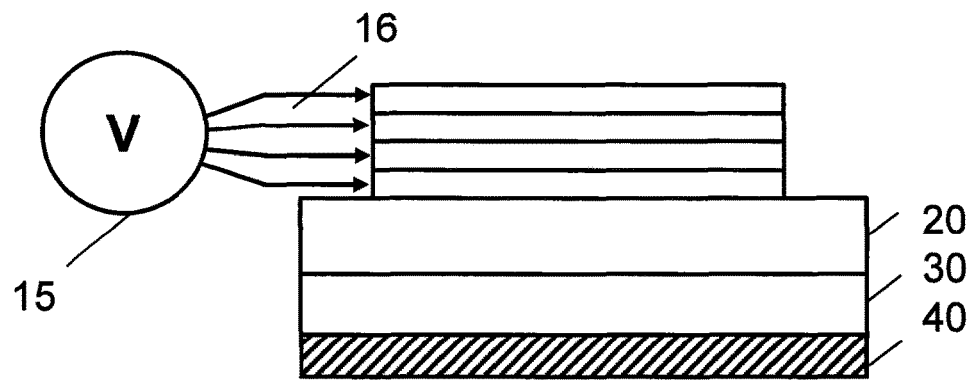
FIG. 5 is a schematic illustration illustrating the use of an electric field to control the refractive index modulations of the first holograms during the recording of the second hologram in one embodiment of the invention
Figure 6:
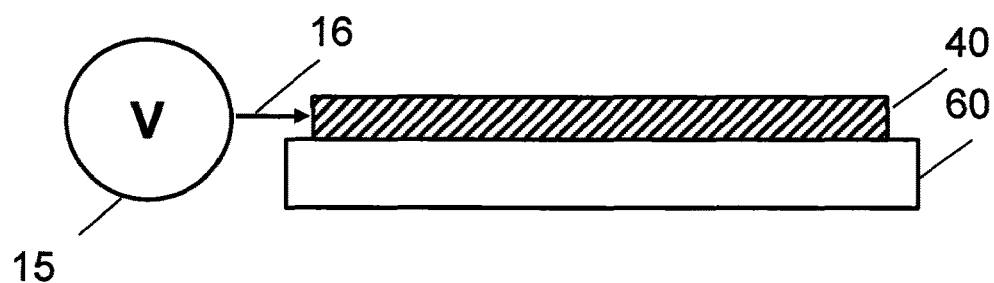
FIG. 6 is a schematic illustration illustrating the use of an electric field to control the refractive index modulations of the second hologram during the recording of the third hologram in one embodiment of the invention

In one embodiment of the invention there is further provided a voltage generator for applied a voltage across at least one of the second hologram and the third holographic recording medium according to the principles disclosed in PCT/GB2013/000273 entitled ELECTRICALLY CONTROLLABLE MASTER HOLOGRAM FOR CONTACT COPYING. The voltage varies the refractive index modulation of at least one of the second hologram and the third during steps g) to i). FIG. 5 illustrates the application of a voltage across the first holograms using the voltage generator 15 via the connectors 16. FIG. 6 illustrates the application of a voltage across the second hologram using the voltage generator 15 via the connectors 17.

In one embodiment of the invention the second holographic recording medium is one of a photo thermal refractive or holographic photopolymer, a forward mode HPDLC mixture or a reverse mode HPDLC mixture. In one embodiment of the invention the third holographic recording medium is one of a photo thermal refractive or photopolymer, a forward mode HPDLC mixture or a reverse mode HPDLC mixture. In one embodiment of the invention the diffracting thickness of the first hologram is less than or equal to 1 micron. In one embodiment of the invention the diffracting thickness of the first hologram is less than or equal to 2 micron.

Figure 2:
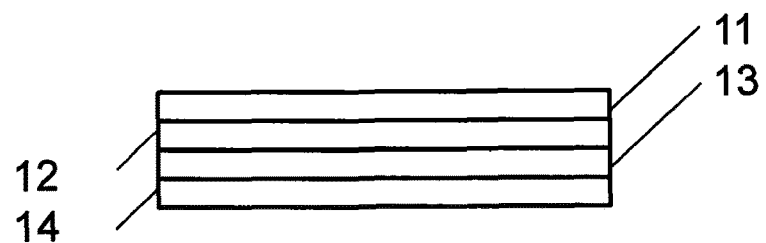
FIG. 2A is a cross section view of a stack of first holograms in one embodiment.
FIG. 2B is a schematic cross section view of a stack comprising first holograms, a linear polarizer, a half wave plate and second holographic recording medium in one embodiment.
FIG. 2C is a schematic cross section view of a second hologram in contact with a third holographic recording medium in one embodiment of the invention.
Figure 2:
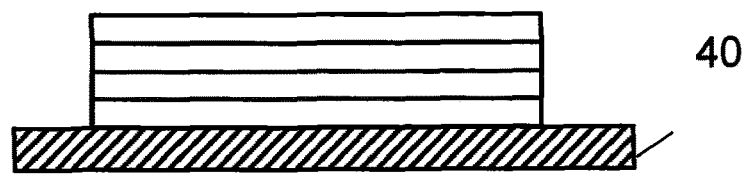
Figure 2:
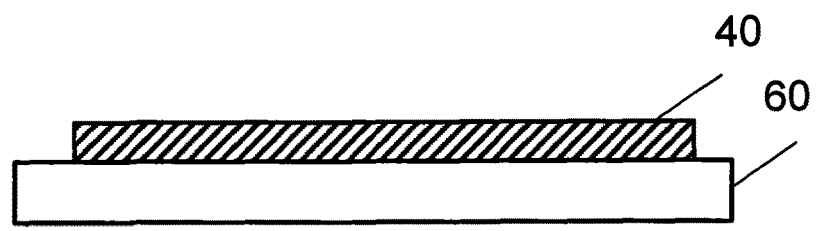
Figure 3:
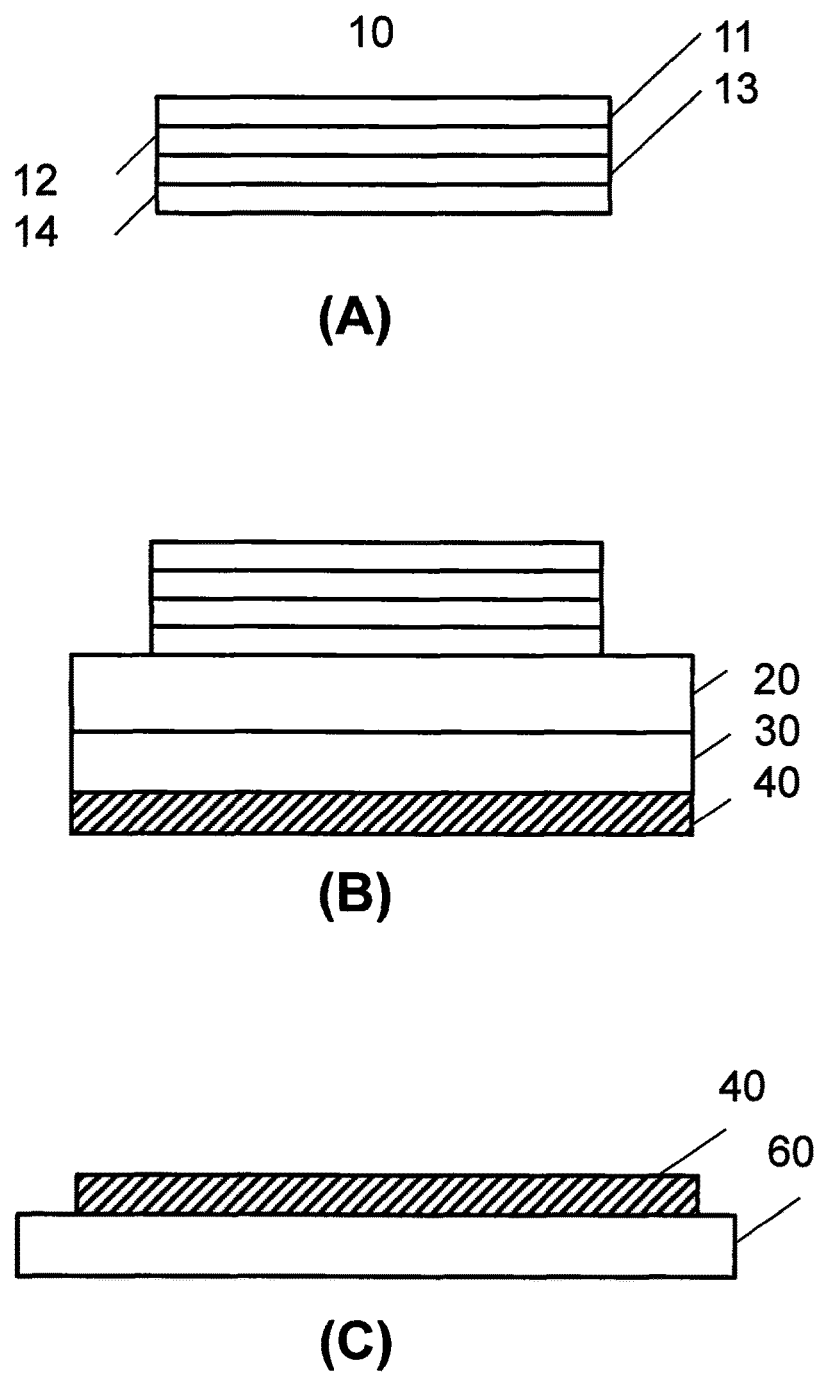
FIG. 3A is a schematic cross section view of a stack of first holograms in one embodiment of the invention.
FIG. 3B is a schematic cross section view of a stack comprising a stack of first holograms, a linear polarizer, a half wave plate and second holographic recording medium in one embodiment of the invention.
FIG. 3C is a schematic cross section view of a second hologram in contact with a third holographic recording medium in one embodiment of the invention.
Figure 4:
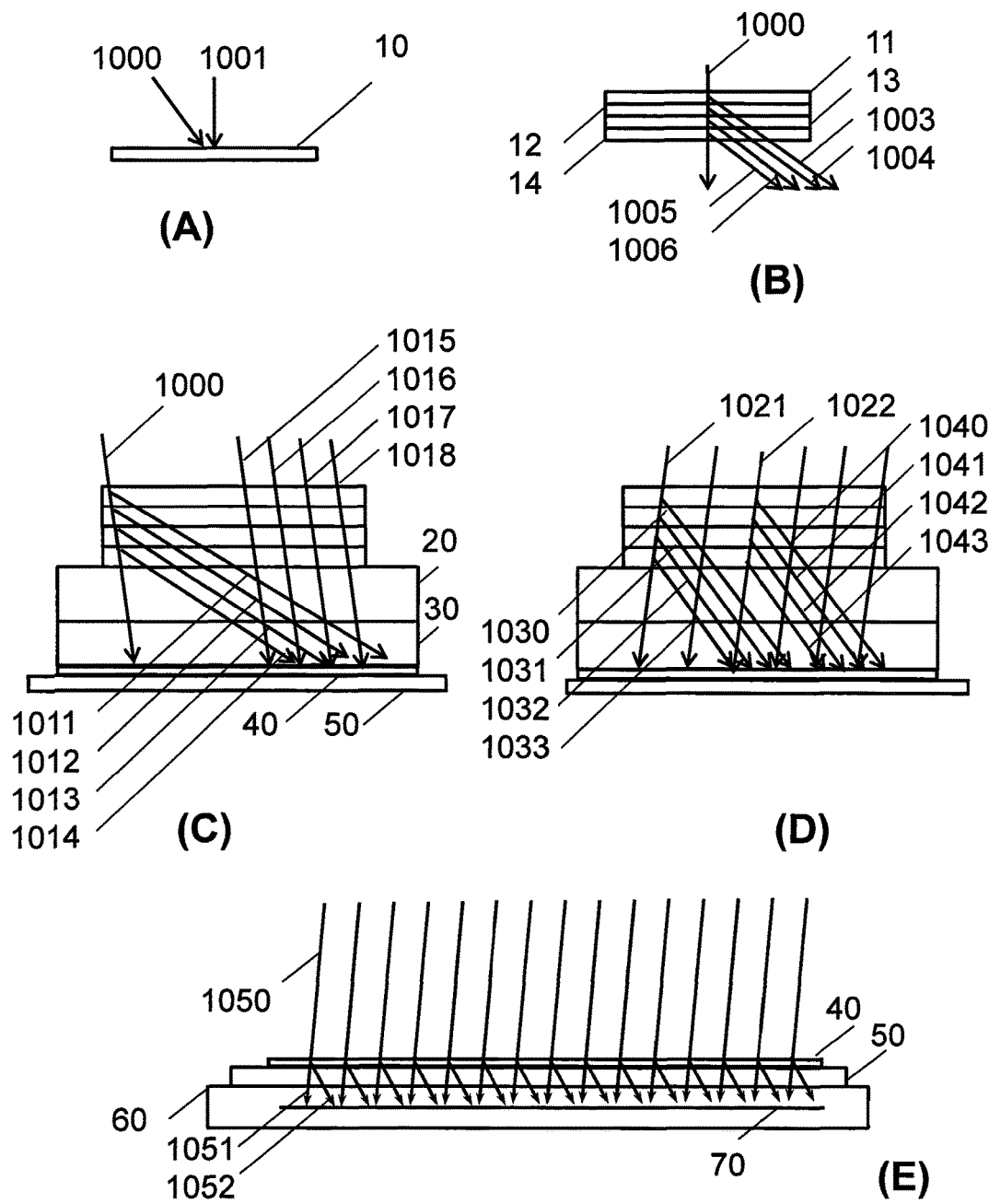
FIG. 4A is a schematic cross section view of a first hologram in one embodiment of the invention.
FIG. 4B is a schematic cross section view of a stack of first holograms showing ray paths in one embodiment of the invention.
FIG. 4C is a schematic cross section view of a stack comprising a stack of first holograms, a linear polarizer, a half wave plate and second holographic recording medium showing ray paths for a first illumination direction in one embodiment of the invention.
FIG. 4D is a schematic cross section view of a stack comprising a stack of first holograms, a linear polarizer, a half wave plate and second holographic recording medium showing ray paths for a second illumination direction in one embodiment of the invention.
FIG. 4E is a schematic cross section view of a second hologram in contact with a third holographic recording medium showing ray paths in one embodiment of the invention.

In one embodiment of the invention illustrated in FIGS. 2-3 there is provided a method of mastering and replicating holograms, the method comprising:

a) providing a laser apparatus for forming a first recording beam in a first direction 1000 and a second recording beam in a second direction 1001; a stack 10 of substrates 11-14 each containing a first HPDLC mixture; a holography photopolymer 40 on a substrate 50; a copy holographic substrate 60 containing a second HPDLC mixture 70; a HWP 20; and a linear polarizer 30;

b) the first and second beams interfering within each the first HPDLC mixture to form a first hologram in each substrate;

c) stacking in sequence the linear polarizer, HWP and first holograms (1-N) onto the second holographic photopolymer;

d) illuminating external surface of the holograms (1-N) with light of a first polarization in the first direction, as indicated by rays 1015-1018 in FIG. 4C;

e) the first holograms (1-N) diffracting the light into zero order light in the first direction 1000 and diffracted rays 1011-1014 in FIG. 4C in the second direction;

f) the HWP rotating the incident light polarization through ninety degrees into a second polarization;

g) the linear polarizer removing residual first polarization light;

h) the first direction light and the second direction light interfering in the holographic photopolymer to form a second hologram;

i) placing the second hologram in contact with the copy holographic substrate;

j) illuminating external surface of the second hologram with light of the second polarization in the first direction 1050;

k) the second hologram diffracting the light into zero order light 1051 in the first direction and diffracted light in the second direction 1052;

l) the diffracted and first order interfering in the copy holographic substrate to form a third hologram.

In one embodiment of the invention steps d) to l) are repeated for a multiplicity of values of the first and second directions, wherein the first and second directions are limited by the diffraction efficiency angular bandwidth of the first hologram. For example FIG. 4D shows the step of FIG. 4C in which the first direction is at an opposing angle to the first direction of FIG. 4C as indicated by the rays 1021,1022. This results in a different diffraction direction as indicated by the rays 1030-1033 and 1040-1043. The first direction of FIG. 4D is also used in FIG. 4E.

Figure 7:
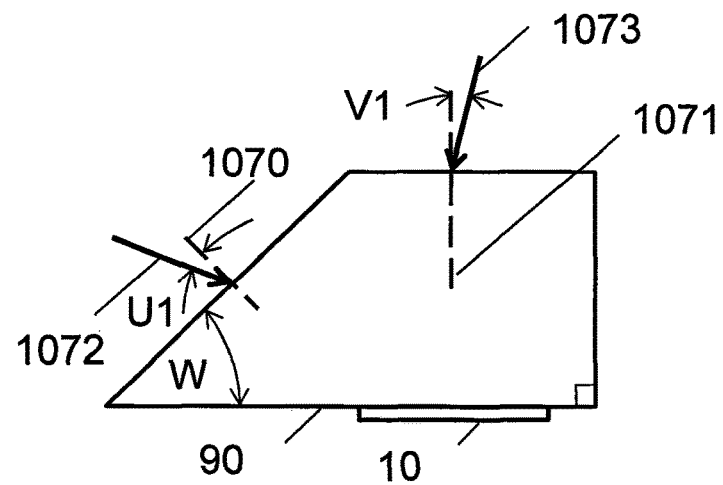
FIG. 7 is a schematic illustration of an optical arrangement for recording on of the first holograms in one embodiment of the invention.

In the embodiment of FIGS. 2-3 the first polarization is P and the second polarization is S. The first hologram is ideally a thin wide angular bandwidth SBG. Thinner grating will provide a broader angular bandwidth. Typically the grating thickness may range from 0.5-1.0 microns depending on the angular bandwidth required. The SBGs are recorded using S-polarized light. The second hologram is recorded into a high quality holographic photopolymer material such as the ones supplied by Bayer Inc. In this case the second hologram is illuminated with P-polarized light as SBGs will only diffract P. To achieve the best contrast in the second hologram the exposure must use S-polarized light. This is done by means of the half wave plate (for rotating P to S) and linear polarizer (for removing residual P-polarised light). Fine tuning of the beam ration is provided by optimizing the angle of the HWP relative to the linear polarizer. The aim is to have the ratio of diffracted to zero order light in the second hologram as close to 1:1 as possible to provide the optimal beam ratio for the recording of the third hologram. At this point it will be desirable to increase the source brightness to compensate for light losses through the polarizing components. As discussed above beam intensity may be fined tune by applying voltages to the first holograms. The third hologram is created using a contact copy process in which the second hologram is illuminated by S-polarized light FIG. 7 is a schematic illustration of an optical arrangement using a dove prism for recording on of the first holograms in one embodiment of the invention. The dove prism 90 with acute angle W (typically 45 degree) has its base in contact with the first hologram substrate 10. Construction beams in the directions 1072, 1073 at angles U1, V1 to the surface normals 1070, 1071 interfere in the substrate 10 to form the first hologram.

Figure 8:
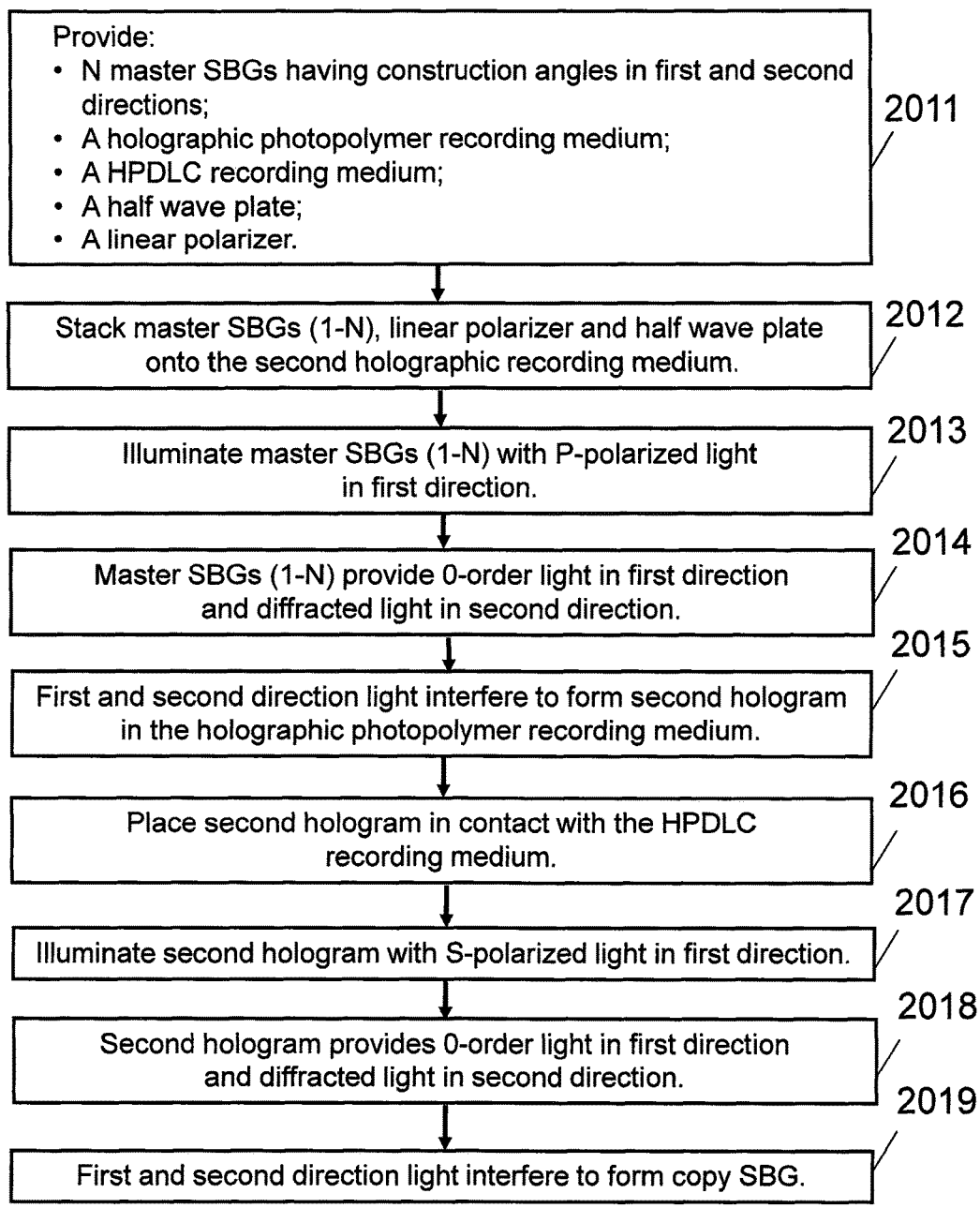
FIG. 8 is a flowchart illustrating a process for mastering and replicating holograms in one embodiment of the invention.

A method of replicating a hologram according to a preferred embodiment of the invention in accordance with the basic principles of the invention is shown in the flow diagram in FIG. 8. Referring to the flow diagram, we see that the method comprises the following steps:

At step 2011 provide: N master SBGs having construction angles in the first and second directions; a holographic photopolymer recording medium; a HPDLC recording medium; a half wave plate; and a linear polarizer.

At step 2012 stack the master SBGs (1-N), linear polarizer and half wave plate onto the second holographic recording medium.

At step 2013 illuminate the master SBGs (1-N) with P-polarized light in the first direction.

At step 2014 master SBGs (1-N) provide 0-order light in the first direction and diffracted light in the second direction.

At step 2015 the first and second direction light interferes to form the second hologram in the holographic photopolymer recording medium.

At step 2016 place the second hologram in contact with the HPDLC recording medium.

At step 2017 illuminate the second hologram with S-polarized light in the first direction.

At step 2018 the second hologram provides 0-order light in the first direction and diffracted light in the second direction.

At step 2019 the first and second direction light interferes to form a copy SBG.

Figure 9:
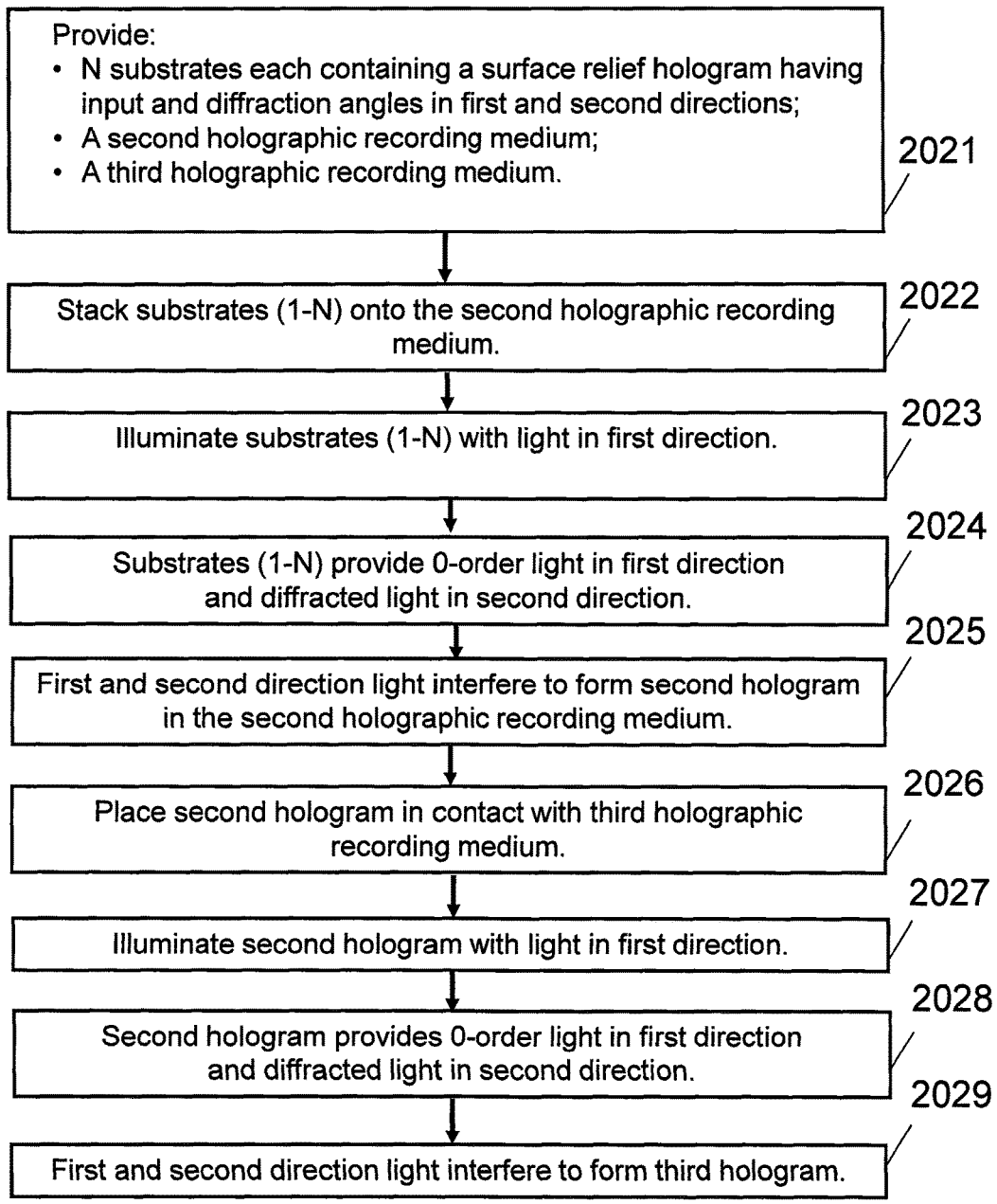
FIG. 9 is a flowchart illustrating a process for mastering and replicating holograms in one embodiment of the invention.

In one embodiment of the invention the first hologram is a surface relief hologram such as binary grating. A method of replicating a hologram in one embodiment of the invention in accordance with the basic principles of the invention is shown in the flow diagram in FIG. 9. Referring to the flow diagram, we see that the method comprises the following steps:

At step 2021 provide: N substrates each containing a surface relief hologram having input and diffraction angles in first and second directions; a second holographic recording medium; and a third holographic recording medium.

At step 2022 stack substrates (1-N) onto the second holographic recording medium.

At step 2023 illuminate substrates (1-N) with light in the first direction.

At step 2024 substrates (1-N) provide 0-order light in the first direction and diffracted light in the second direction.

At step 2025 the first and second direction light interferes to form the second hologram in the second holographic recording medium.

At step 2026 place the second hologram in contact with the third holographic recording medium.

At step 2027 illuminate the second hologram with light in the first direction.

At step 2028 the second hologram provides 0-order light in the first direction and diffracted light in second direction.

At step 2029 the first and second direction light interferes to form a copy SBG.

Figure 10:
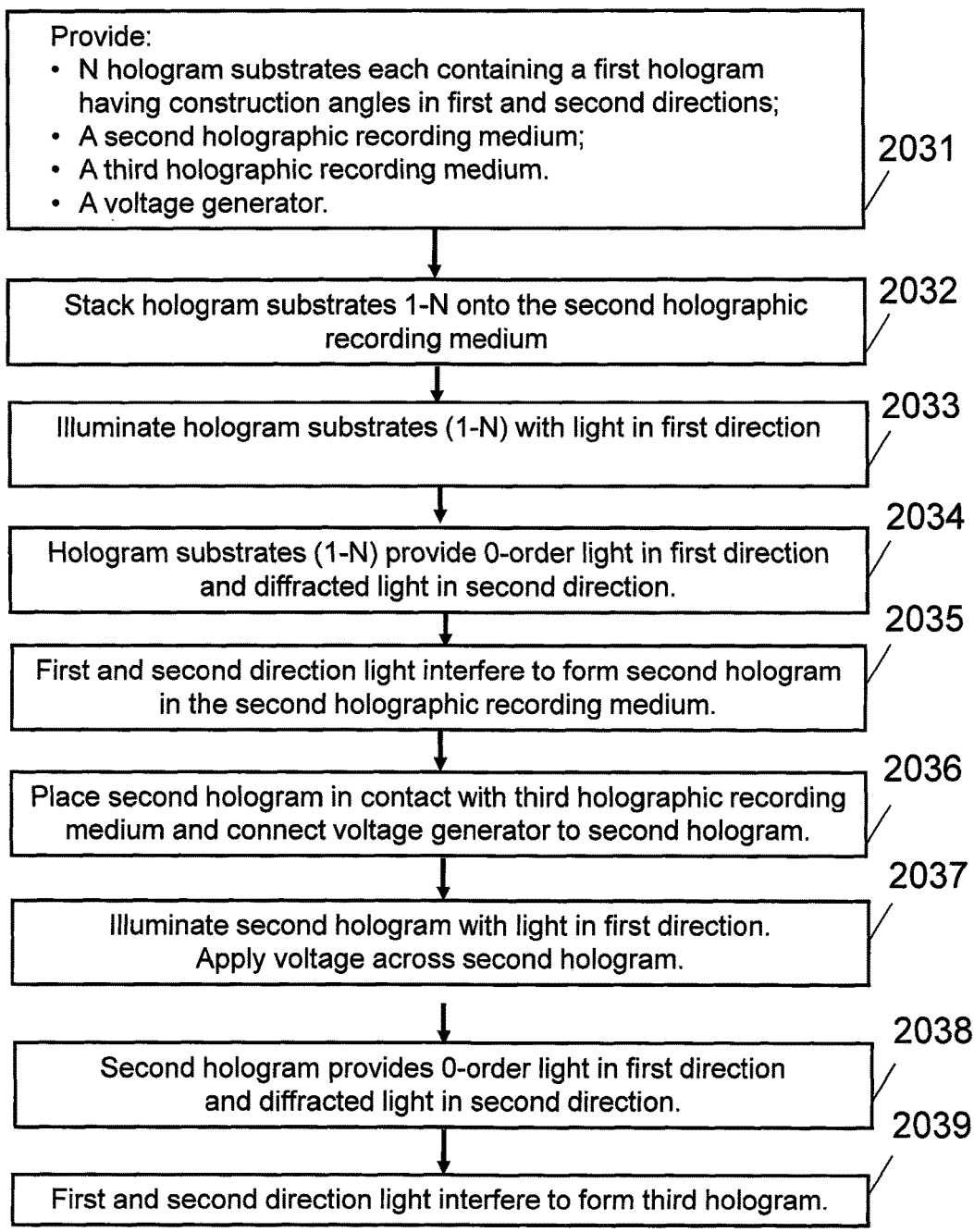
FIG. 10 is a flowchart illustrating a process for mastering and replicating holograms in one embodiment of the invention.

As illustrated in FIGS. 5-6 in one embodiment of the invention there is further provided a voltage generator for applied a voltage across at least one of the second hologram and the third holographic recording medium. A method of replicating a hologram in one embodiment of the invention in accordance with the basic principles of the invention is shown in the flow diagram in FIG. 10. Referring to the flow diagram, we see that the method comprises the following steps:

At step 2031 provide: N hologram substrates each containing a first hologram having construction angles in first and second directions; a second holographic recording medium; a third holographic recording medium; and a voltage generator.

At step 2032 stack the hologram substrates (1-N) onto the second holographic recording medium.

At step 2033 illuminate the hologram substrates (1-N) with light in the first direction.

At step 2034 the hologram substrates (1-N) provide 0-order light in the first direction and diffracted light in the second direction.

At step 2035 the first and second direction light interferes to form the second hologram in the second holographic recording medium.

At step 2036 place the second hologram in contact with the third holographic recording medium and connect the voltage generator to the second hologram.

At step 2037 illuminate the second hologram with light in the first direction. Apply a voltage across the second hologram.

At step 2038 the second hologram provides 0-order light in the first direction and diffracted light in the second direction.

At step 2039 the first and second direction light interferes to form a third hologram.

Figure 11:
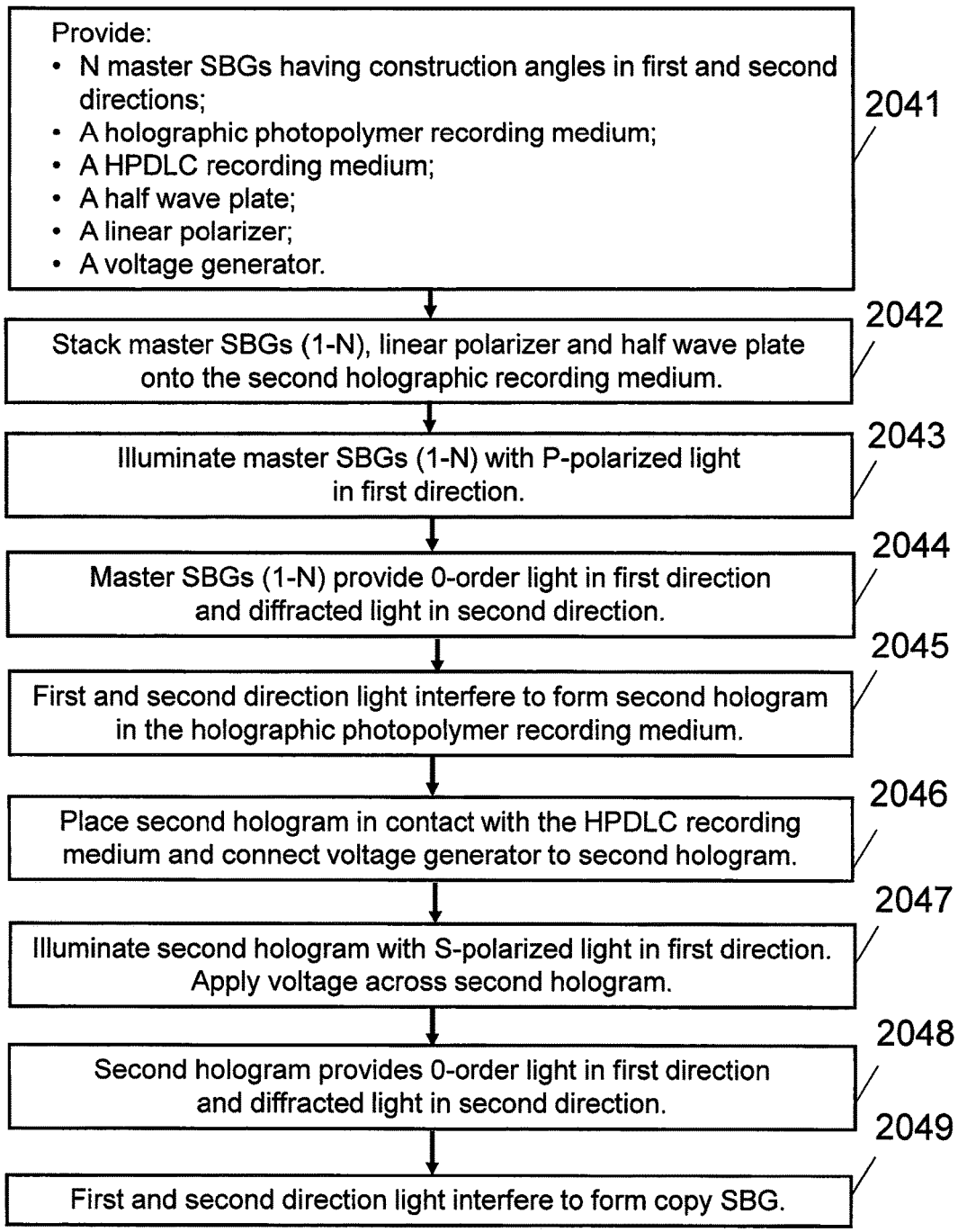
FIG. 11 is a flowchart illustrating a process for mastering and replicating holograms in one embodiment of the invention.

A further method of replicating a hologram in one embodiment of the invention in accordance with the basic principles of the invention is shown in the flow diagram in FIG. 11. Referring to the flow diagram, we see that the method (based on the preferred embodiment discussed above and illustrated in FIG. 8) comprises the following steps:

At step 2041 provide: N master SBGs having construction angles in first and second directions; a holographic photopolymer recording medium; a HPDLC recording medium; a half wave plate; a linear polarizer; and a voltage generator.

At step 2042 stack the master SBGs (1-N), linear polarizer and half wave plate onto the second holographic recording medium.

At step 2043 illuminate the master SBGs (1-N) with P-polarized light in the first direction.

At step 2044 the master SBGs (1-N) provide 0-order light in the first direction and diffracted light in the second direction.

At step 2045 the first and second direction light interferes to form the second hologram in the holographic photopolymer recording medium.

At step 2046 place the second hologram in contact with the HPDLC recording medium and connect the voltage generator to the second hologram.

At step 2047 illuminate the second hologram with S-polarized light in the first direction. Apply a voltage across the second hologram.

At step 2048 the second hologram provides 0-order light in the first direction and diffracted light in the second direction.

At step 2049 the first and second direction light interferes to form a copy SBG.

In one embodiment of the invention steps are repeated for a predefined number of holographic prescriptions, that is, for a multiplicity of vectors defining the first and second directions. One first hologram (master) is used to produce all replicas at each prescription. The first holograms (1-N) are illumination by each first direction vector of a predefined set in turn. The first and second directions are limited by the diffraction efficiency angular bandwidth of said first hologram.

Figure 12:
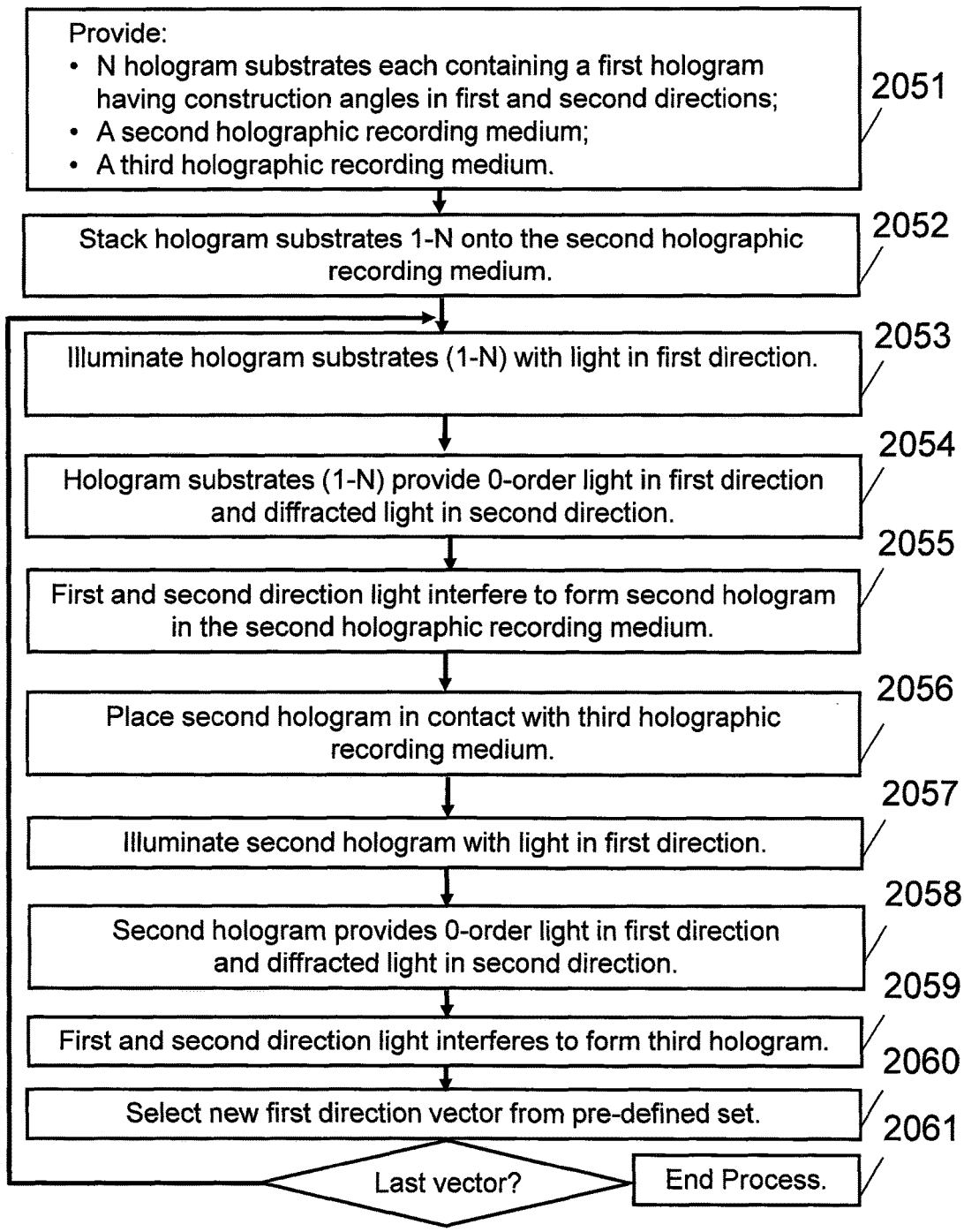
FIG. 12 is a flowchart illustrating a process for mastering and replicating holograms in one embodiment of the invention.

A method of replicating a hologram in one embodiment of the invention (based on the embodiment of FIG. 1) in accordance with the basic principles of the invention is shown in the flow diagram in FIG. 12. Referring to the flow diagram, we see that the method comprises the following steps:

At step 2051 provide N hologram substrates each containing a first hologram having construction angles in first and second directions; a second holographic recording medium; and a third holographic recording medium.

At step 2052 stack hologram substrates 1-N onto the second holographic recording medium At step 2053 illuminate hologram substrates (1-N) with light in the first direction At step 2054 hologram substrates (1-N) provide 0-order light in the first direction and diffracted light in the second direction.

At step 2055 the first and second direction light interferes to form a second hologram in the second holographic recording medium.

At step 2056 place the second hologram in contact with the third holographic recording medium.

At step 2057 illuminate the second hologram with light in the first direction.

At step 2058 the second hologram provides 0-order light in the first direction and diffracted light in the second direction.

At step 2059 the first and second direction light interferes to form the third hologram.

At step 2060 a new first direction vector is selected from a pre-defined set.

At step 2061 the process is repeated from step 2053 onwards until the last vector in the pre-defined set has been selected.

It should be understood by those skilled in the art that while the present invention has been described with reference to exemplary embodiments, it is to be understood that the invention is not limited to the disclosed exemplary embodiments. Various modifications, combinations, sub-combinations and alterations may occur depending on design requirements and other factors insofar as they are within the scope of the appended claims or the equivalents thereof.

What is claimed is:

1. A method for mastering and replicating holograms, the method comprising:
   a) providing N substrates each containing a first hologram for diffracting incident light from a first direction into diffracted light in a second direction; providing a second holographic recording medium; and providing a third holographic recording medium;
   b) stacking in sequence the first holograms 1-N onto said second holographic recording medium;
   c) illuminating an external surface of said first holograms 1-N with light of a first polarization in a first direction;
   d) said first holograms 1-N diffracting said light into zero order light in said first direction and diffracted light in said second direction;
   e) said first direction light and said second direction light interfering in said second holographic recording medium to form a second hologram;
   f) placing said second hologram in contact with said third holographic recording medium;
   g) illuminating external surface of said second hologram with light in said first direction;
   h) said second hologram diffracting said light into zero order light in said first direction and diffracted light in said second direction; and
   i) said diffracted and zero order light interfering in said third holographic recording medium to form a third hologram.

2. The method of claim 1 wherein said steps c) to i) are repeated for a plurality of different said first and second directions, wherein said first and second directions are limited by the diffraction efficiency angular bandwidth of said first hologram.

3. The method of claim 1 wherein the first holograms 1-N are provided by the steps of: configuring a laser holographic recording apparatus to form a first recording beam in said first direction and a second recording beams in said second direction; providing N substrates each containing a first holographic medium; and said first and second beams interfering within each said first holographic medium substrate to form said first hologram in each said substrate.

4. The method of claim 3 wherein said first holographic recording medium is a HPDLC for recording a SBG, said second holographic recording medium is a holographic photopolymer and said third holographic recording medium is a holographic photopolymer.

5. The method of claim 1 wherein said first holograms 1-N are surface relief diffractive structures.

6. The method of claim 1 further comprising in step a) providing a HWP and in step c) disposing said HWP between said second holographic recording medium substrate and said first hologram stack.

7. The method of claim 1 further comprising in step a) providing a linear polarizer and in step c) disposing said linear polarizer between said HWP and said first hologram stack.

8. The method of claim 1 wherein said third hologram is copy of said second hologram and said second hologram is a copy of said first hologram.

9. The method of claim 1 wherein said third holographic recording medium comprises HPDLC material components for forming a forward mode SBG or a reverse mode SBG.

10. The method of claim 1 wherein said zero order light and diffracted light in at least one step d) and step i) have power substantially in the ratio of 1:1.

11. The method of claim 1 wherein said second hologram and said third holographic recording medium are separated by an air gap.

12. The method of claim 1 wherein at least one index matching optical layer is provided.

13. The method of claim 1 wherein said third holographic recording medium forms part of a mechanically translatable continuous lamina.

14. The method of claim 1 further comprising a voltage generator for applied a voltage across at least one of said second hologram and said third holographic recording medium; wherein said voltage varies the refractive index modulation of at least one of said second hologram and said third during steps g) to i).

15. The method of claim 1 wherein said second holographic recording medium is one of a photo thermal refractive or holographic photopolymer, a forward mode HPDLC mixture or a reverse mode HPDLC mixture.

16. The method of claim 1 wherein said third holographic recording medium is one of a photo thermal refractive or photopolymer, a forward mode HPDLC mixture or a reverse mode HPDLC mixture.

17. The method of claim 1 wherein the diffracting thickness of said first hologram is less than or equal to 2 micron.

18. A method of mastering and replicating holograms, the method comprising:
  a) providing a laser apparatus for forming a first recording beam in a first direction and a second recording beams in a second direction; N substrates each containing a first HPDLC mixture; a holography photopolymer; a copy holographic substrate containing a second HPDLC mixture; a HWP; and a linear polarizer;
  b) said first and second beams interfering within each said first HPDLC mixture to form a first hologram in each said substrate;
  c) stacking in sequence the linear polarizer, HWP and first holograms 1-N onto a second holographic photopolymer;
  d) illuminating external surface of said holograms 1-N with light of a first polarization in said first direction;
  e) said first holograms 1-N diffracting said light into zero order light in said first direction and diffracted light in said second direction;
  f) said HWF rotating the incident light polarization through ninety degrees into a second polarization;
  g) said polarizer removing residual first polarization light;
  h) said first direction light and said second direction light interfering in said holographic photopolymer to form a second hologram;
  i) placing said second hologram in contact with said copy holographic substrate;
  j) illuminating external surface of said second hologram with light of said second polarization in said first direction;
  k) said second hologram diffracting said light into zero order light in said first direction and diffracted light in said second direction; and
  l) said diffracted and first order interfering in said copy holographic substrate to form a third hologram.

19. The method of claim 18 wherein said steps d) to l) are repeated for a plurality of different said first and second directions, wherein said first and second directions are limited by the diffraction efficiency angular bandwidth of said first hologram.

20. The method of claim 18 wherein said first polarization is P-polarization and said second polarization is S-polarization.

* * * * *